US012756218B2

(12) United States Patent
Fasching et al.

(10) Patent No.: US 12,756,218 B2

(45) Date of Patent: Oct. 6, 2026

(54) PULSED CHARGING AND HEATING TECHNIQUES FOR ENERGY SOURCES

(71) Applicant: TAE TECHNOLOGIES, INC., Foothill Ranch, CA (US)

(72) Inventors: Rainer Fasching, Mill Valley, CA (US); Ghyrn Loveness, Mountain View, CA (US); Mikhail Slepchenkov, Lake Forest, CA (US); Roozbeh Naderi, Foothill Ranch, CA (US)

(73) Assignee: TAE Technologies, Inc., Foothill Ranch, CA (US)

( * ) Notice: Subject to any disclaimer, the term of this patent is extended or adjusted under 35 U.S.C. 154(b) by 666 days.

(21) Appl. No.: 17/486,558

(22) Filed: Sep. 27, 2021

(65) Prior Publication Data

US 2022/0190619 A1 Jun. 16, 2022

Related U.S. Application Data

(60) Provisional application No. 63/119,504, filed on Nov. 30, 2020, provisional application No. 63/084,352, filed on Sep. 28, 2020.

(51) Int. Cl.

*H02J 7/00* (2026.01)
*H01M 10/0525* (2010.01)

(Continued)

(52) U.S. Cl.

CPC ......... *H02J 7/927* (2026.01); *H01M 10/0525* (2013.01); *H01M 10/44* (2013.01); *H02J 7/50* (2026.01); *H02J 7/82* (2026.01); *H02J 7/84* (2026.01); *H02J 7/933* (2026.01); *H02J 7/977* (2026.01); *H02M 7/53871* (2013.01)

(58) Field of Classification Search

USPC ................................................ 320/150–154

See application file for complete search history.

(56) References Cited

U.S. PATENT DOCUMENTS

| | | |
|---|---|---|
| 3,963,976 A | 6/1976 | Clark |
| 5,204,548 A | 4/1993 | Daehler et al. |

(Continued)

FOREIGN PATENT DOCUMENTS

| | | |
|---|---|---|
| CA | 2 810 369 A1 | 3/2012 |
| CN | 201789411 U | 4/2011 |

(Continued)

OTHER PUBLICATIONS

Tolbert et al., "Charge Balance Control Schemes for Cascade Multi-level Converter in Hybrid Electric Vehicles," IEEE Trans. Indus. Electronics, Oct. 2002, 49(5):1058-1064.

(Continued)

*Primary Examiner* — Samuel Berhanu

(74) *Attorney, Agent, or Firm* — Alston & Bird LLP

(57) ABSTRACT

Embodiments that provide advanced charging of energy source arrangements for energy storage applications are disclosed. The embodiments can be used within energy storage systems having a cascaded arrangement of converter modules. The embodiments can include the application of pulses to an energy source of each module of the system. The pulses can be applied for charging and preheating purposes. Feedback based pulse control embodiments are also disclosed.

20 Claims, 39 Drawing Sheets

(51) Int. Cl.

| | |
|---|---|
| ***H01M 10/44*** | (2006.01) |
| ***H02J 7/50*** | (2026.01) |
| ***H02J 7/82*** | (2026.01) |
| ***H02J 7/84*** | (2026.01) |
| ***H02J 7/90*** | (2026.01) |
| ***H02M 7/5387*** | (2007.01) |

(56) References Cited

U.S. PATENT DOCUMENTS

| | | | | |
|---|---|---|---|---|
| 5,291,116 | A * | 3/1994 | Feldstein | H02J 7/0018 320/125 |
| 5,428,522 | A | 6/1995 | Millner et al. | |
| 5,642,275 | A | 6/1997 | Peng et al. | |
| 5,808,447 | A | 9/1998 | Hagino | |
| 5,905,371 | A | 5/1999 | Limpaecher | |
| 5,933,339 | A | 8/1999 | Duba et al. | |
| 5,949,664 | A | 9/1999 | Bernet et al. | |
| 6,051,961 | A | 4/2000 | Jang et al. | |
| 6,058,032 | A | 5/2000 | Yamanaka et al. | |
| 6,064,180 | A | 5/2000 | Sullivan et al. | |
| 6,124,698 | A | 9/2000 | Sakakibara | |
| 6,236,580 | B1 | 5/2001 | Aiello et al. | |
| 6,307,353 | B1 * | 10/2001 | Shiojima | H02J 7/00711 320/162 |
| 6,366,056 | B1 * | 4/2002 | Podrazhansky | H01M 10/44 320/141 |
| 6,373,734 | B1 | 4/2002 | Martinelli | |
| 6,392,387 | B1 | 5/2002 | Sage et al. | |
| 6,441,588 | B1 | 8/2002 | Yagi et al. | |
| 7,091,701 | B2 | 8/2006 | Turner et al. | |
| 7,485,987 | B2 | 2/2009 | Mori et al. | |
| 8,334,675 | B2 | 12/2012 | Wang et al. | |
| 8,395,280 | B2 | 3/2013 | Graovac et al. | |
| 8,476,888 | B1 | 7/2013 | Chen et al. | |
| 8,503,202 | B2 | 8/2013 | Chimento et al. | |
| 8,614,525 | B2 | 12/2013 | Teichmann et al. | |
| 8,751,079 | B2 | 6/2014 | Lederer et al. | |
| 8,829,723 | B2 | 9/2014 | Graovac et al. | |
| 9,083,065 | B2 | 7/2015 | Carkner | |
| 9,172,254 | B2 | 10/2015 | Ganor | |
| 9,444,275 | B2 | 9/2016 | Huang et al. | |
| 9,461,474 | B2 | 10/2016 | Deboy et al. | |
| 9,647,472 | B2 | 5/2017 | Berkowitz et al. | |
| 9,673,732 | B2 | 6/2017 | Deboy et al. | |
| 10,008,865 | B2 | 6/2018 | Hempel | |
| 10,014,611 | B2 | 7/2018 | Götz | |
| 10,020,608 | B2 | 7/2018 | Cousineau et al. | |
| 10,069,313 | B2 | 9/2018 | Tkachenko et al. | |
| 10,074,995 | B2 | 9/2018 | Smedley et al. | |
| 10,084,331 | B2 | 9/2018 | Sherstyuk et al. | |
| 10,135,279 | B2 | 11/2018 | Luo et al. | |
| 10,135,281 | B2 | 11/2018 | Tkachenko et al. | |
| 10,164,456 | B2 | 12/2018 | Luo et al. | |
| 10,166,882 | B2 | 1/2019 | Yang et al. | |
| 10,193,359 | B2 | 1/2019 | Ganor | |
| 10,193,369 | B2 | 1/2019 | Sherstyuk et al. | |
| 10,193,371 | B2 | 1/2019 | Chiang | |
| 10,218,189 | B2 | 2/2019 | Goetz | |
| 10,218,200 | B2 | 2/2019 | Sherstyuk et al. | |
| 10,250,045 | B2 | 4/2019 | Sherstyuk et al. | |
| 10,291,037 | B2 | 5/2019 | Birkl et al. | |
| 10,291,048 | B2 | 5/2019 | Tkachenko et al. | |
| 10,293,704 | B2 | 5/2019 | Aronov | |
| 10,391,870 | B2 | 8/2019 | Götz et al. | |
| 10,396,682 | B2 | 8/2019 | Götz et al. | |
| 10,439,506 | B2 | 10/2019 | Götz | |
| 10,442,309 | B2 | 10/2019 | Götz | |
| 10,454,331 | B2 | 10/2019 | Götz | |
| 10,473,728 | B2 | 11/2019 | Goetz | |
| 10,522,886 | B2 | 12/2019 | Li et al. | |
| 10,566,817 | B2 | 2/2020 | Tkachenko et al. | |
| 10,601,070 | B2 | 3/2020 | Krasovitsky et al. | |
| 10,608,298 | B2 | 3/2020 | Qiu et al. | |
| 10,630,201 | B2 | 4/2020 | Götz et al. | |
| 10,644,587 | B2 | 5/2020 | Spindler et al. | |
| 10,700,587 | B2 | 6/2020 | Götz | |
| 10,714,948 | B2 | 7/2020 | Meyer et al. | |
| 10,759,284 | B2 | 9/2020 | Jaensch et al. | |
| 10,784,698 | B2 | 9/2020 | Jaensch et al. | |
| 10,790,513 | B2 | 9/2020 | Jiang et al. | |
| 10,833,375 | B2 | 11/2020 | Ikeno | |
| 10,840,714 | B2 | 11/2020 | Götz et al. | |
| 10,840,725 | B2 | 11/2020 | Tkachenko et al. | |
| 10,903,673 | B2 | 1/2021 | Jung | |
| 10,980,103 | B2 | 4/2021 | Götz et al. | |
| 10,985,551 | B2 | 4/2021 | Götz | |
| 10,998,739 | B2 | 5/2021 | Hinterberger et al. | |
| 11,038,435 | B2 | 6/2021 | Götz | |
| 11,050,281 | B2 | 6/2021 | Sherstyuk et al. | |
| 2003/0102845 | A1 | 6/2003 | Aker et al. | |
| 2004/0008016 | A1 | 1/2004 | Sutardja et al. | |
| 2004/0037101 | A1 | 2/2004 | Meynard et al. | |
| 2005/0065684 | A1 | 3/2005 | Larson et al. | |
| 2006/0097782 | A1 | 5/2006 | Ebner | |
| 2006/0202636 | A1 | 9/2006 | Schneider | |
| 2007/0147098 | A1 | 6/2007 | Mori et al. | |
| 2007/0194627 | A1 | 8/2007 | Mori et al. | |
| 2007/0246635 | A1 | 10/2007 | Nakajima et al. | |
| 2008/0080212 | A1 | 4/2008 | Grbovic | |
| 2008/0245593 | A1 | 10/2008 | Kim | |
| 2008/0304296 | A1 | 12/2008 | Nadimpalliraju et al. | |
| 2009/0104510 | A1 | 4/2009 | Fulop et al. | |
| 2009/0251212 | A1 | 10/2009 | Pillonnet et al. | |
| 2009/0311891 | A1 | 12/2009 | Lawrence et al. | |
| 2010/0060235 | A1 | 3/2010 | Dommaschk et al. | |
| 2010/0085789 | A1 | 4/2010 | Ulrich et al. | |
| 2010/0121511 | A1 | 5/2010 | Onnerud et al. | |
| 2010/0298957 | A1 | 11/2010 | Sanchez Rocha et al. | |
| 2010/0301827 | A1 | 12/2010 | Chen et al. | |
| 2011/0012562 | A1 | 1/2011 | Paryani | |
| 2011/0018500 | A1 | 1/2011 | Takahashi | |
| 2011/0133573 | A1 | 6/2011 | Ratnaparkhi et al. | |
| 2011/0140533 | A1 | 6/2011 | Zeng et al. | |
| 2011/0148198 | A1 | 6/2011 | Tripathi et al. | |
| 2011/0187184 | A1 | 8/2011 | Ichikawa | |
| 2011/0198936 | A1 | 8/2011 | Graovac et al. | |
| 2011/0267001 | A1 * | 11/2011 | Hiraoka | H01M 10/0525 320/162 |
| 2012/0025773 | A1 * | 2/2012 | Wang | H02J 7/00714 320/129 |
| 2012/0053871 | A1 | 3/2012 | Sirard | |
| 2012/0074949 | A1 | 3/2012 | Kepley et al. | |
| 2012/0092018 | A1 | 4/2012 | Scheucher | |
| 2012/0112693 | A1 | 5/2012 | Kusch et al. | |
| 2012/0155140 | A1 | 6/2012 | Chen et al. | |
| 2012/0161858 | A1 | 6/2012 | Permuy et al. | |
| 2012/0187920 | A1 * | 7/2012 | Zhong | H02J 7/00711 320/162 |
| 2012/0195084 | A1 | 8/2012 | Norrga | |
| 2012/0262967 | A1 | 10/2012 | Cuk | |
| 2013/0027126 | A1 | 1/2013 | Jayaraman et al. | |
| 2013/0083563 | A1 | 4/2013 | Wang et al. | |
| 2013/0088254 | A1 | 4/2013 | Hoang et al. | |
| 2013/0088903 | A1 | 4/2013 | Sagona et al. | |
| 2013/0090872 | A1 | 4/2013 | Kurimoto | |
| 2013/0154379 | A1 | 6/2013 | Tiefenbach | |
| 2013/0154521 | A1 | 6/2013 | Butzmann et al. | |
| 2013/0187473 | A1 | 7/2013 | Deboy et al. | |
| 2013/0234669 | A1 | 9/2013 | Huang et al. | |
| 2013/0260188 | A1 | 10/2013 | Coates | |
| 2013/0285457 | A1 | 10/2013 | Kepley | |
| 2013/0302652 | A1 | 11/2013 | Wolff et al. | |
| 2014/0021959 | A1 * | 1/2014 | Maluf | H02J 7/0048 324/426 |
| 2014/0042815 | A1 | 2/2014 | Maksimovic et al. | |
| 2014/0042827 | A1 | 2/2014 | Wolff | |
| 2014/0104899 | A1 | 4/2014 | Fischer et al. | |
| 2014/0152109 | A1 | 6/2014 | Kanakasabai et al. | |
| 2014/0226379 | A1 | 8/2014 | Harrison | |
| 2014/0239927 | A1 | 8/2014 | Nascimento et al. | |
| 2014/0254219 | A1 | 9/2014 | Davies | |
| 2014/0285135 | A1 | 9/2014 | Ji et al. | |
| 2014/0333267 | A1 | 11/2014 | Crawley | |

(56) References Cited

U.S. PATENT DOCUMENTS

| | | | | |
|---|---|---|---|---|
| 2014/0340052 | A1 | 11/2014 | Dwertmann et al. | |
| 2014/0354212 | A1 | 12/2014 | Sugeno et al. | |
| 2015/0002099 | A1 | 1/2015 | Smedley et al. | |
| 2015/0008887 | A1 | 1/2015 | Kim et al. | |
| 2015/0009594 | A1 | 1/2015 | Okaeme et al. | |
| 2015/0049532 | A1 | 2/2015 | Bernet et al. | |
| 2015/0124506 | A1 | 5/2015 | Sahoo et al. | |
| 2015/0171644 | A1 | 6/2015 | Paryani et al. | |
| 2015/0188430 | A1 | 7/2015 | Yuan | |
| 2015/0229227 | A1 | 8/2015 | Aeloiza et al. | |
| 2015/0249351 | A1 | 9/2015 | Wolff et al. | |
| 2015/0270801 | A1 | 9/2015 | Kessler et al. | |
| 2015/0280604 | A1 | 10/2015 | Hassanpoor | |
| 2015/0288287 | A1 | 10/2015 | Madawala et al. | |
| 2015/0296292 | A1 | 10/2015 | Hogan et al. | |
| 2015/0303820 | A1 | 10/2015 | Cubaines | |
| 2015/0340964 | A1 | 11/2015 | Modeer | |
| 2015/0364935 | A1 | 12/2015 | Fetzer et al. | |
| 2016/0023563 | A1 | 1/2016 | Wang et al. | |
| 2016/0072396 | A1 | 3/2016 | Deboy et al. | |
| 2016/0149430 | A1* | 5/2016 | Hempel ............ | H02J 7/007188 320/139 |
| 2016/0183451 | A1 | 6/2016 | Conrad et al. | |
| 2016/0240894 | A1 | 8/2016 | Wartenberg et al. | |
| 2016/0254682 | A1 | 9/2016 | Yip et al. | |
| 2016/0308466 | A1 | 10/2016 | Oates | |
| 2017/0054306 | A1 | 2/2017 | Vo et al. | |
| 2017/0099007 | A1 | 4/2017 | Oates et al. | |
| 2017/0163171 | A1 | 6/2017 | Park | |
| 2017/0179745 | A1 | 6/2017 | Tritschler et al. | |
| 2017/0207651 | A1 | 7/2017 | Geng et al. | |
| 2017/0244255 | A1 | 8/2017 | Luo et al. | |
| 2017/0302088 | A1 | 10/2017 | Tkachenko et al. | |
| 2017/0302091 | A1 | 10/2017 | Schaedlich et al. | |
| 2017/0338654 | A1 | 11/2017 | Subramanian | |
| 2017/0366079 | A1 | 12/2017 | Bhowmik et al. | |
| 2018/0013306 | A1 | 1/2018 | Tkachenko et al. | |
| 2018/0043789 | A1 | 2/2018 | Goetz | |
| 2018/0175744 | A1 | 6/2018 | Jasim et al. | |
| 2018/0191176 | A1 | 7/2018 | Sherstyuk et al. | |
| 2018/0191187 | A1 | 7/2018 | Sherstyuk et al. | |
| 2018/0241239 | A1 | 8/2018 | Frost et al. | |
| 2019/0027792 | A1* | 1/2019 | Sun ..................... | H01M 10/633 |
| 2019/0031042 | A1 | 1/2019 | Müller | |
| 2019/0131851 | A1 | 5/2019 | Herb | |
| 2019/0148964 | A1 | 5/2019 | Fasching et al. | |
| 2019/0190028 | A1 | 6/2019 | Wang et al. | |
| 2019/0252742 | A1 | 8/2019 | Liu et al. | |
| 2019/0288522 | A1 | 9/2019 | Hinterberger et al. | |
| 2019/0288526 | A1 | 9/2019 | Jaensch et al. | |
| 2019/0288527 | A1 | 9/2019 | Jaensch et al. | |
| 2019/0288547 | A1 | 9/2019 | Jaensch et al. | |
| 2019/0288617 | A1 | 9/2019 | Jaensch et al. | |
| 2019/0312504 | A1 | 10/2019 | Kim et al. | |
| 2019/0319300 | A1 | 10/2019 | Yi et al. | |
| 2020/0006961 | A1 | 1/2020 | Zhou et al. | |
| 2020/0036197 | A1* | 1/2020 | Tan ..................... | H01M 10/441 |
| 2020/0119410 | A1 | 4/2020 | Tian | |
| 2020/0185947 | A1 | 6/2020 | Tkachenko et al. | |
| 2020/0212687 | A1 | 7/2020 | Hinterberger et al. | |
| 2020/0235439 | A1 | 7/2020 | Frost et al. | |
| 2020/0244076 | A1 | 7/2020 | Wang et al. | |
| 2020/0278936 | A1 | 9/2020 | Gopalakrishnan et al. | |
| 2020/0280048 | A1 | 9/2020 | Kang et al. | |
| 2020/0303930 | A1 | 9/2020 | Edelshtein et al. | |
| 2020/0317086 | A1 | 10/2020 | Goetz et al. | |
| 2020/0328593 | A1 | 10/2020 | Goetz | |
| 2020/0338997 | A1 | 10/2020 | Goetz et al. | |
| 2020/0358370 | A1 | 11/2020 | Goetz et al. | |
| 2020/0381784 | A1 | 12/2020 | Yamamoto et al. | |
| 2020/0395840 | A1 | 12/2020 | Goetz | |
| 2021/0005855 | A1 | 1/2021 | Götz et al. | |
| 2021/0021003 | A1 | 1/2021 | Chen et al. | |
| 2021/0028507 | A1 | 1/2021 | Su et al. | |
| 2021/0028509 | A1 | 1/2021 | Su et al. | |
| 2021/0146791 | A1 | 5/2021 | Hinterberger et al. | |
| 2021/0151726 | A1 | 5/2021 | Hinterberger et al. | |
| 2021/0151727 | A1 | 5/2021 | Hinterberger et al. | |
| 2021/0151728 | A1 | 5/2021 | Hinterberger et al. | |
| 2021/0197676 | A1 | 7/2021 | Goetz et al. | |
| 2021/0249963 | A1* | 8/2021 | Kajiyama ......... | H02M 3/33573 |
| 2021/0316621 | A1 | 10/2021 | Slepchenkov et al. | |
| 2021/0399554 | A1 | 12/2021 | Sherstyuk | |

FOREIGN PATENT DOCUMENTS

| | | | |
|---|---|---|---|
| CN | 103825060 | A | 5/2014 |
| CN | 204156591 | U | 2/2015 |
| CN | 103812377 | B | 5/2016 |
| DE | 10 2014 008 399 | A1 | 12/2015 |
| DE | 10 2016 109 077 | A1 | 11/2017 |
| DE | 10 2017 220 175 | A1 | 5/2019 |
| DE | 10 2018 109 921 | B3 | 8/2019 |
| DE | 10 2018 109 922 | A1 | 10/2019 |
| DE | 10 2018 109 925 | A1 | 10/2019 |
| DE | 10 2018 109 926 | B4 | 12/2019 |
| DE | 10 2018 121 403 | A1 | 3/2020 |
| DE | 10 2018 121 490 | A1 | 3/2020 |
| DE | 10 2018 121 547 | A1 | 3/2020 |
| DE | 10 2018 126 780 | A1 | 4/2020 |
| DE | 10 2018 129 111 | A1 | 5/2020 |
| DE | 10 2018 126 779 | B4 | 6/2020 |
| DE | 10 2019 112 826 | B3 | 6/2020 |
| DE | 10 2019 102 306 | A1 | 7/2020 |
| DE | 10 2019 102 311 | A1 | 7/2020 |
| DE | 10 2019 103 757 | B3 | 7/2020 |
| DE | 10 2019 120 615 | B3 | 8/2020 |
| DE | 10 2019 112 373 | A1 | 11/2020 |
| DE | 10 2019 112 823 | A1 | 11/2020 |
| DE | 10 2019 120 616 | B3 | 11/2020 |
| DE | 10 2019 120 947 | B3 | 11/2020 |
| DE | 10 2019 125 577 | B3 | 11/2020 |
| DE | 10 2019 125 578 | B3 | 11/2020 |
| DE | 10 2019 120 945 | B3 | 2/2021 |
| DE | 10 2019 130 736 | A1 | 5/2021 |
| DE | 10 2019 130 737 | A1 | 5/2021 |
| DE | 10 2019 132 685 | A1 | 6/2021 |
| DE | 10 2020 117 264 | B3 | 6/2021 |
| DE | 10 2020 117 435 | B3 | 6/2021 |
| DE | 10 2020 118 242 | B3 | 7/2021 |
| EP | 0 907 238 | A1 | 4/1999 |
| EP | 2 290 799 | A1 | 3/2011 |
| EP | 2 658 071 | A2 | 10/2013 |
| EP | 2 693 598 | A1 | 2/2014 |
| JP | 2006-092901 | A | 4/2006 |
| JP | 2006-092910 | A | 4/2006 |
| JP | 2008-107168 | A | 5/2008 |
| JP | 2010-178495 | A | 8/2010 |
| JP | 2010-539657 | A | 12/2010 |
| JP | 2011-024395 | A | 2/2011 |
| JP | 2016-002833 | A | 1/2016 |
| JP | 2016-004649 | A | 1/2016 |
| JP | 2016-524786 | A | 8/2016 |
| JP | 2019-097879 | A | 6/2019 |
| WO | WO 2011/009689 | A2 | 1/2011 |
| WO | WO 2011/082855 | A2 | 7/2011 |
| WO | WO 2011/082856 | A2 | 7/2011 |
| WO | WO 2011/128133 | A1 | 10/2011 |
| WO | WO 2012/016735 | A1 | 2/2012 |
| WO | WO 2012/038162 | A1 | 3/2012 |
| WO | WO 2013/056900 | A2 | 4/2013 |
| WO | WO 2014/151178 | A2 | 9/2014 |
| WO | WO 2014/193254 | A1 | 12/2014 |
| WO | WO 2016/018830 | A1 | 2/2016 |
| WO | WO 2016/030144 | A1 | 3/2016 |
| WO | 2016/111106 | A1 | 7/2016 |
| WO | WO 2018/072837 | A1 | 4/2018 |
| WO | WO 2018/095552 | A1 | 5/2018 |
| WO | WO 2018/154206 | | 8/2018 |
| WO | WO 2018/193173 | | 10/2018 |
| WO | WO 2018/210451 | A1 | 11/2018 |
| WO | WO 2018/210452 | A1 | 11/2018 |
| WO | WO 2018/231810 | A1 | 12/2018 |
| WO | WO 2018/232403 | A1 | 12/2018 |

(56) References Cited

FOREIGN PATENT DOCUMENTS

| | | | |
|---|---|---|---|
| WO | WO 2018/233871 | A1 | 12/2018 |
| WO | WO 2019/020215 | A1 | 1/2019 |
| WO | WO 2019/161875 | A1 | 8/2019 |
| WO | WO 2019/166733 | A1 | 9/2019 |
| WO | WO 2019/180699 | A1 | 9/2019 |
| WO | WO 2019/183553 | A1 | 9/2019 |
| WO | WO 2020/078580 | A1 | 4/2020 |
| WO | WO 2020/205511 | A1 | 10/2020 |
| WO | WO 2020/205574 | A1 | 10/2020 |
| WO | WO 2020/243655 | A1 | 12/2020 |
| WO | WO 2021/056102 | A1 | 4/2021 |
| WO | WO 2021/077213 | A1 | 4/2021 |
| WO | 2022/040034 | A1 | 2/2022 |

OTHER PUBLICATIONS

De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.
EP, 18816636.7 Extended Search Report, Feb. 19, 2021.
EP, 18817541.8 Supplementary Search Report, Jan. 20, 2021.
EP, 18817541.8 Written Opinion, Feb. 2, 2021.
SG, 11201912049P Written Opinion, Mar. 10, 2021.
WO, PCT/US18/37081 ISR and Written Opinion, Oct. 17, 2018.
WO, PCT/US18/38089 ISR and Written Opinion, Oct. 29, 2018.
WO, PCT/US19/23695 ISR and Written Opinion, Aug. 12, 2019.
WO, PCT/US21/27159 ISR and Written Opinion, Sep. 1, 2021.
WO, PCT/US21/32295 ISR and Written Opinion, Sep. 14, 2021.
WO, PCT/US21/27154 ISR and Written Opinion, Oct. 14, 2021.
Bode, G.H., et al., "Hysteresis Current Regulation For Single-Phase Multilevel Inverters Using Asynchronous State Machines", 29$^{th}$ Annual Conference of the IEEE Industrial Electronics Society, Piscataway, NJ, 2003, pp. 1203-4208.
"Capacitor Voltage Control Technique For A Modular Converter", An IP.com Prior Art Database Technical Disclosure, Jun. 10, 2015, pp. 1-7.
Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.
Debnath, S., et al., "Operation, Control, and Applications of the Modular Multilevel Converter: A Review", IEEE Transactions on Power Electronics, 2015, vol. 30, No. 1, pp. 37-53.
Farr, E., et al., "A Sub-module Capacitor Voltage Balancing Scheme for the Alternate Arm Converter (AAC)", 15$^{th}$ European Conference on IEEE Power Electronics and Applications, 2013, pp. 1-10.
Gelman, V., "Energy Storage That May Be Too Good to Be True", IEEE Vehicular Technology Magazine, 2031, pp. 70-80.
Gupta, R., et al., "Cascaded Multilevel Control of DSTATCOM Using Multiband Hysteresis Modulation", IEEE Power Engineering Society General Meeting, Piscataway, NJ, 2006, pp. 1-7.
Hassanpoor, A., et al., "Tolerance Band Modulation Methods for Modular Multilevel Converters", IEEE Transactions on Power Electronics, 2015, vol. 30, No. 1, pp. 311-326.
Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.
Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.
Khoshkbar-Sadigh, A., et al., "Thermal and Performance Comparison of Active Neutral-Point-Clamped (ANPC) and Dual Flying-Capacitor Anpc (Dfc-Anpc) Inverters", IEEE Energy Conversion Congress and Exposition (ECCE), 2019, pp. 5522-5528.
Konstantinou, G., et al., "A Hybrid Modular Multilevel Converter with Partial Embedded Energy Storage", Energies, 2016, vol. 9, No. 12, pp. 1-18.
Li, N., et al., "SOH Balancing Control Method for the MMC Battery Energy Storage System", IEEE Transactions on Industrial Electronics, 2018, vol. 65, No. 8, pp. 6581-6591.
Loh, P. C., et al., "A Reduced Common Mode Hysteresis Current Regulation Strategy for Multilevel Inverters", 18$^{th}$ Annual IEEE Applied Power Electronics Conference and Exposition, Miami Beach, FL, 2003, vol. 1, pp. 576-582.
Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.
Maharjan, L., et al., "State-of-Charge (SOC)-Balancing Control of a Battery Energy Storage System Based on a Cascade PWM Converter", IEEE Transactions On Power Electronics, 2009, vol. 24, No. 6, pp. 1628-1636.
Maharjan, L., et al., "Fault-Tolerant Operation of a Battery-Energy-Storage System Based on a Multilevel Cascade PWM Converter With Star Configuration", IEEE Transactions On Power Electronics, 2010, vol. 25, No. 9, pp. 2386-2396.
Méllo, J.P.R., et al., "Multilevel Reduced Controlled Switches AC-DC Power Conversion Cells", IEEE Energy Conversion Congress and Exposition (ECCE), 2015, pp. 3815-3822.
Naderi, R., et al., "Phase-Shifted Carrier PWM Technique for General Cascaded Inverters", IEEE Transactions On Power Electronics, 2008, vol. 23, No. 3, pp. 1257-1269.
Naderi, R., et al., "A Correction to the State-Machine-Decoder for Stacked Multicell Converters", IEEE Applied Power Electronics Conference and Exposition (APEC), 2014, pp. 1545-1549.
Naderi, R., et al., "A New Hybrid Active Neutral Point Clamped Flying Capacitor Multilevel Inverter", IEEE Applied Power Electronics Conference and Exposition (APEC), 2015, pp. 794-798.
Naderi, R., et al., "Dual Flying Capacitor Active-Neutral-Point-Clamped Multilevel Converter", IEEE Transactions On Power Electronics, 2016, vol. 31, No. 9, pp. 6476-6484.
Naderi, R., "Battery Management Converter System and Multilevel Converter Topology and Control", 2016, Dissertation at the University of California, Irvine, pp. 1-211.
P., S., et al., "Seven Level Inverter Topologies: A Comparative Study", International Journal of Innovative Research in Electrical, Electronics, Instrumentation and Control Engineering, 2016, vol. 3, No. 1, pp. 148-162.
Sangiri, J. B., et al., "Modular Multilevel Converter for Multifunctional Battery Management System of Electric Vehicle", 44th Annual Conference of the IEEE Industrial Electronics Society, 2018, pp. 1333-1338.
Shimada, M., et al., "Energy-saving Technology for Railway Traction Systems Using Onboard Storage Batteries", Hitachi Review, 2012, vol. 61, No. 7, pp. 312-318.
Tajeddine, K., et al., "A Cascaded H-Bridge Multilevel Inverter with SOC Battery Balancing", International Journal of Advanced Computer Science and Applications, 2017, vol. 8, No. 12, pp. 345-350.
Varghese, K., "Implementation Of Single Phase Seven Level Cascaded Multilevel Inverter With Reduced No Of Switches", Project Report'15, retrieved from https://www.academia.edu/12826368/single_phase_seven_level_cascaded_multilevel_inverter, pp. 1-45.
Venu, K., et al., "A Seven Level Single-Phase Cascaded Inverter with Improved Efficiency", International Journal & Magazine of Engineering, Technology, Management and Research, 2016, vol. 3, No. 10, pp. 243-249.
Wu, B., et al., "Analysis of a distributed maximum power point tracking tracker with low input voltage ripple and flexible gain range", IET Power Electron., 2016, vol. 9, No. 6, pp. 1220-1227.
Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.
WO, PCT/US20/35437 ISR and Written Opinion, Oct. 8, 2020.
WO, PCT/US21/52221 ISR and Written Opinion, Feb. 3, 2022.

(56) References Cited

OTHER PUBLICATIONS

Chen, LR, et al., “Sinusoidal-Ripple-Current Charging Strategy and Optimal Charging Frequency Study for Li-Ion Batteries”, IEEE Transactions on Industrial Electronics, 2013, vol. 60, No. 1, pp. 88-97.
Dai, H., et al., “Impedance Characterization and Modeling of Lithium-Ion Batteries Considering the Internal Temperature Gradient”, Energies, 2018, vol. 11, No. 1, pp. 1-18.
Kalker, S., et al., “Fast-Charging Technologies, Topologies, and Standards”, E.ON Energy Research Center Series, 2018, vol. 10, No. 1, pp. 1-94.
“Lithium-Ion Battery Pulse Charger with Overcurrent Protection”, Linear Technology, 2001, pp. 1-12.
Niroshana, I., et al., “An Adaptive Pulse Charging Algorithm for Lithium Batteries”, Conference on Electrical Engineering/Electronics, Computer, Telecommunications and Information Technology, 2017, pp. 218-221.
Ronanki, D., et al., “Extreme Fast Charging Technology-Prospects to Enhance Sustainable Electric Transportation”, Energies, 2019, vol. 12, No. 19, pp. 1-17.
Tan, L., et al., “A Bipolar-DC-Bus EV Fast Charging Station with intrinsic DC-Bus Voltages Equalization and Minimized Voltage Ripples”, IEEE Industrial Electronics Society, Nov. 9-12, 2015, Yokohama, Japan, pp. 002190-002195.
Tu, H., et al., “Extreme Fast Charging of Electric Vehicles: A Technology Overview”, IEEE Transactions on Transportation Electrification, 2019, vol. 5, No. 4, pp. 861-878.
Extended Search Report in European Appln. No. 21873604.9, dated Nov. 18, 2024, 12 pages.
Lee et al., “Electrochemical State-Based Sinusoidal Ripple Current Charging Control,” IEEE Transactions on Power Electronics, Aug. 1, 2015, 30(8):4232-4243.
English Translation of JP Office Action dated Jun. 26, 2025 for JP Application No. 2023519227, 14 page(s).
JP Office Action Mailed on Jun. 26, 2025 for JP Application No. 2023519227, 8 page(s).
English translation of JP Decision to Grant dated Feb. 10, 2026 for JP Application No. 2023519227, 2 page(s).
JP Decision to Grant Mailed on Feb. 20, 2026 for JP Application No. 2023519227, 3 page(s).

* cited by examiner

1200

PULSED CHARGING AND HEATING TECHNIQUES FOR ENERGY SOURCES

CROSS-REFERENCE TO RELATED APPLICATIONS

This application claims the benefit of, and priority to, U.S. Provisional Application No. 63/084,352, filed Sep. 28, 2020, and U.S. Provisional Application No. 63/119,504, filed Nov. 30, 2020, both of which are incorporated by reference herein in their entireties and for all purposes.

FIELD

The subject matter described herein relates generally to pulsed charging of energy sources in energy storage systems used in both mobile and stationary applications.

BACKGROUND

Electrical energy storage systems are an important facet in the worldwide transition to cleaner forms of energy. Electrical energy storage systems are found in a host of stationary and mobile applications. An electrical energy storage system in the form of a battery pack or rack can be used to power hybrid and fully electric vehicles, and can be used to store power generated by the vehicle (e.g., through the use of regenerative braking).

Electrical energy storage systems require periodic charging to replenish the discharged power. A number of deficiencies and problems associated with existing charging methods have been identified, such as thermal losses, degradation, and slow rate of charge. For example, it is well known that lengthy charge times for electric vehicles (EVs) are a major factor limiting their wide spread adoption. Use of a conventional constant current charging method can take multiple hours to fully charge a battery pack. Such long wait times create substantial inconvenience and inefficiency when using EVs for travel outside the range of one charge for the EV. As such, conventional EVs are most typically used for local commuting, or trips that can be completed without requiring a recharge of the battery pack. To the extent charge stations capable of charging at higher voltage in less time exist, repeated use of such stations can result in dramatically reduced lifetime of the battery pack. For these and other reasons, needs exist for improved systems, devices, and methods for fast or rapid charging of electrical energy storage systems.

SUMMARY

Example embodiments of systems, devices, and methods are described herein for fast charging of energy sources in isolation or as part of an energy storage system (e.g., a battery pack of an electric vehicle, a stationary system to drive a microgrid, and others). The embodiments described herein can include heating an energy source through application of a preheating signal that raises the source temperature and lowers the overall impedance of the energy source such that accelerated electrochemical reactions are possible through subsequent charging. The embodiments can include charging an energy source with charge pulses at a frequency that passes a double sheet capacitance of the energy source and reduces an activation impedance of the source, permitting charging of the source at higher C rates without degradatory reactions. The embodiments can also include a combination of a pulse preheating phase or a pulse charging phase with a constant current (or non-pulsed) charging phase at higher temperatures, and certain embodiments can include at least one instance of all three phases. The embodiments described herein are particularly suitable for application within cascaded modular energy storage systems where each module includes an energy source and switch circuitry capable of applying current in a pulsed manner for preheating and/or charging. Embodiments for monitoring the energy source to detect potentially degradatory conditions such as uneven lithiation and lithium plating are also disclosed.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
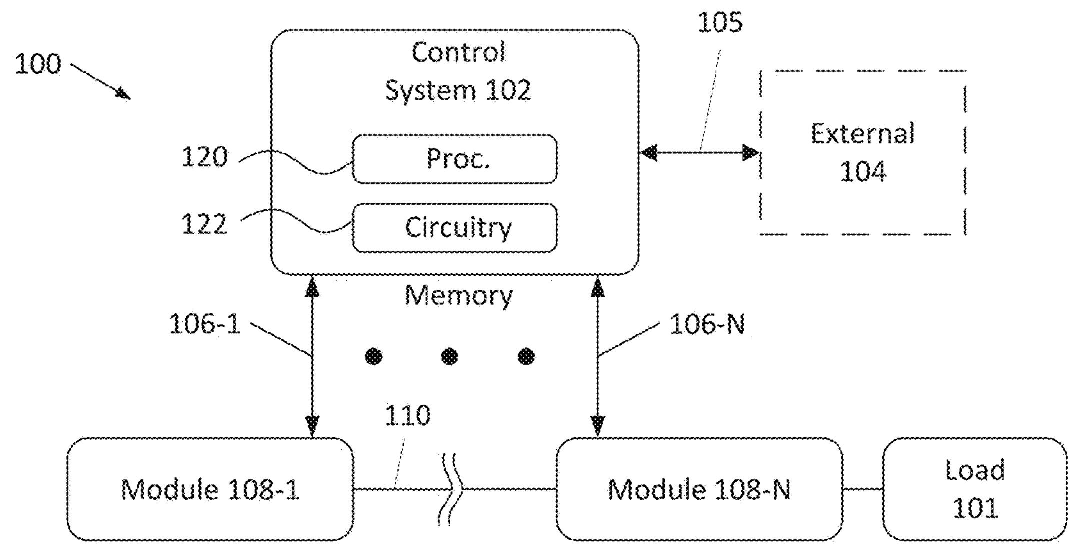
FIGS. 1A-1C are block diagrams depicting example embodiments of a modular energy system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Before describing the example embodiments pertaining to charging and discharging modular energy systems, it is first useful to describe these underlying systems in greater detail. With reference to FIGS. 1A through 10F, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, micro-grid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Examples of Module-Based Energy Systems

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 (e.g., a utility operated grid, a micro-grid, a local renewable energy source, etc.) and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
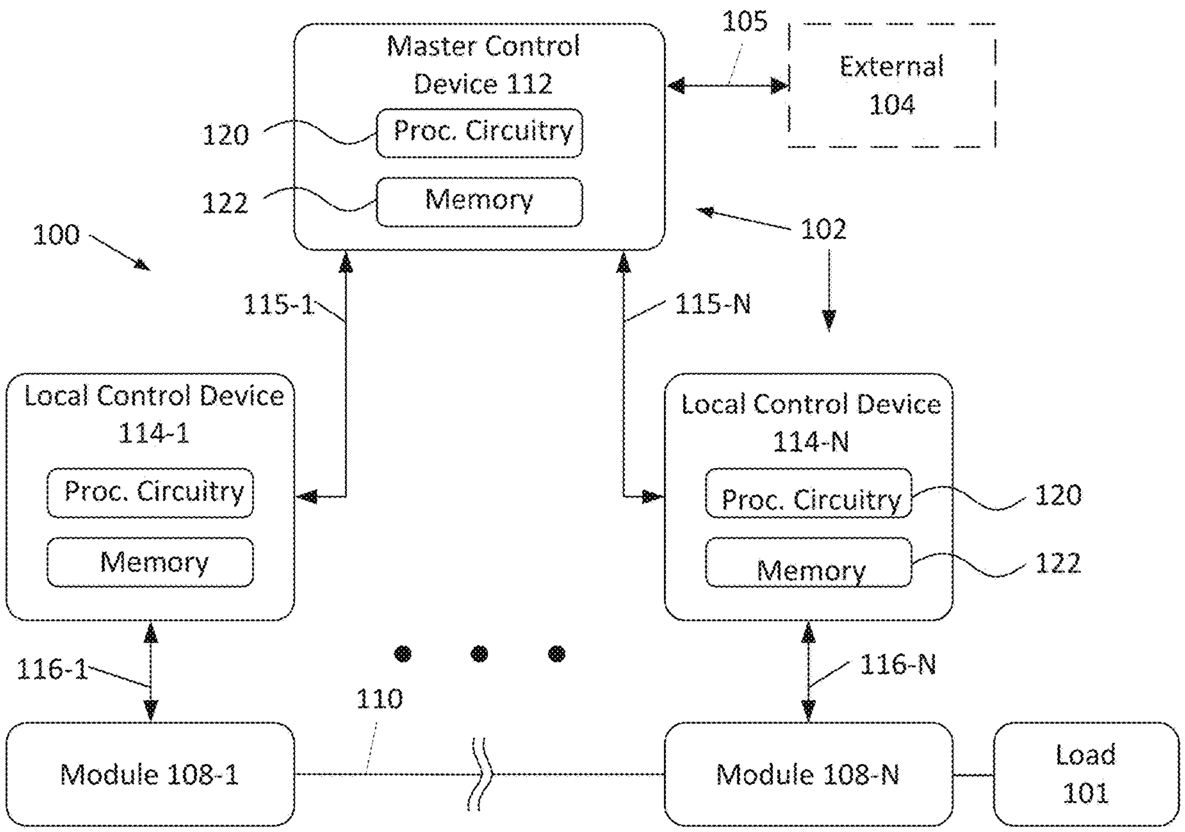

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

Figure 1C:
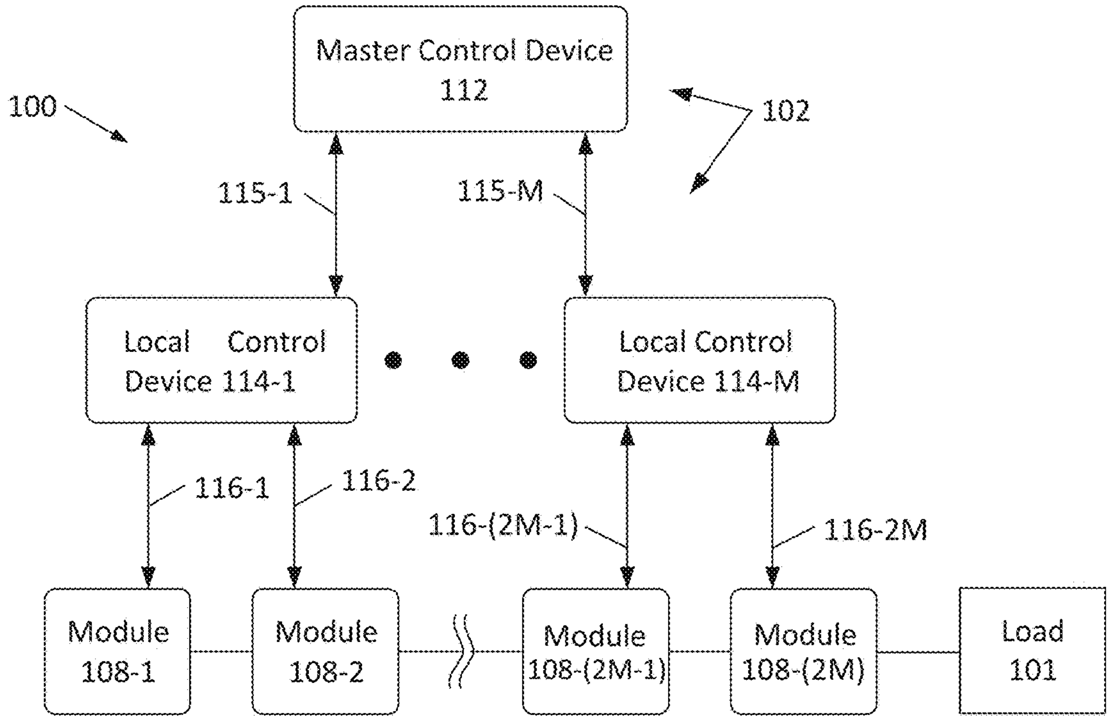

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data can be communicated in a standardized (e.g., IEEE, ANSI) or custom (e.g., proprietary) format. In automotive applications, communication paths 115 can be configured to communicate according to FlexRay or CAN protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information received from the same or different one or more of modules 108. Control can also be based on one or more other factors, such as requirements of load 101. Controllable aspects include, but are not limited to, one or more of voltage, current, phase, and/or output power of each module 108.

Status information of every module 108 in system 100 can be communicated to control system 102, from which system 102 can independently control every module 108-1 . . . 108-N. Other variations are possible. For example, a particular module 108 (or subset of modules 108) can be controlled based on status information of that particular module 108 (or subset), based on status information of a different module 108 that is not that particular module 108 (or subset), based on status information of all modules 108 other than that particular module 108 (or subset based on status information of that particular module 108 (or subset) and status information of at least one other module 108 that is not that particular module 108 (or subset), or based on status information of all modules 108 in system 100.

The status information can be information about one or more aspects, characteristics, or parameters of each module 108. Types of status information include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, and/or the presence of absence of a fault in any one or more of the components of the module.

LCDs 114 can be configured to receive the status information from each module 108, or determine the status information from monitored signals or data received from or within each module 108, and communicate that information to MCD 112. In some embodiments, each LCD 114 can communicate raw collected data to MCD 112, which then algorithmically determines the status information on the basis of that raw data. MCD 112 can then use the status information of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information and assess that information to determine a difference between at least one module 108 (e.g., a component thereof) and at least one or more other modules 108 (e.g., comparable components thereof). For example, MDC 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information for that module 108 indicates it to be operating in violation (e.g., above or below) of a predetermined threshold or limit, or outside of a predetermined range of acceptable operating conditions. Similarly, MCD 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation between modules 108 that would otherwise exist.

MCD 112 can communicate control information to LCD 114 for the purpose of controlling the modules 108 associated with the LCD 114. The control information can be, e.g., a modulation index and a reference signal as described herein, a modulated reference signal, or otherwise. Each LCD 114 can use (e.g., receive and process) the control information to generate switch signals that control operation of one or more components (e.g., a converter) within the associated module(s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (system or subsystem), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

Figure 1D:
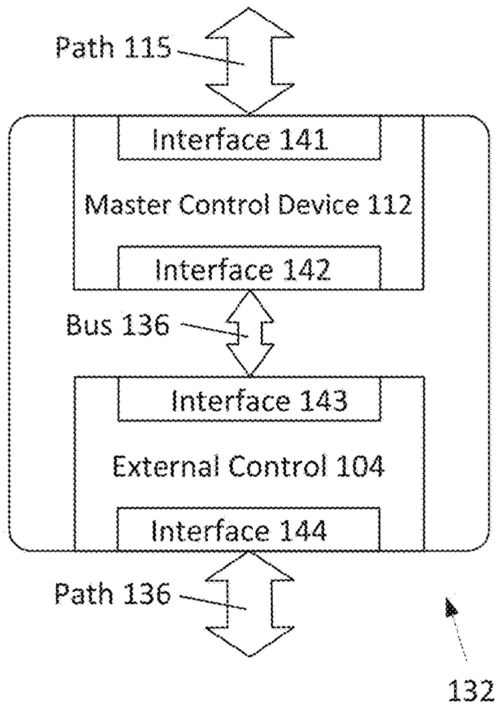
FIGS. 1D-1E are block diagrams depicting example embodiments of control devices for an energy system.
Figure 1E:
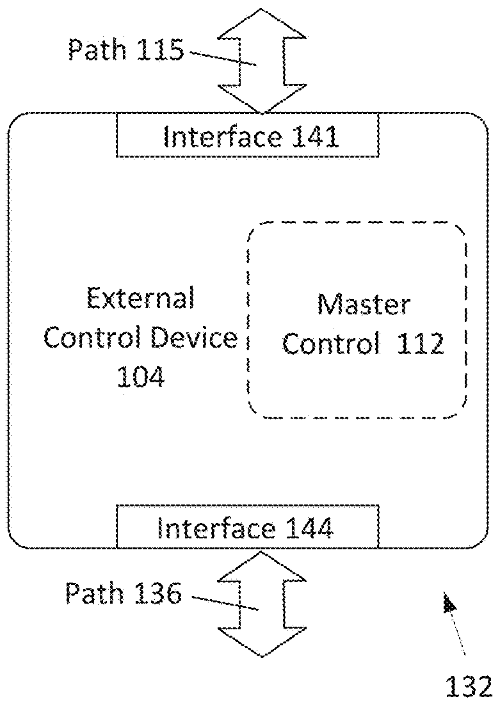
Figure 1F:
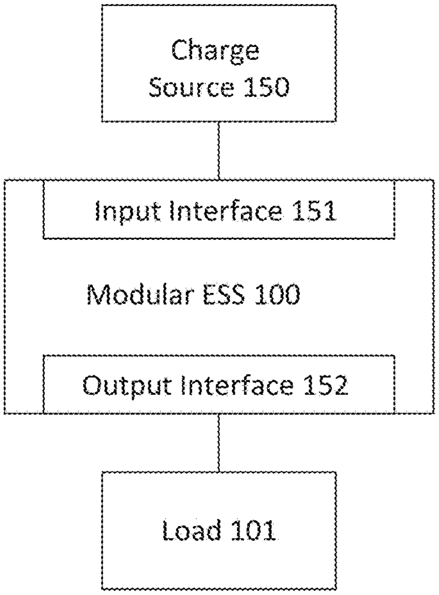
FIGS. 1F-1G are block diagrams depicting example embodiments of modular energy systems coupled with a load and a charge source.
Figure 1G:
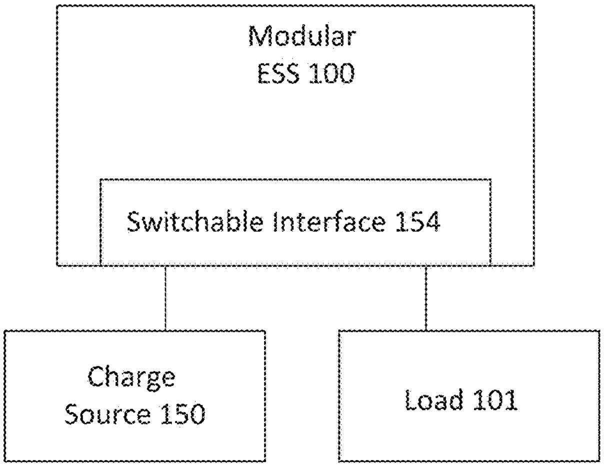

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or subsystem) 132. In some embodiments, local control functionality is implemented within a device shared with another component of each module 108, such as a Battery Management System (BMS).

Examples of Modules within Cascaded Energy Systems

Figure 2A:
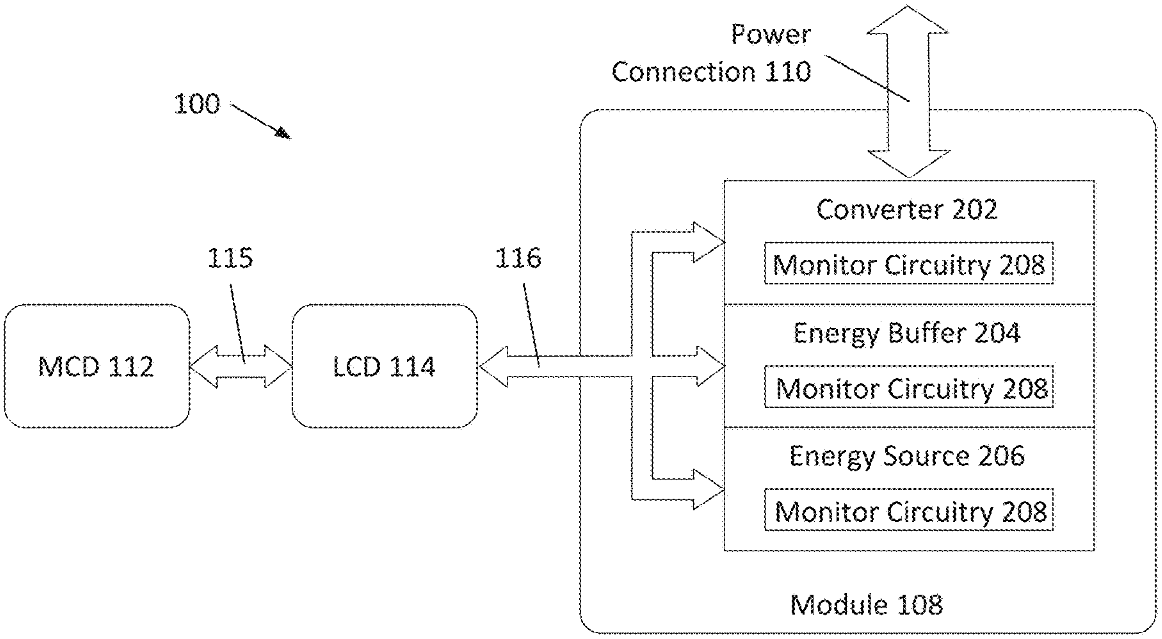
FIGS. 2A-2B are block diagrams depicting example embodiments of a module and control system within an energy system.
Figure 2B:
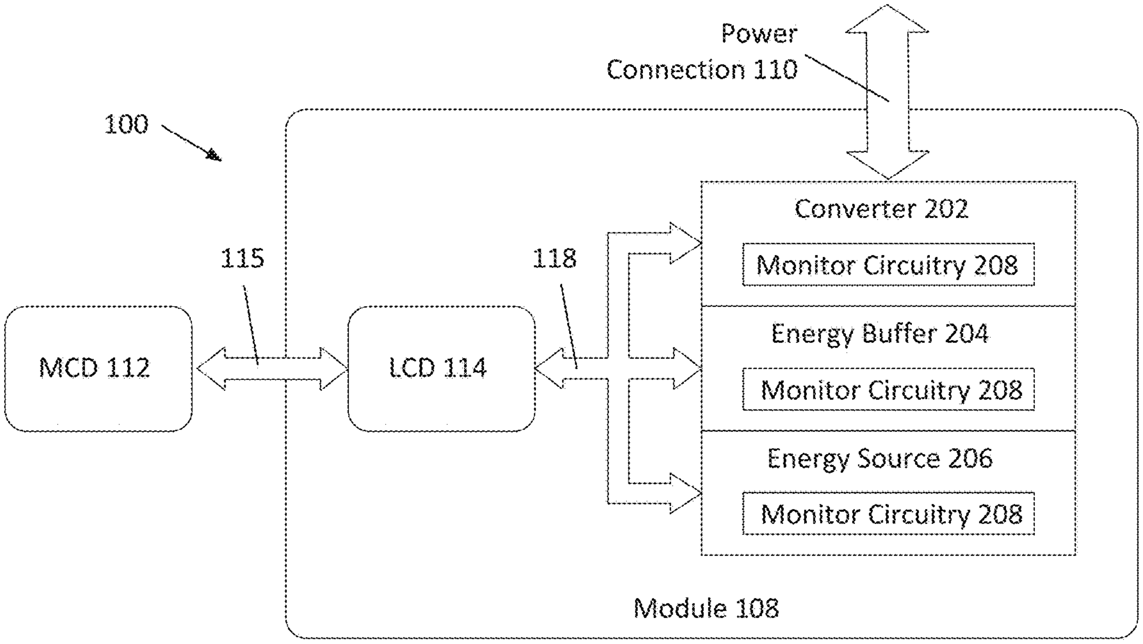

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 204 into an alternating current (AC) signal and output it over power connection 110 (e.g., an inverter). Converter 202 can also receive an AC or DC signal over connection 110 and apply it to energy source 204 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Energy source 206 is preferably a robust energy storage device capable of outputting direct current and having an energy density suitable for energy storage applications for electrically powered devices. The fuel cell can be a single fuel cell, multiple fuel cells connected in series or parallel, or a fuel cell module. Two or more energy sources can be included in each module, and the two or more sources can include two batteries of the same or different type, two capacitors of the same or different type, two fuel cells of the same or different type, one or more batteries combined with one or more capacitors and/or fuel cells, and one or more capacitors combined with one or more fuel cells.

Figure 4A:
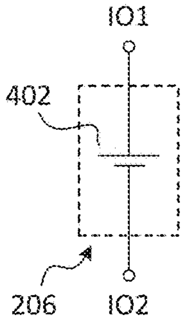
FIGS. 4A-4F are schematic views depicting example embodiments of energy sources.
Figure 4B:
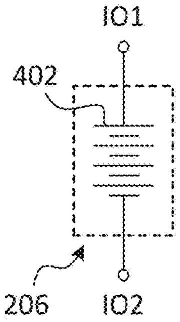
Figure 4C:
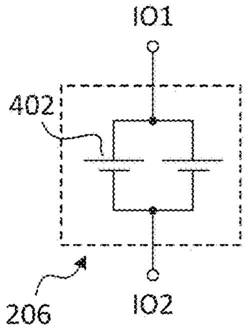
Figure 4D:
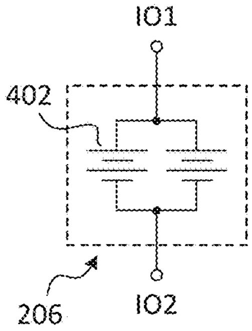

Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of four cells 402 (FIG. 4B), a battery module with a parallel connection of single cells 402 (FIG. 4C), and a battery module with a parallel connection with legs having two cells 402 each (FIG. 4D). Examples of battery types are described elsewhere herein.

Energy source 206 can also be a high energy density (HED) capacitor, such as an ultracapacitor or supercapacitor. An HED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Energy source 206 can also be a fuel cell. Examples of fuel cells include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of batteries, capacitors, and fuel cells are not intended to form an exhaustive list, and those of ordinary skill in the art will recognize other variants that fall within the scope of the present subject matter.

Energy buffer 204 can dampen or filter fluctuations in current across the DC line or link (e.g., $+V_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports IO3 and IO4 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information (or can be used to determine status information by, e.g., LCD 114). A main function of the status information is to describe the state of the one or more energy sources 206 of the module 108 to enable determinations as to how much to utilize the energy source in comparison to other sources in system 100, although status information describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuitry 208 can be separate from the various components 202, 204, and 206, or can be integrated with each component 202, 204, and 206 (as shown in FIG. 2A-2B), or any combination thereof. In some embodiments, monitor circuitry 208 can be part of or shared with a Battery Management System (BMS) for a battery energy source 204. Discrete circuitry is not needed to monitor each type of status information, as more than one type of status information can be monitored with a single circuit or device, or otherwise algorithmically determined without the need for additional circuits.

LCD 114 can receive status information (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information from module components. For example, LCD 114 can cause the status information to be transmitted over paths 116, 118 by requesting the status information directly, or by applying a stimulus (e.g., voltage) to cause the status information to be generated, in some cases in combination with switch signals that place converter 202 in a particular state.

Figure 2C:
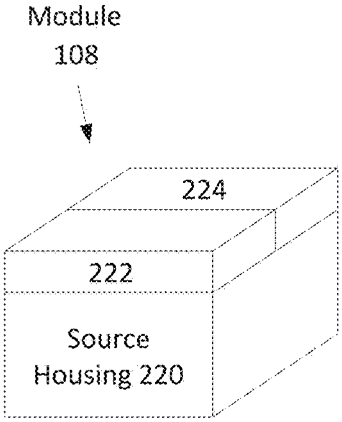
FIG. 2C is a block diagram depicting an example embodiment of a physical configuration of a module.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry, a second housing 222 that holds module electronics such as converter 202, energy buffer 204, and other accompany electronics such as monitor circuitry, and a third housing 224 that holds LCD 114 for the module 108. Electrical connections between the various module components can proceed through the housings 220, 222, 224 and can be exposed on any of the housing exteriors for connection with other devices such as other modules 108 or MCD 112.

Figure 2D:
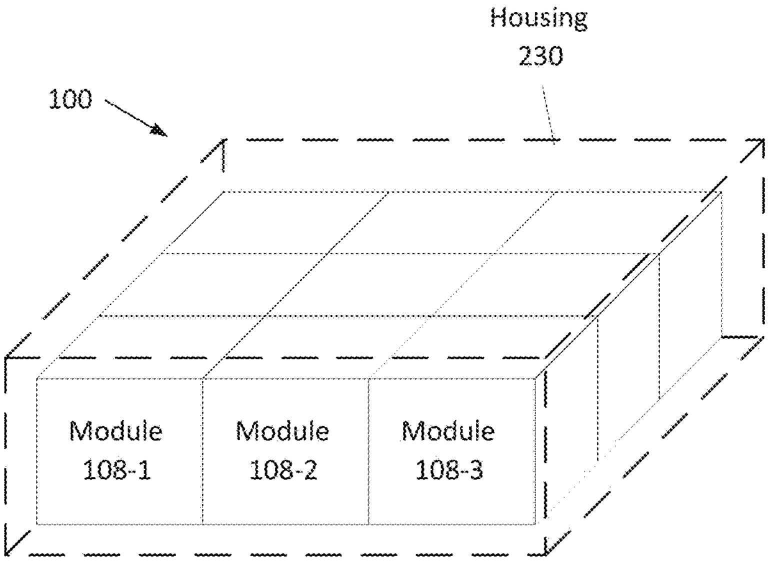
FIG. 2D is a block diagram depicting an example embodiment of a physical configuration of a modular energy system.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
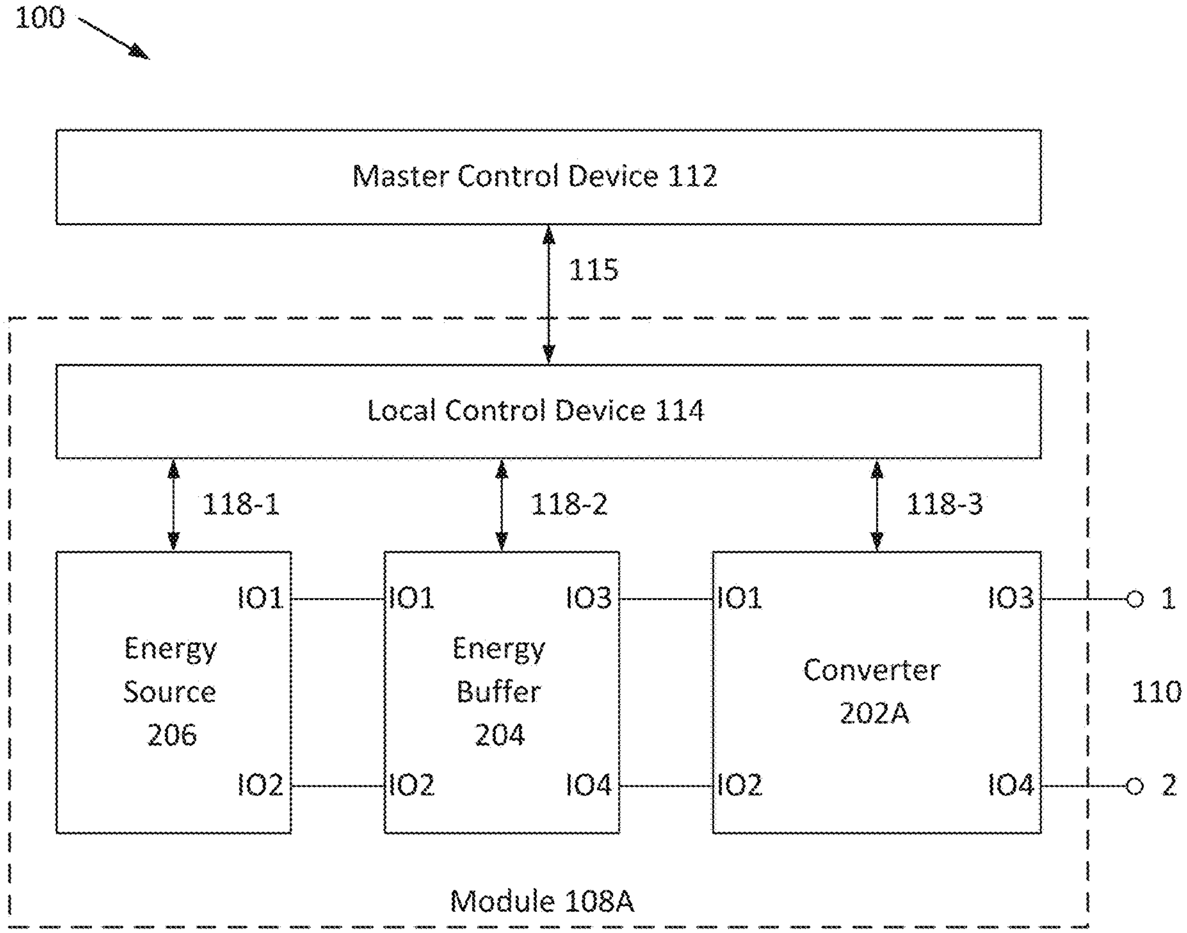
FIGS. 3A-3C are block diagrams depicting example embodiments of modules having various electrical configurations.
Figure 3B:
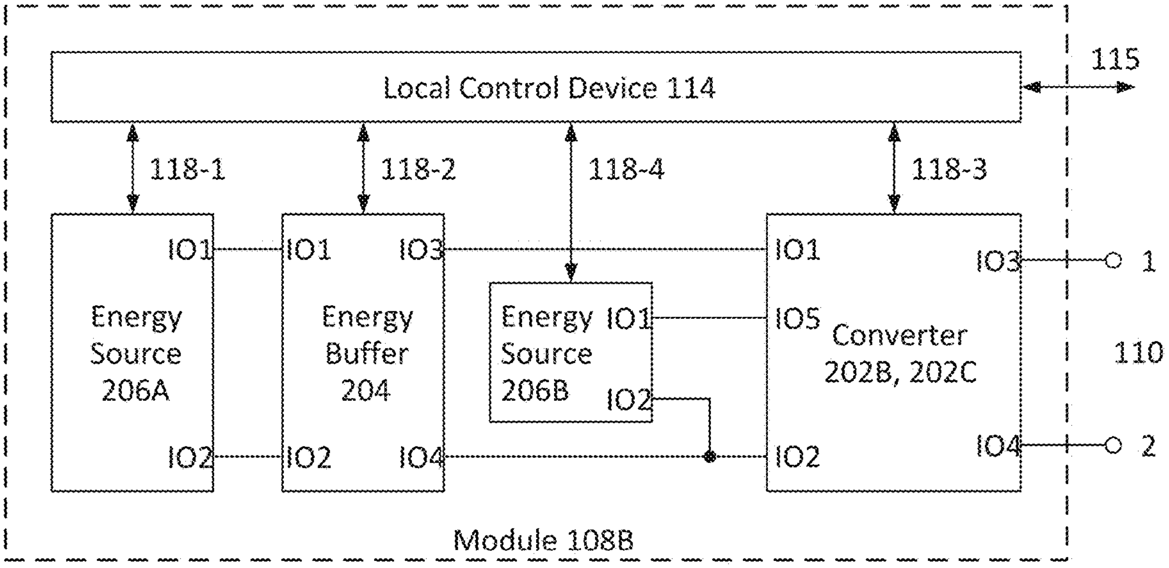
Figure 3C:
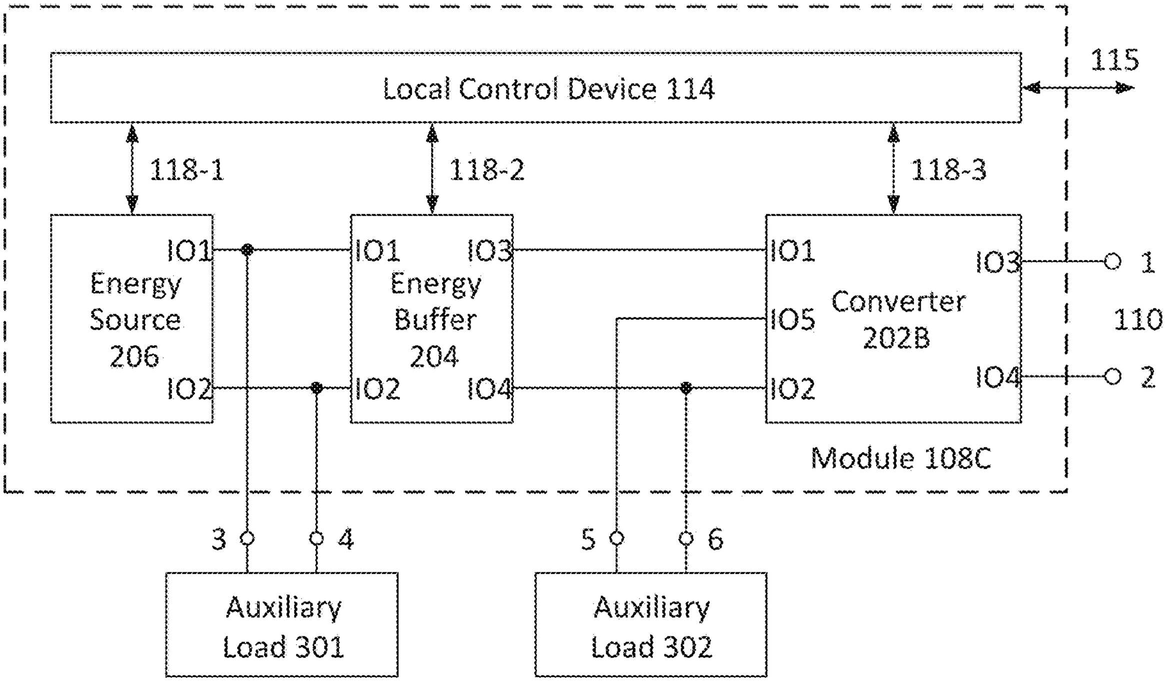

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Figure 5A:
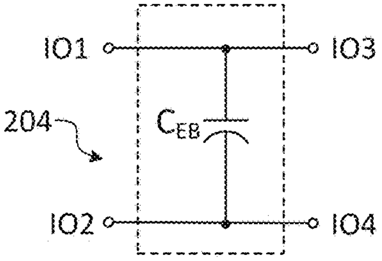
FIGS. 5A-5C are schematic views depicting example embodiments of energy buffers.
Figure 5B:
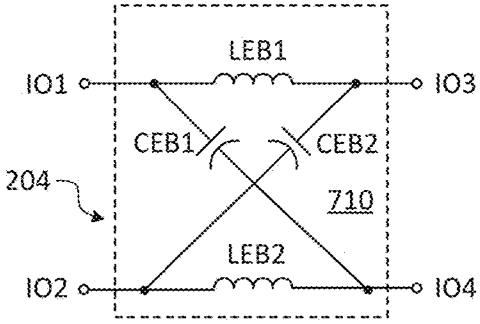
Figure 5C:
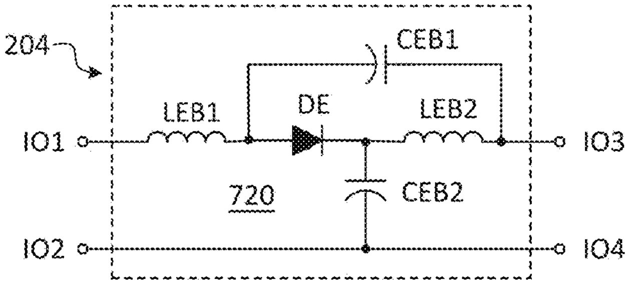

Energy source 206 can be configured as any of the energy source types described herein (e.g., a battery as described with respect to FIGS. 4A-4D, an HED capacitor, a fuel cell, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
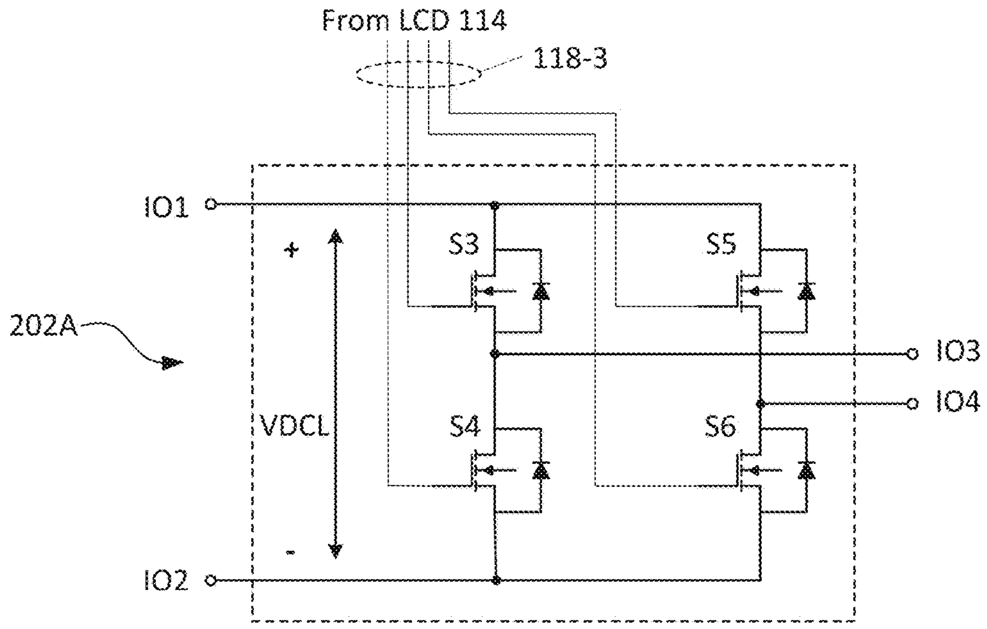
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports IO1 and IO2 and switch to generate pulses at ports IO3 and IO4. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports IO3 and IO4 by different combinations of switches S3, S4, S5, S6, converter 202 can generate three different voltage outputs at ports IO3 and IO4: $+V_{DCL}$, 0, and $-V_{DCL}$. A switch signal provided to each switch controls whether the switch is on (closed) or off (open). To obtain $+V_{DCL}$, switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and IO4 of converter 202 can be connected to (or form) module IO ports 1 and 2 of power connection 110, so as to generate the output voltage for use with output voltages from other modules 108.

Figure 8A:
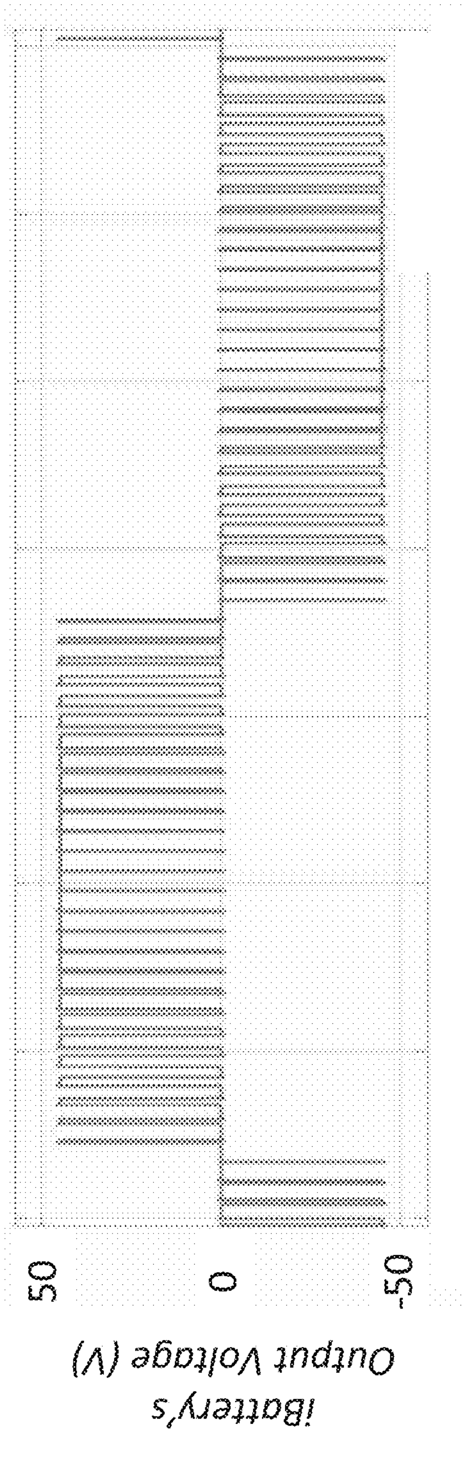
FIG. 8A is a plot depicting an example output voltage of a module.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange energy between them, e.g., one source 206 can charge another source 206. Each of the sources 206 can be configured as any energy source described herein (e.g., battery, HED capacitor, fuel cell). Each of the sources 206 can be the same type (e.g., each can be a battery), or a different type (e.g., a first source can be a battery and a second source can be an HED capacitor, or a first source can be a battery having a first type (e.g., NMC) and a second source can be a battery having a second type (e.g., LFP).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports IO5 and IO2, respectively, of converter 202B (also connected to port IO4 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

Figure 4E:
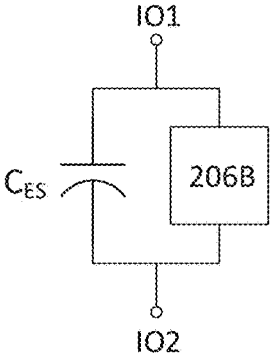
Figure 4F:
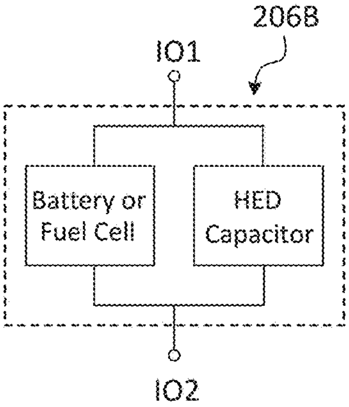

As mentioned both primary source 206A and secondary source 206B can be utilized simultaneously or at separate times depending on the switch state of converter 202B. If at the same time, an electrolytic and/or a film capacitor ($C_{ES}$) can be placed in parallel with source 206B as depicted in FIG. 4E to act as an energy buffer for the source 206B, or energy source 206B can be configured to utilize an HED capacitor in parallel with another energy source (e.g., a battery or fuel cell) as depicted in FIG. 4F.

Figure 6B:
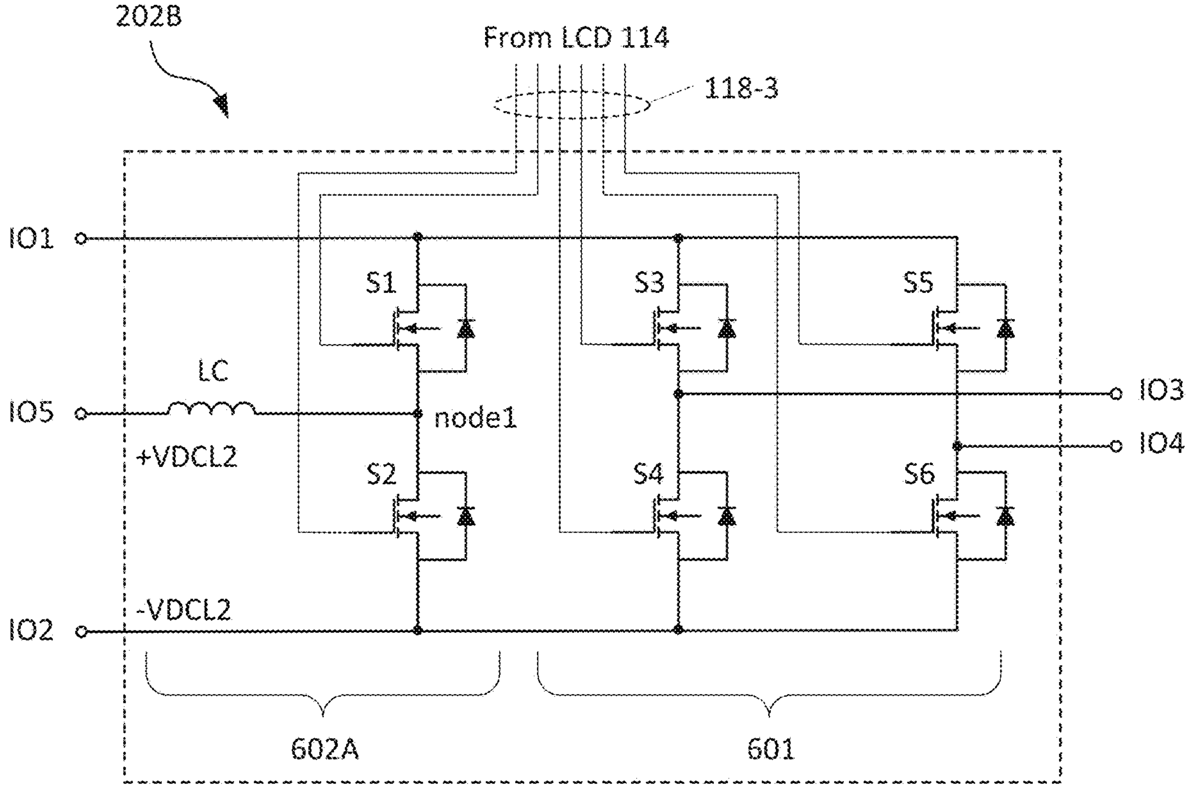
Figure 6C:
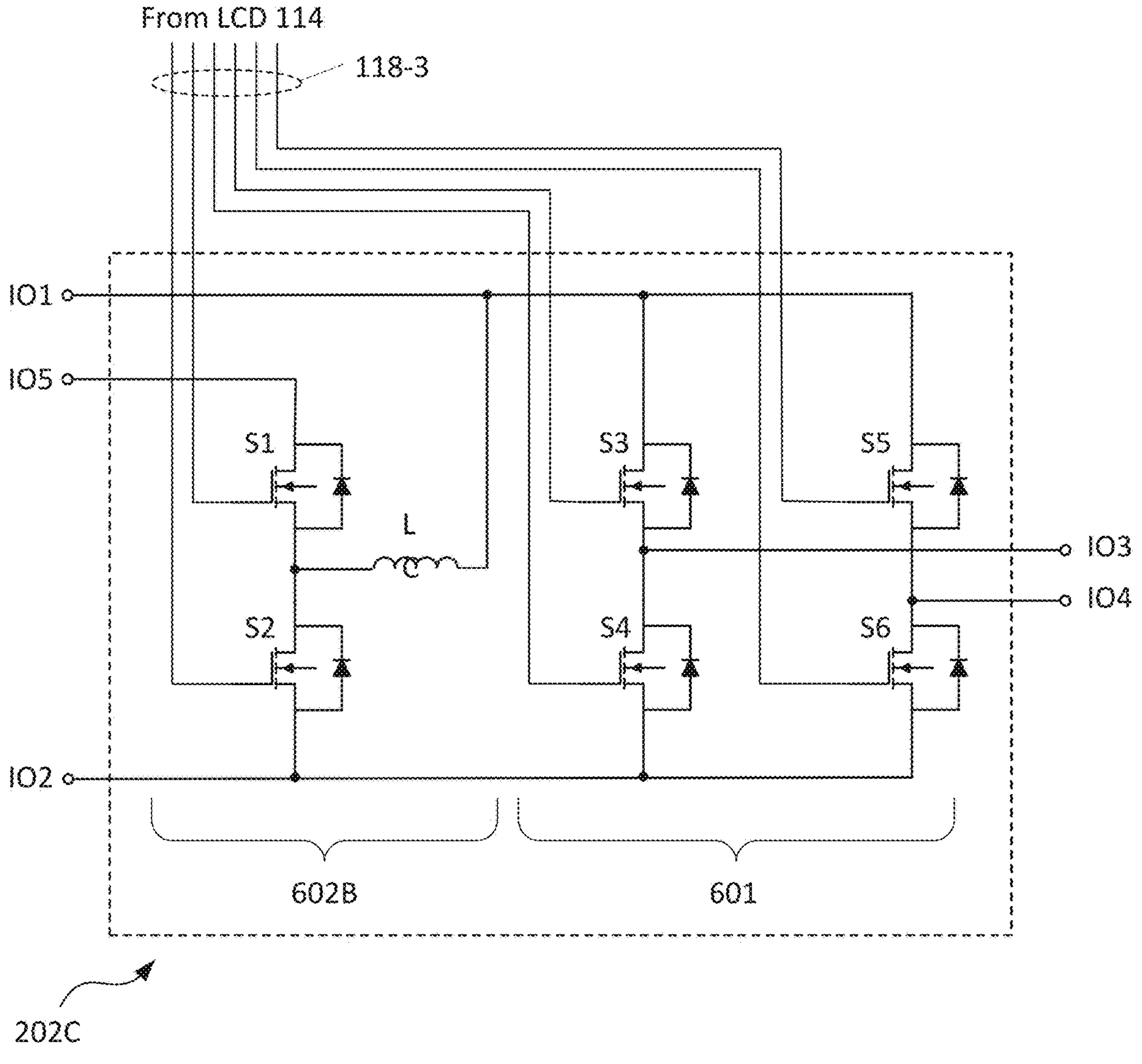

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple IO1 and IO2 to either of IO3 and IO4, thereby changing the output voltages of module 108B. Portion 602A includes switches S1 and S2 configured as a half bridge and coupled between ports IO1 and IO2. A coupling inductor $L_C$ is connected between port IO5 and a nodel present between switches S1 and S2 such that switch portion 602A is a bidirectional converter that can regulate (boost or buck) voltage (or inversely current). Switch portion 602A can generate two different voltages at nodel, which are $+V_{DCL2}$ and 0, referenced to port IO2, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports IO5 and IO2. A coupling inductor $L_C$ is connected between port IO1 and a node 1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. The active filtering function can also be performed by modules having a typical electrolytic capacitor instead of a secondary energy source. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206. Source 206 can output power to both power connection 110 and load 301. Second auxiliary load 302 requires a constant voltage lower than that of source 206. Load 302 is coupled to IO ports 5 and 6 of module 108C, which are coupled to ports IO5 and IO2, respectively, of converter 202B. Converter 202B can include switch portion 602 having coupling inductor $L_C$ coupled to port IO5 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port IO5 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, overvoltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information; and/or transmission of the status information to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between IO1 and IO2 or between IO3 and IO4). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information, with which LCD 114 can perform one or more of the following: set or output a warning or alarm indication; communicate the status information to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Examples of Cascaded Energy System Topologies

Figure 7A:
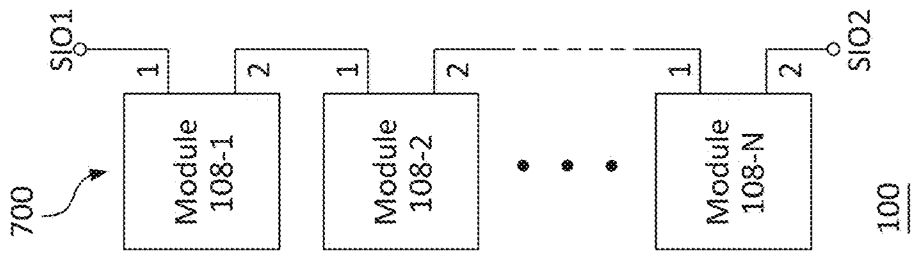
FIGS. 7A-7E are block diagrams depicting example embodiments of modular energy systems having various topologies.
Figure 8B:
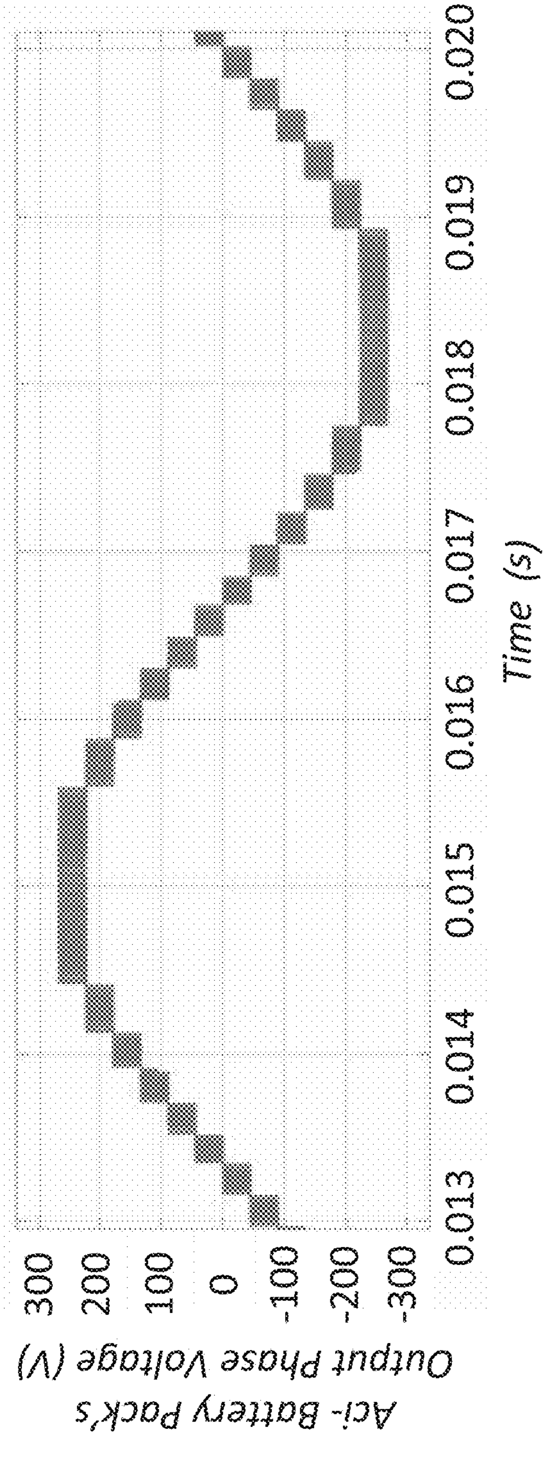
FIG. 8B is a plot depicting an example multilevel output voltage of an array of modules.

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 . . . 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal 801 produced by a single module 108 having a 48 volt energy source. FIG. 8B is a plot of voltage versus time depicting an example single phase AC output signal 802 generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

Figure 7B:
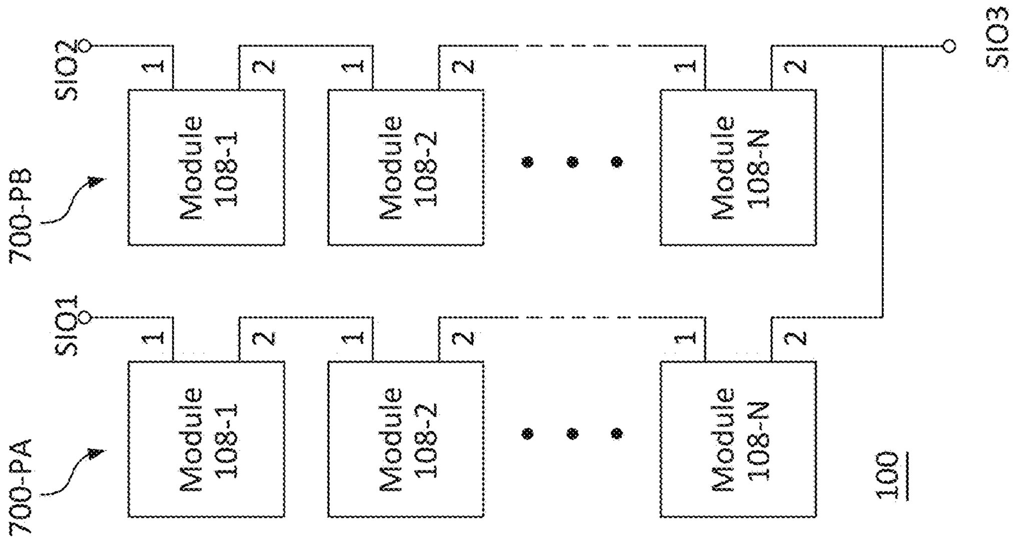

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

Figure 7C:
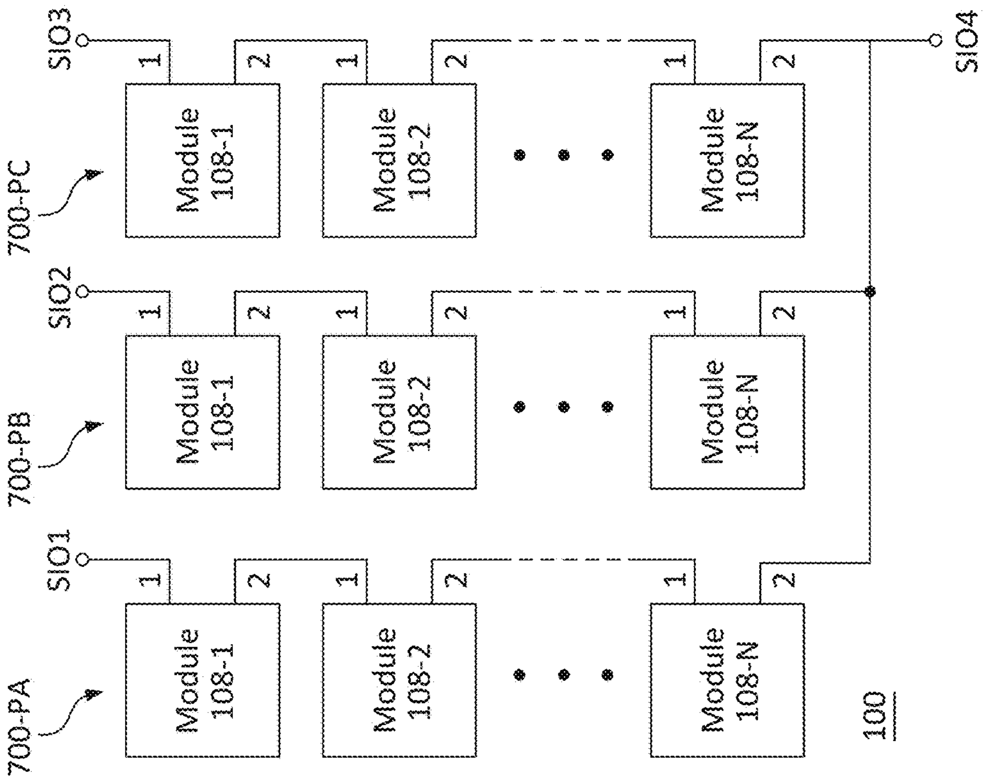

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system IO ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart): system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

Figure 7D:
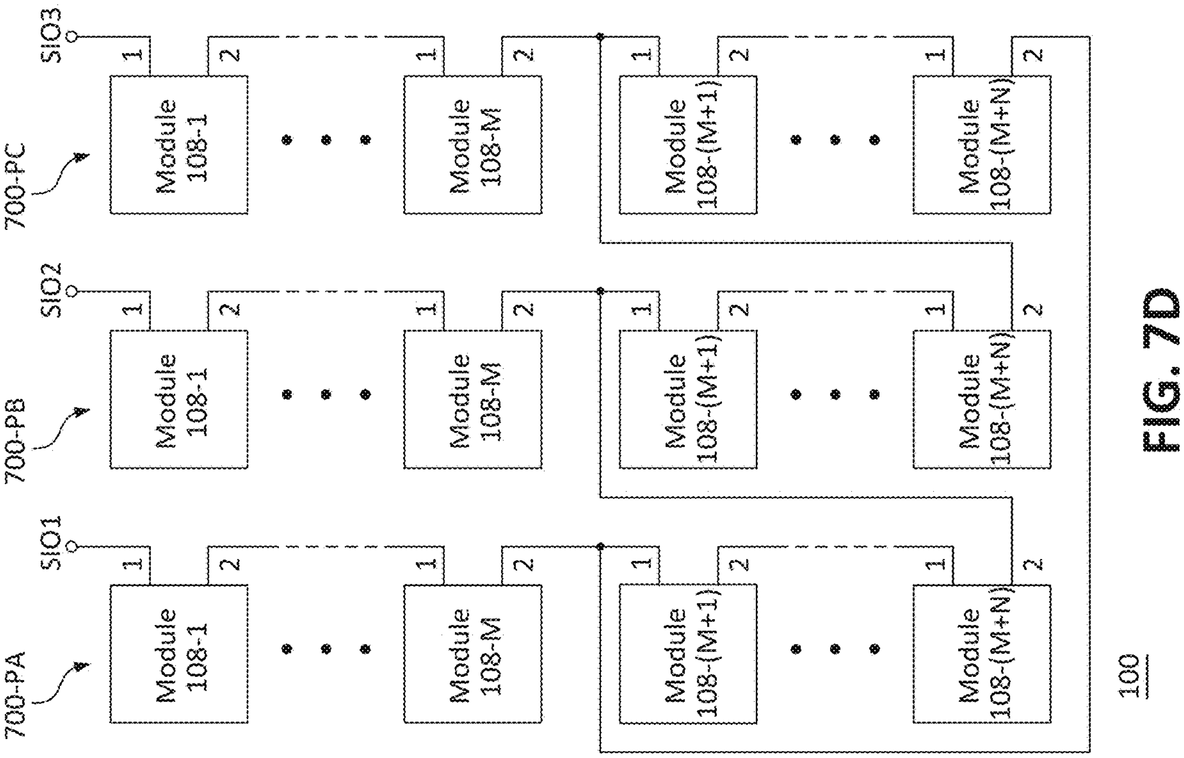

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
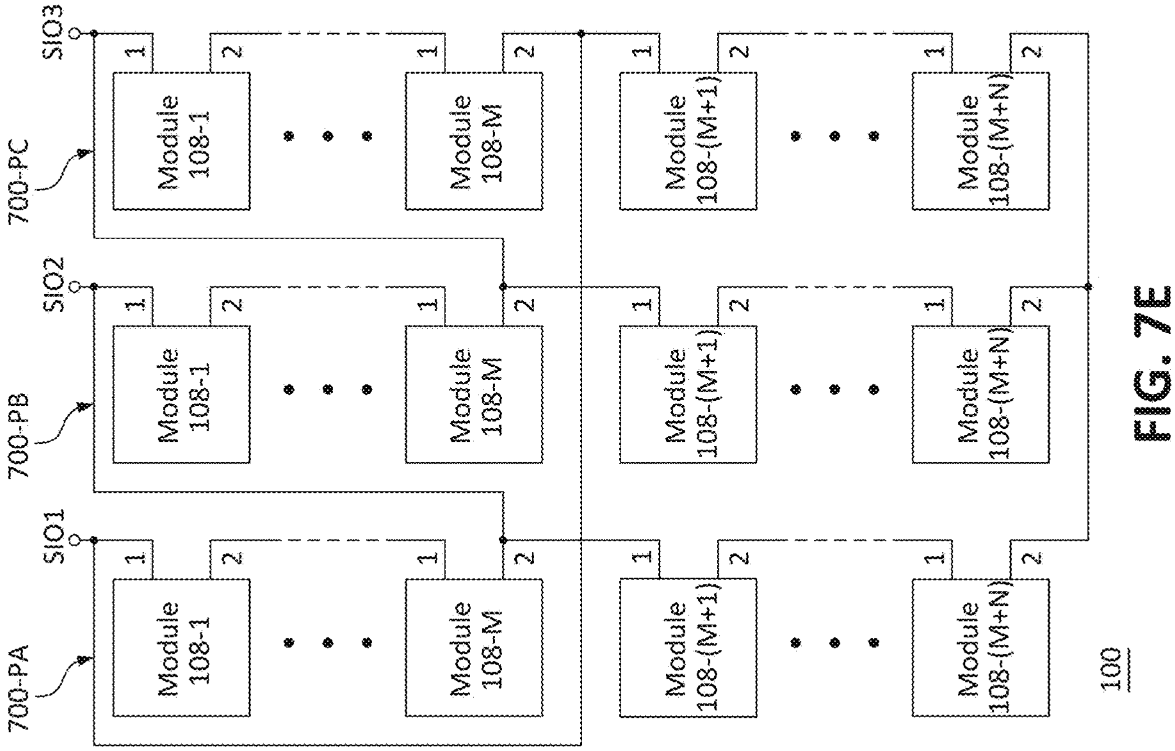

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Example Embodiments of Control Methodologies

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
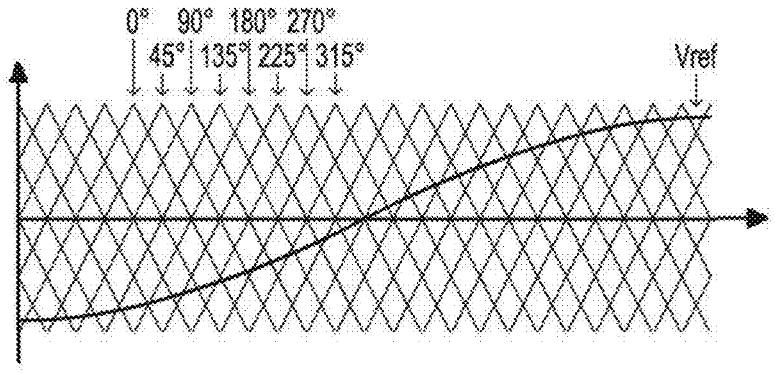
FIG. 8C is a plot depicting an example reference signal and carrier signals usable in a pulse width modulation control technique.
Figure 8D:
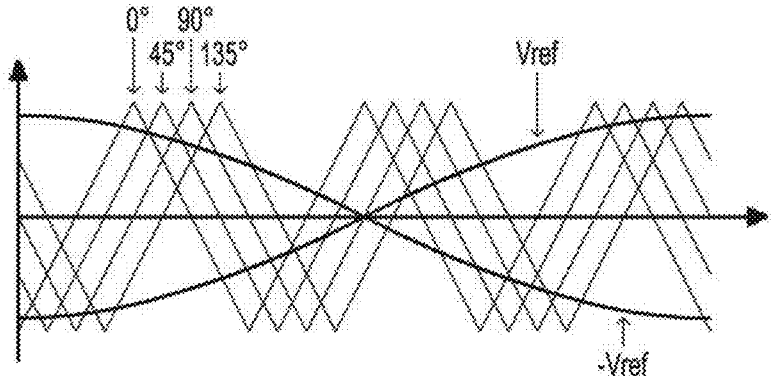
FIG. 8D is a plot depicting example reference signals and carrier signals usable in a pulse width modulation control technique.
Figure 8E:
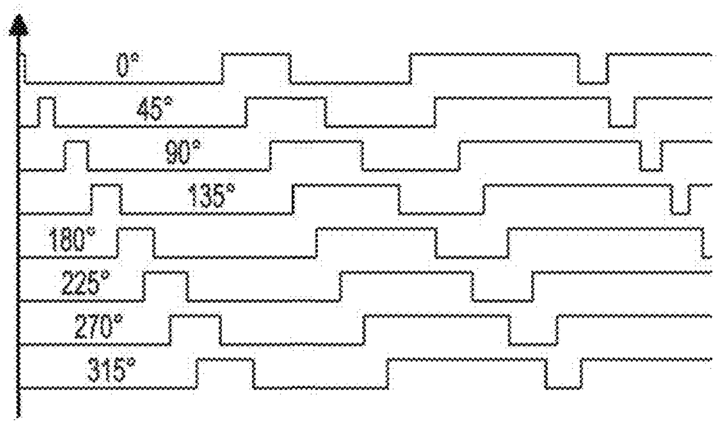
FIG. 8E is a plot depicting example switch signals generated according to a pulse width modulation control technique.
Figure 8F:
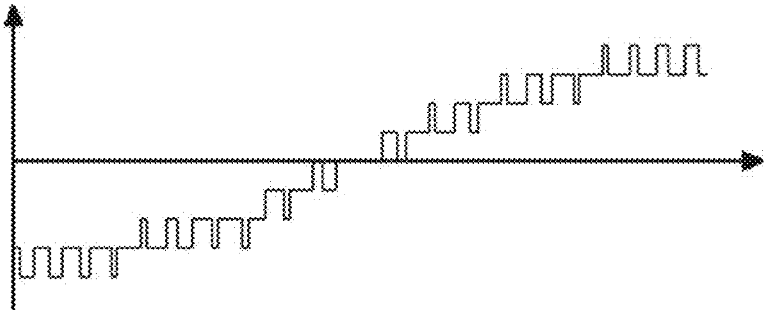
FIG. 8F as a plot depicting an example multilevel output voltage generated by superposition of output voltages from an array of modules under a pulse width modulation control technique.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of (X−1)/2 two-level PWM waveforms. These two-level waveforms can be generated by comparing a reference waveform Vref to carriers incrementally shifted by 360°/(X−1). The carriers are triangular, but the embodiments are not limited to such. A nine-level example is shown in FIG. 8C (using four modules 108). The carriers are incrementally shifted by 360°/(9−1)=45° and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first (N−1)/2 carriers. A nine-level example is shown in FIG. 8D. In this example, the 0° to 135° switching signals (FIG. 8E) are generated by comparing +Vref to the 0° to 135° carriers of FIG. 8D and the 180° to 315° switching signals are generated by comparing −Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals.

The relative utilizations of each module 108 can adjusted based on status information to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra-array or intraphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
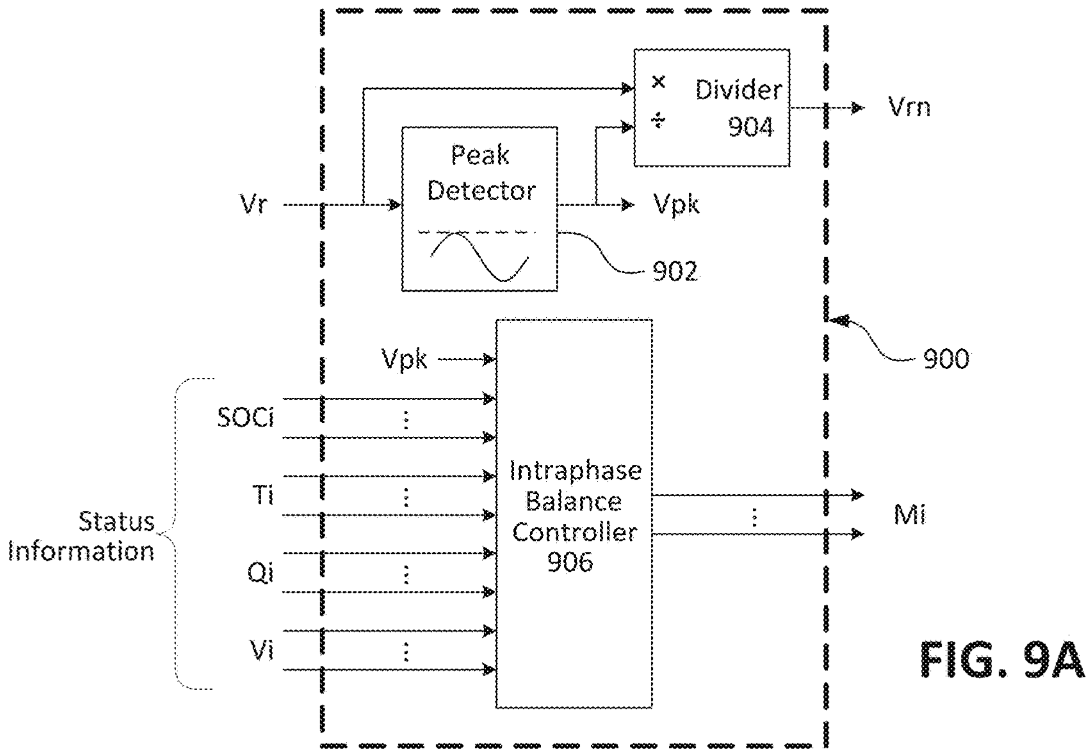
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra-array) balance controller 906. Array controller 900 can receive a reference voltage waveform (Vr) and status information about each of the N modules 108 in the array (e.g., state of charge (SOCi), temperature (Ti), capacity (Qi), and voltage (Vi)) as inputs, and generate a normalized reference voltage waveform (Vrn) and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk=M_1V_1+M_2V_2+M_3V_3 \ldots +M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source(s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
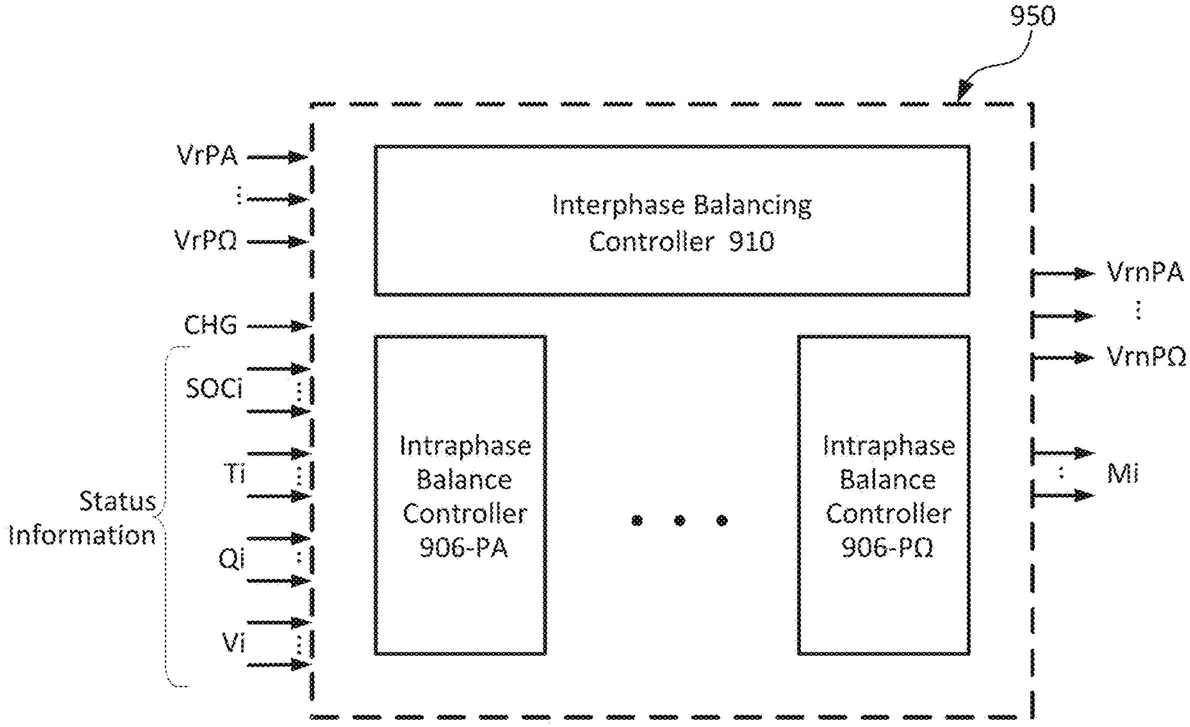

Balancing between arrays 700 of different phases (or arrays of the same phase, e.g., if parallel arrays are used) can be performed concurrently with intraphase balancing. FIG. 9B depicts an example embodiment of an Ω-phase (or Ω-array) controller 950 configured for operation in an Ω-phase system 100, having at least Ω arrays 700, where Ω is any integer greater than one. Controller 950 can include one interphase (or interarray) controller 910 and Ω intraphase balance controllers 906-PA . . . 906-Pa for phases PA through PΩ, as well as peak detector 902 and divider 904 (FIG. 9A) for generating normalized references VrnPA through VrnPΩ from each phase-specific reference VrPA through VrPΩ. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrPΩ to generate normalized waveforms VrnPA through VrnPΩ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Example Embodiments of Interconnection (IC) Modules

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figure 10B:
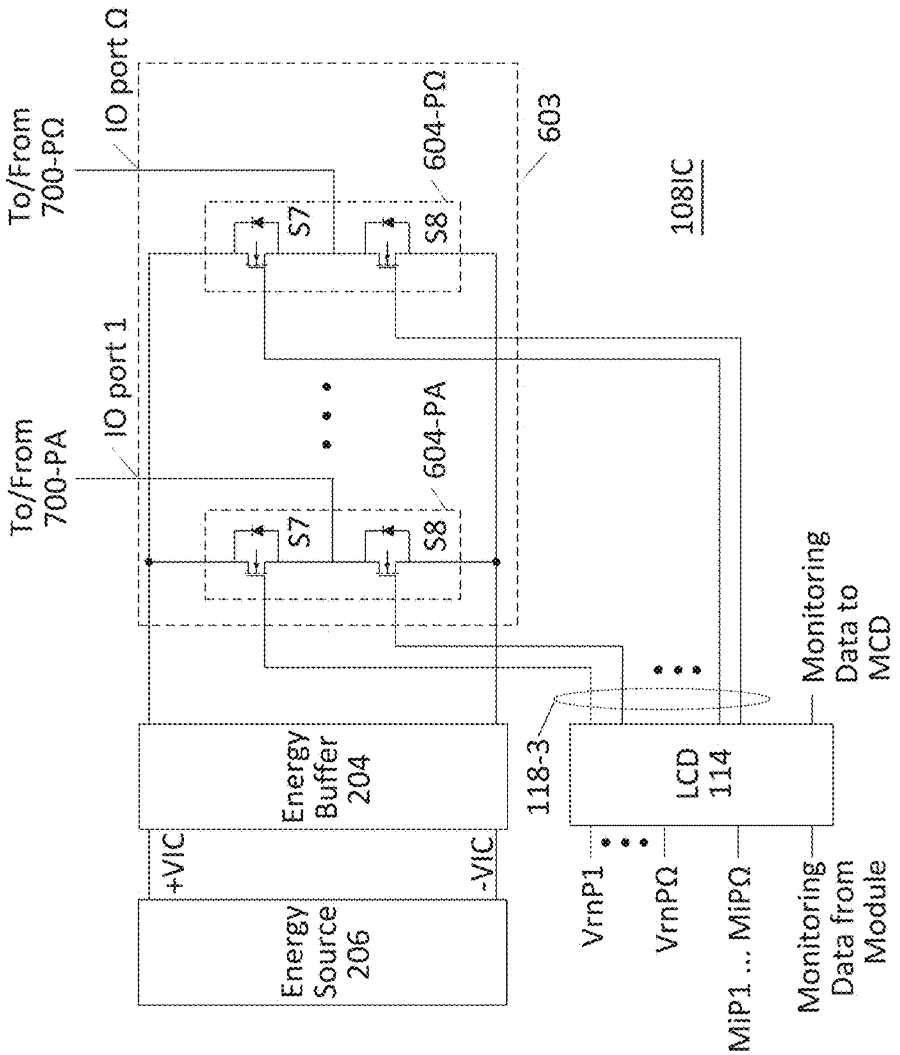
FIG. 10B is a schematic diagram depicting an example embodiment of an interconnection module in the multiphase embodiment of FIG. 10A.
Figure 10A:
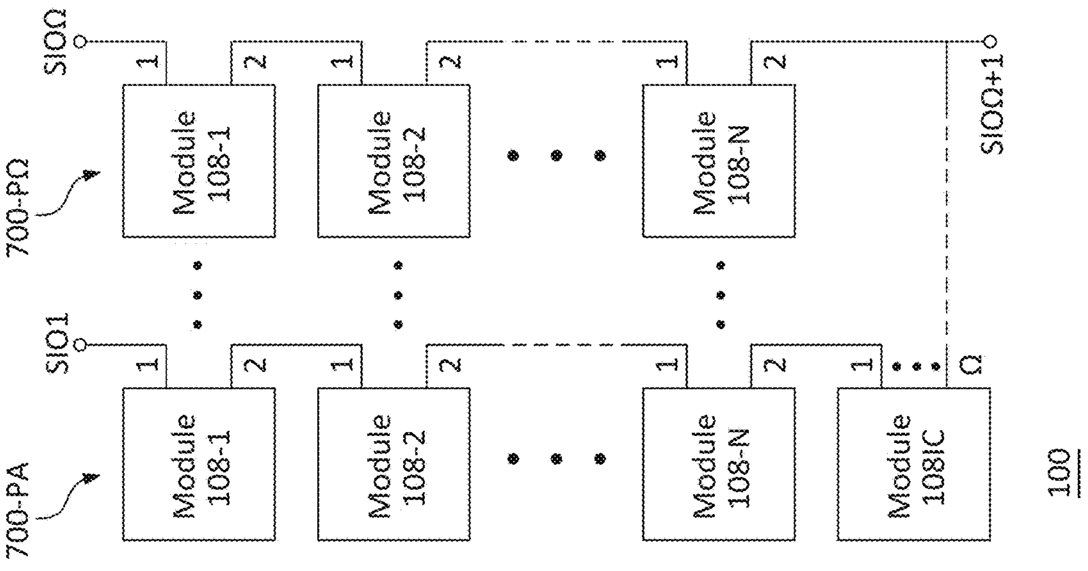
FIG. 10A is a block diagram depicting an example embodiment of a multiphase modular energy system having interconnection module.

FIG. 10A is a block diagram depicting an example embodiment of a system 100 capable of producing Ω-phase power with Ω arrays 700-PA through 700-PΩ, where Ω can be any integer greater than one. In this and other embodiments, IC module 108IC can be located on the rail side of arrays 700 such the arrays 700 to which module 108IC are connected (arrays 700-PA through 700-PΩ in this embodiment) are electrically connected between module 108IC and outputs (e.g., SIO1 through SIOΩ) to the load. Here, module 108IC has Ω IO ports for connection to IO port 2 of each module 108-N of arrays 700-PA through 700-PΩ. In the configuration depicted here, module 108IC can perform interphase balancing by selectively connecting the one or more energy sources of module 108IC to one or more of the arrays 700-PA through 700-PΩ (or to no output, or equally to all outputs, if interphase balancing is not required). System 100 can be controlled by control system 102 (not shown, see FIG. 1A).

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-PΩ for independently connecting energy source 206 to each of arrays 700-PA through 700-PΩ, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-PΩ can be controlled by control system 102 to selectively couple voltage $+V_{IC}$ or $-V_{IC}$ to the respective module I/O ports 1 through Ω. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information from monitor circuitry of module 108IC. This monitoring data and/or other status information derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-PΩ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnPΩ. LCD 114 can also receive modulation indexes MiPA through MiPΩ for the switch units 604-PA through 604-PΩ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PΩ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with Ω switch portions 604 coupled with Ω different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
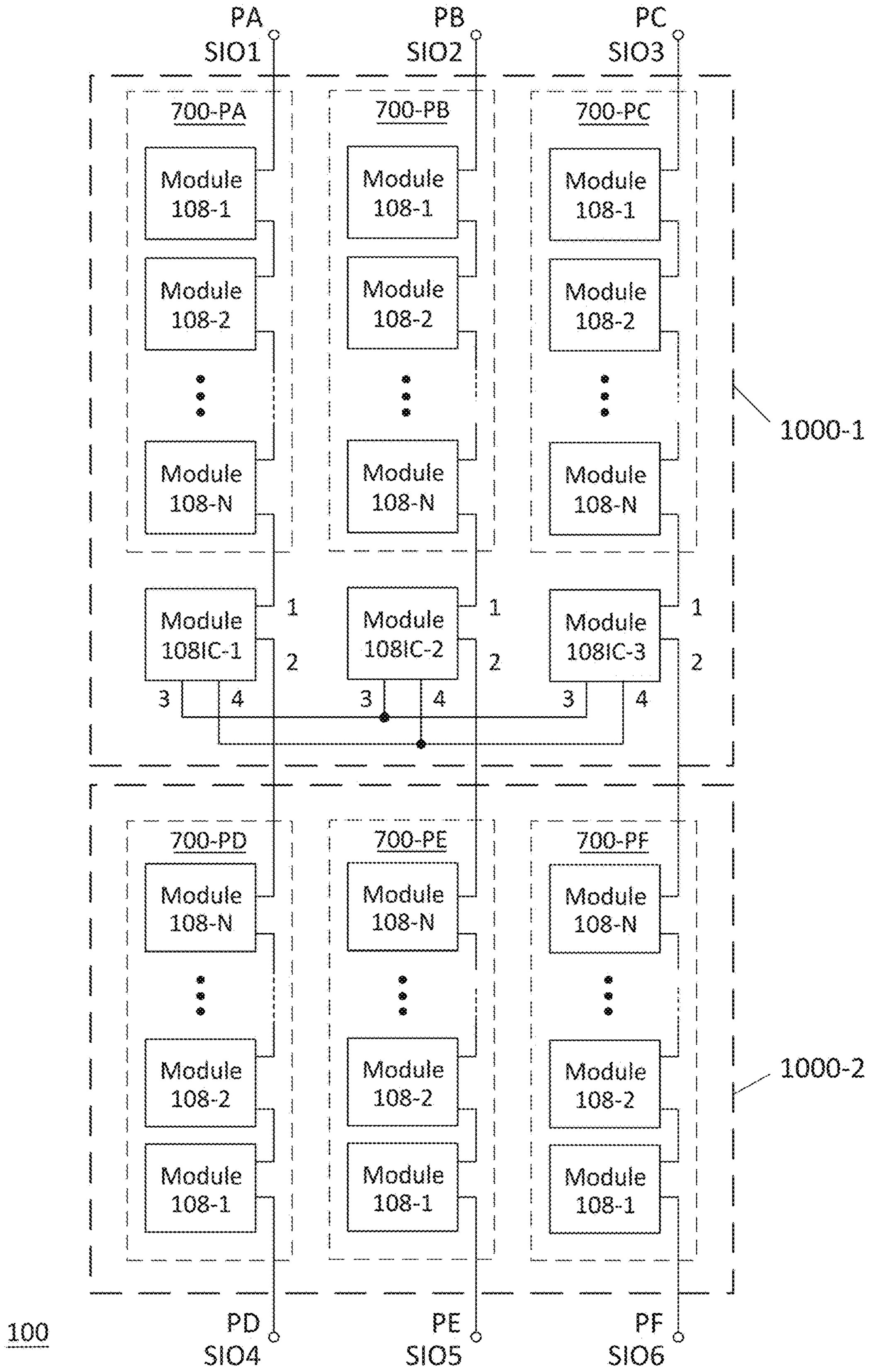
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., interpack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to share energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
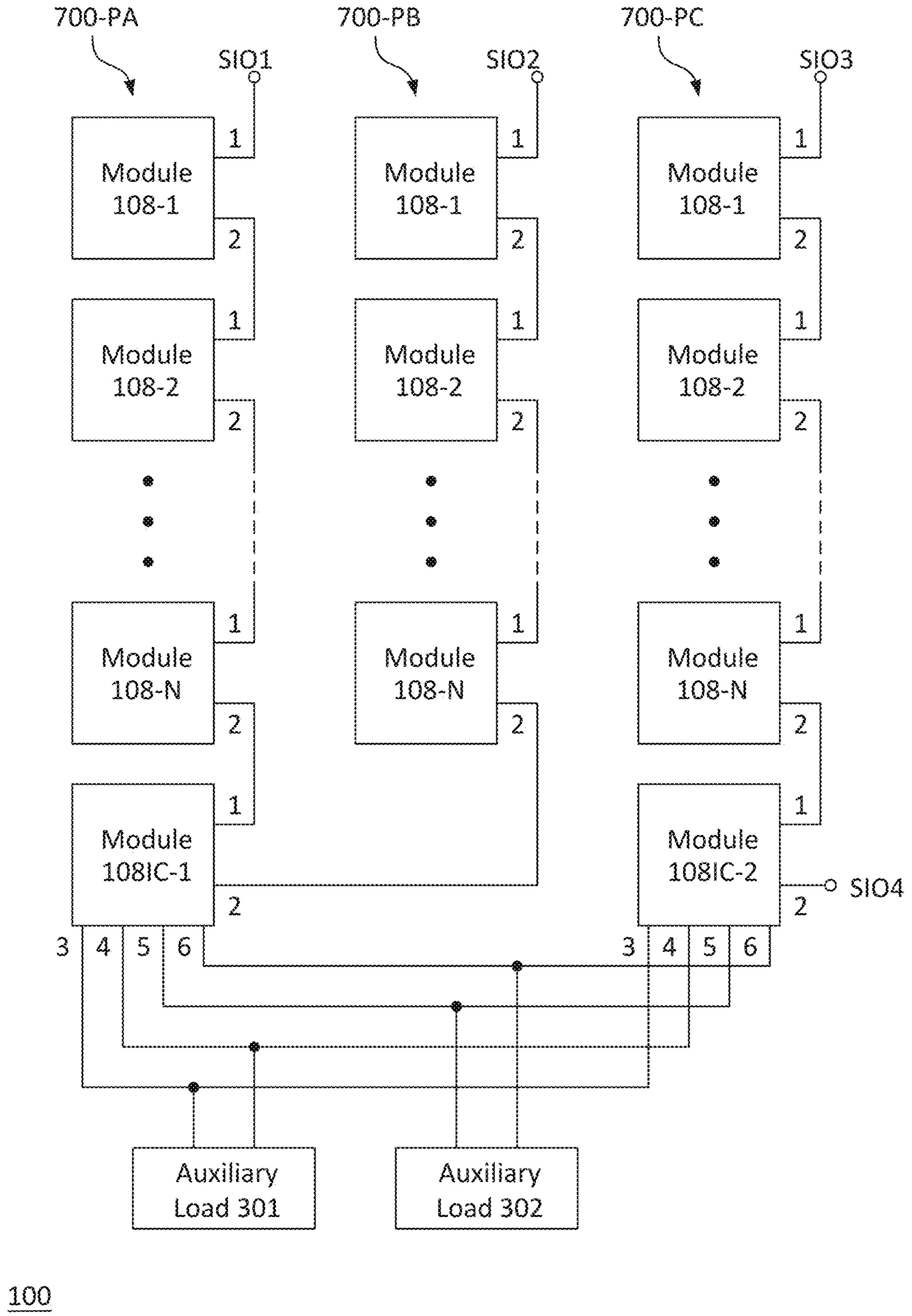
FIG. 10D is a block diagram depicting an example embodiment of a three-phase modular energy system having interconnection modules supplying auxiliary loads.
Figure 10E:
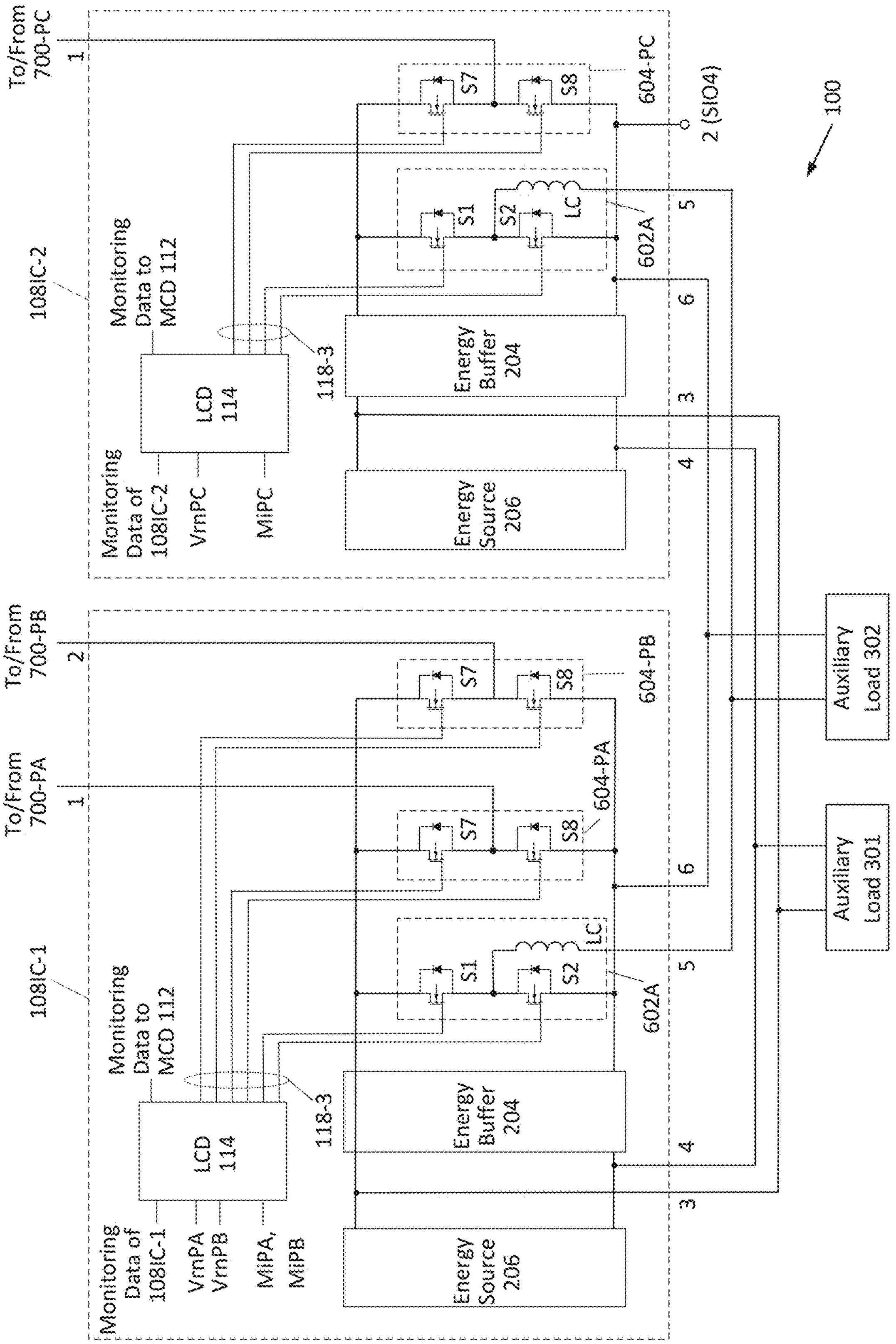
FIG. 10E is a schematic view depicting an example embodiment of the interconnection modules in the multiphase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100A with two modules 108IC connected to perform interphase balancing and to supply auxiliary loads 301 and 302. FIG. 10E is a schematic diagram depicting this example embodiment of system 100 with emphasis on modules 108IC-1 and 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

Figure 10F:
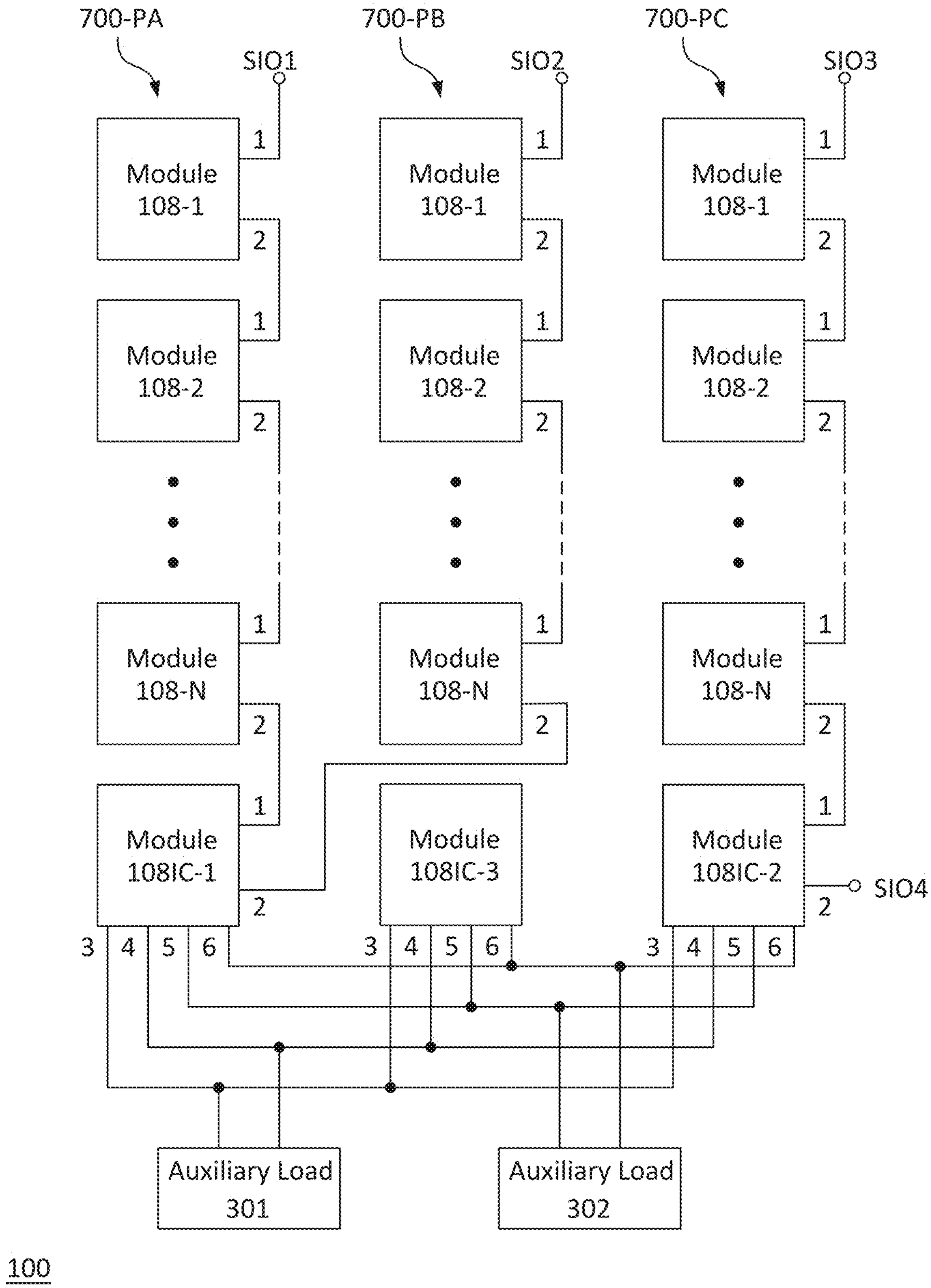
FIG. 10F is a block diagram depicting another example embodiment of a three-phase modular energy system having interconnection modules supplying auxiliary loads.

FIG. 10F is a block diagram depicting another example embodiment of a three-phase system configured to supply power to one or more auxiliary loads 301 and 302 with modules 108IC-1, 108IC-2, and 108IC-3. In this embodiment, modules 108IC-1 and 108IC-2 are configured in the same manner as described with respect to FIGS. 10D-10E. Module 108IC-3 is configured in a purely auxiliary role and does not actively inject voltage or current into any array 700 of system 100. In this embodiment, module 108IC-3 can be configured like module 108C of FIG. 3B, having a converter 202B,C (FIGS. 6B-6C) with one or more auxiliary switch portions 602A, but omitting switch portion 601. As such, the one or more energy sources 206 of module 108IC-3 are interconnected in parallel with those of modules 108IC-1 and 108IC-2, and thus this embodiment of system 100 is configured with additional energy for supplying auxiliary loads 301 and 302, and for maintaining charge on the sources 206A of modules 108IC-1 and 108IC-2 through the parallel connection with the source 206 of module 108IC-3.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Fast Charging

Example embodiments will now be described herein relating to fast charging techniques for energy sources using pulse preheating and/or pulse charging techniques. The embodiments will be described primarily in the context of energy sources 206 that are batteries, although the embodiments are applicable to other energy source types as well (e.g., high energy density capacitors and fuel cells). The embodiments can be applied to charge a battery having a single cell, a battery having multiple cells (e.g., connected in series, parallel, or a combination thereof, sometimes referred to as a battery module), and systems having multiple battery modules (e.g., connected in series, parallel, or a combination thereof, sometimes referred to as a battery pack).

Examples of battery types suitable for use with the present subject matter include solid state batteries, liquid electrotype based batteries, liquid phase batteries as well as flow batteries such as lithium (Li) metal batteries, Li ion batteries, Li air batteries, sodium ion batteries, potassium ion batteries, magnesium ion batteries, alkaline batteries, nickel metal hydride batteries, nickel sulfate batteries, lead acid batteries, zinc-air batteries, and others. Some examples of Li ion battery types include Li cobalt oxide (LCO), Li manganese oxide (LMO), Li nickel manganese cobalt oxide (NMC), Li iron phosphate (LFP), Li nickel cobalt aluminum oxide (NCA), and Li titanate (LTO).

While not required to be used with any particular configuration of energy storage system, the embodiments of system 100 described herein can particularly benefit from use with the present fast charging embodiments. When used with the embodiments of system 100 to charge energy sources 206 therein, converter 202 of each module 108 is independently controlled to apply a positive, zero, or negative pulse from power connection 110 to source 206. The AC or DC signal applied to power connection 110 can be fed back into the sources 206 in the reverse fashion to the process described herein for generating a superposition of all output pulses from all modules 108. Each converter 202 can be switched at frequencies greater than 100 Hz to apply pulses, e.g., of five milliseconds (ms) or less at 50% duty cycle. Longer or shorter pulse durations with different duty cycles can also be used. This pulsing capability allows the energy source to be charged and/or heated as will be described herein.

Converters 202 can be controlled using a control system applying a pulse width modulation technique, a hysteresis technique, or another technique that strives to utilize all modules equally over time. Each module 108 can monitor the status of the energy source(s) 206 of that module 108 (e.g., state of charge (SOC), temperature, voltage, current, etc.) and feedback this monitored information to control system 102, which can adjust charge utilization of each module 108 individually to maintain balance, or converge towards a balanced condition, of the chosen parameter or parameters to be balanced (e.g., SOC and/or temperature).

The cascaded topology of system 100 permits the charge voltage or charge current from the charge source to be divided amongst the energy sources as needed to implement charging schemes of varying complexity. For example, voltage (or current) can be applied in a pulsed manner where some sources 206 are charged at certain times and others are not, generally provided that the total voltage applied to sources 206 (and other charge sinks of the system) is equal to the DC or AC voltage supplied to system 100 by the charge source at that moment in time. The voltage and duration of the pulse applied (as well as the duration of the rest time between pulses) can be varied and timed based on the state of those sources 206 as monitored by each module 108 (e.g., monitor circuitry 208 and LCD 114). Thus the division of voltages between modules 108 allows both charging and resting of the sources 206 of the modules 108 as needed.

The embodiments can be used to charge sources 206 with varying degrees of granularity. For example, a battery module can be pulsed as a whole, e.g., one pulse can be applied for all of the cells making up that battery module. Alternatively, additional switching circuitry (e.g., in addition to the configurations shown for converter 202) can be included for each individual cell such that each cell of the battery module can be pulsed independently. For example, a system 100 having N battery modules each having M cells can be configured with NM (N multiplied by M) converters or switch circuits. Other levels of granularity are possible, such as the capability to pulse charge groups of cells within each battery module (e.g., the cells are divided into two groups each of which can be charged independently such that the system has 2N converters or switch circuits). Control of the switch circuitry for the various battery modules and/or cells can be performed by control system 102 communicatively coupled with system modules 108 (e.g., MCD 112 communicatively coupled with LCDs 114).

Example Embodiments of Fast Charging Techniques

Provided herein are example embodiments related to fast or rapid charging of energy sources at improved speeds. The example embodiments pertain to the application of voltage or current pulses to a battery in order to raise the temperature of that battery through localized heating, the application of voltage or current pulses to the battery in order to charge the battery, the application of constant (non-pulsed) voltage or constant current to the battery in order to charge the battery at higher temperatures, the monitoring of the battery for degradatory conditions while charging, and any combination thereof. The embodiments described herein can enable stationary and mobile energy storage systems to be charged at a wide range of C rates provided certain voltage and temperature constraints are not exceeded for the battery cells. For example, the embodiments can allow an EV with 100 kilowatt hour (kWh) storage capacity to be charged from zero to 80% of capacity in 10 minutes (or less) without substantially degrading the capacity over the rated lifetime of the battery pack.

Figure 11A:
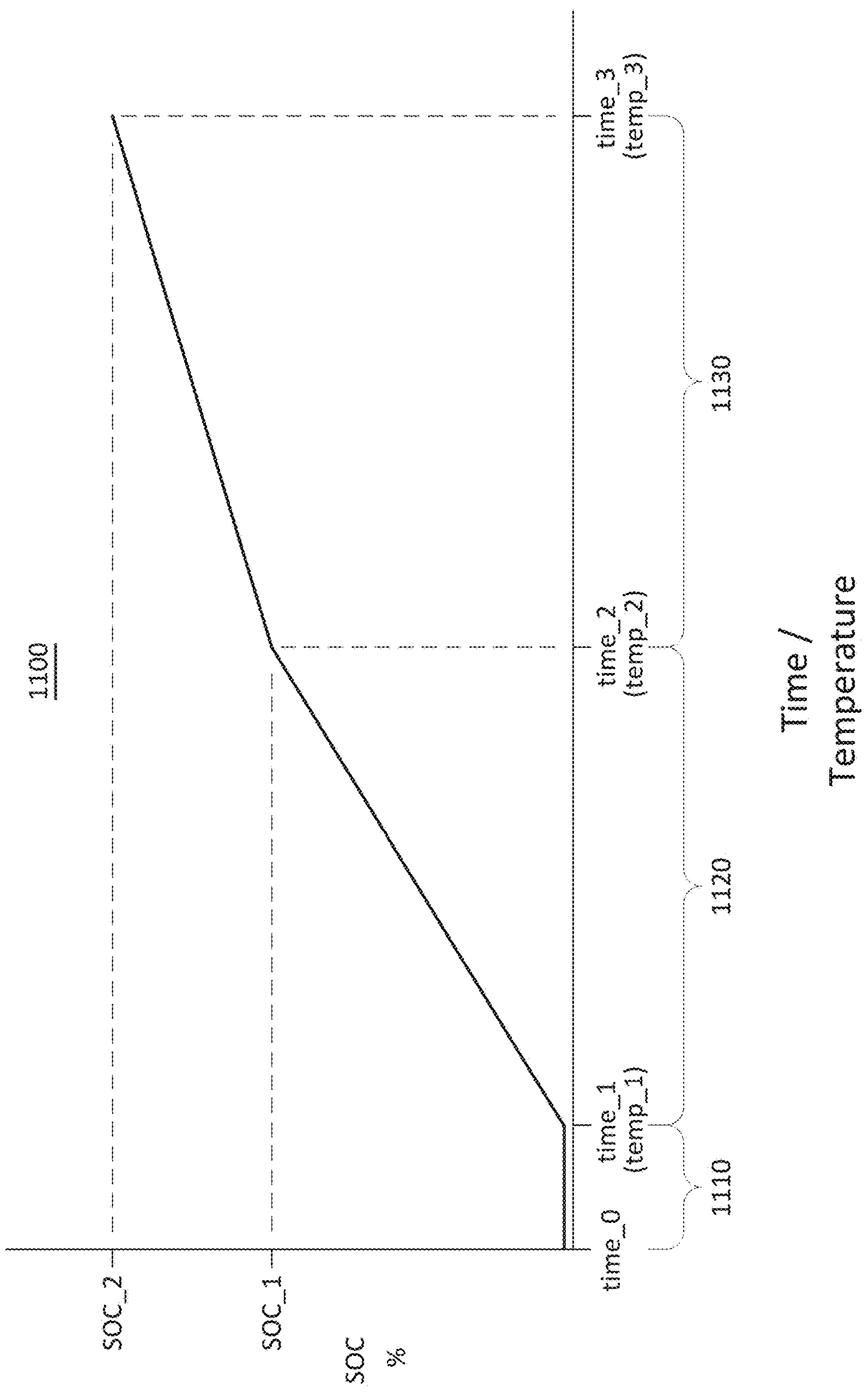
FIGS. 11A-11B are plots depicting a framework for describing multiple example embodiments of fast charging protocols.
Figure 11B:
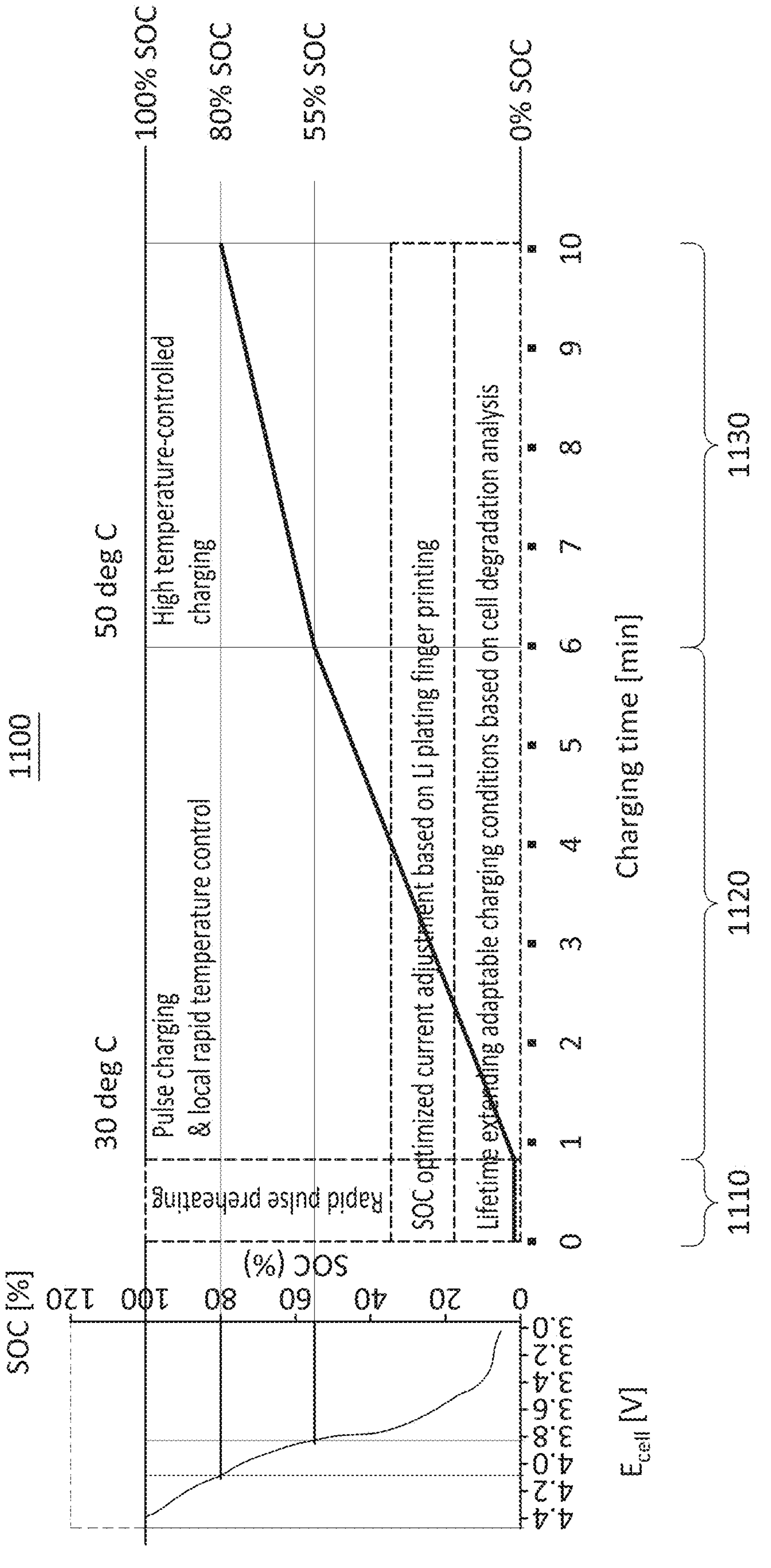

FIG. 11A is a plot depicting a framework for describing multiple example embodiments of fast charging protocols 1100 for charging a battery source 206 from a relatively low state of charge (SOC) to a substantial SOC in a short time frame of less than 15 minutes. FIG. 11B is plot of an embodiment of protocol 1100 with example values applied. The fast charging protocols 1100 described with respect to FIGS. 11A-11B (and elsewhere herein) can be applied to a battery having only a single cell or a battery module having two or more cells (e.g., between 2 and 100 cells) and can be implemented by charging and switch circuitry local to the external charge source. For example, the charger can sense temperature (e.g., surface) and voltage response of the battery device as a whole and adjust the application of preheating and charge signals accordingly. While such an approach is possible for charging a single cell, a battery module with multiple cells, or even a system (e.g., a battery pack) as a whole, the approach does not allow for granular control of the preheating and charging process as applied to individual cells within a battery module and/or individual battery modules within a system.

To provide more granular control, protocols 1100 can also be applied within a cascaded modular energy storage system 100 such as that described herein, where each module 108 includes a battery 206 that may be only a single cell or that may include two or more cells (e.g., between 2 and 100 cells), and the number of modules 108 can be two or greater (e.g., between 2 and 1000 modules 108). Converter 202 of each module 108 can be independently controlled as described herein such that protocols 1100 can be independently performed by each module 108 of system 100. For example, considering a battery pack having 12 modules 108, each having a battery 206 that includes 12 cells, protocols 1100 can be applied independently by each module 108 to charge each battery 206 having 12 cells in 15 minutes or less, and thus charge the entire battery pack in the same or similar time. Because the conditions of batteries 206 within system 100 will vary, and because the embodiments can adjust the charge rate based on feedback from each battery 206, the charge time for each battery 206 may vary. Some batteries 206 may be at 2-3% SOC while others are at or near 0% SOC or some percentage therebetween at the start of a charge cycle. Some batteries 206 may have higher capacities than others and will require longer times to reach the desired SOC. Some batteries 206 may, while charging, exhibit signs of degradation or other characteristics necessitating that the charge process be slowed.

Figure 12A:
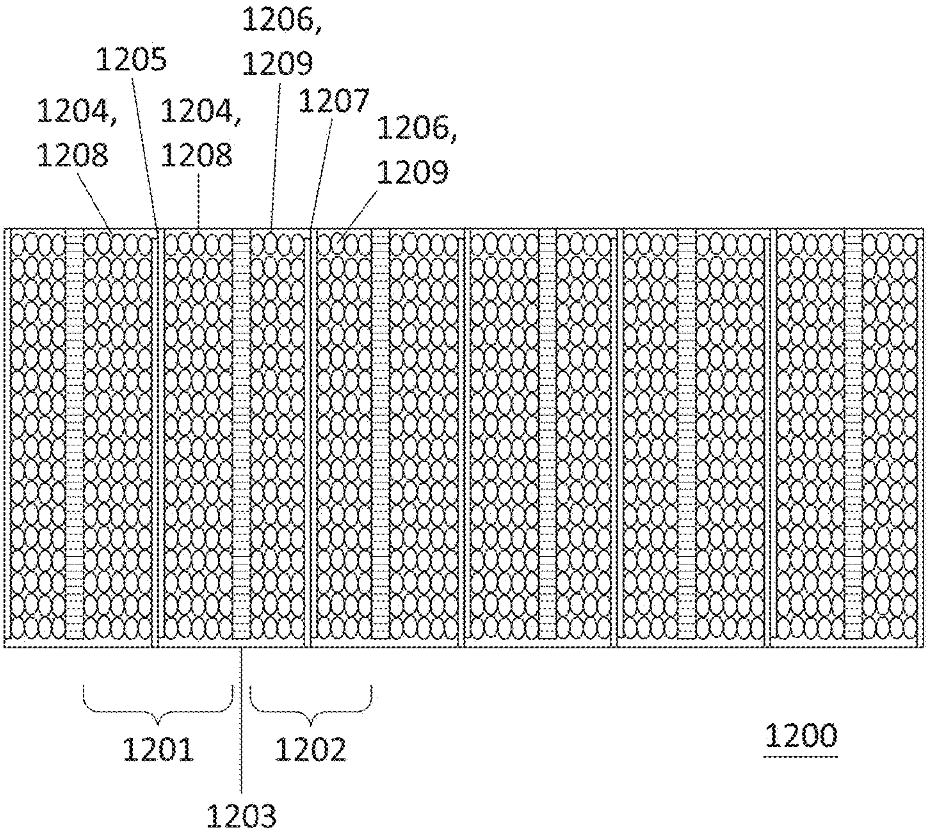
FIG. 12A is a cross-sectional view of a generalized lithium ion battery cell.

In order to enable discussion of protocol 1100 in greater detail, FIGS. 12A-12F will be discussed to provide context of battery cell characteristics and structure. FIG. 12A is a cross-sectional view of a generalized lithium ion battery cell 1200. Cell 1200 includes a repeating layered structure where each layer includes an anode 1201 and a cathode 1202 with a separator 1203 therebetween. Each anode 1201 includes anode material 1204 interspersed with electrolyte 1208 and having a current collector 1205 positioned therein. Similarly, each cathode 1202 includes cathode material 1206 interspersed with electrolyte 1209 and having a current collector 1207 positioned therein.

Figure 12B:
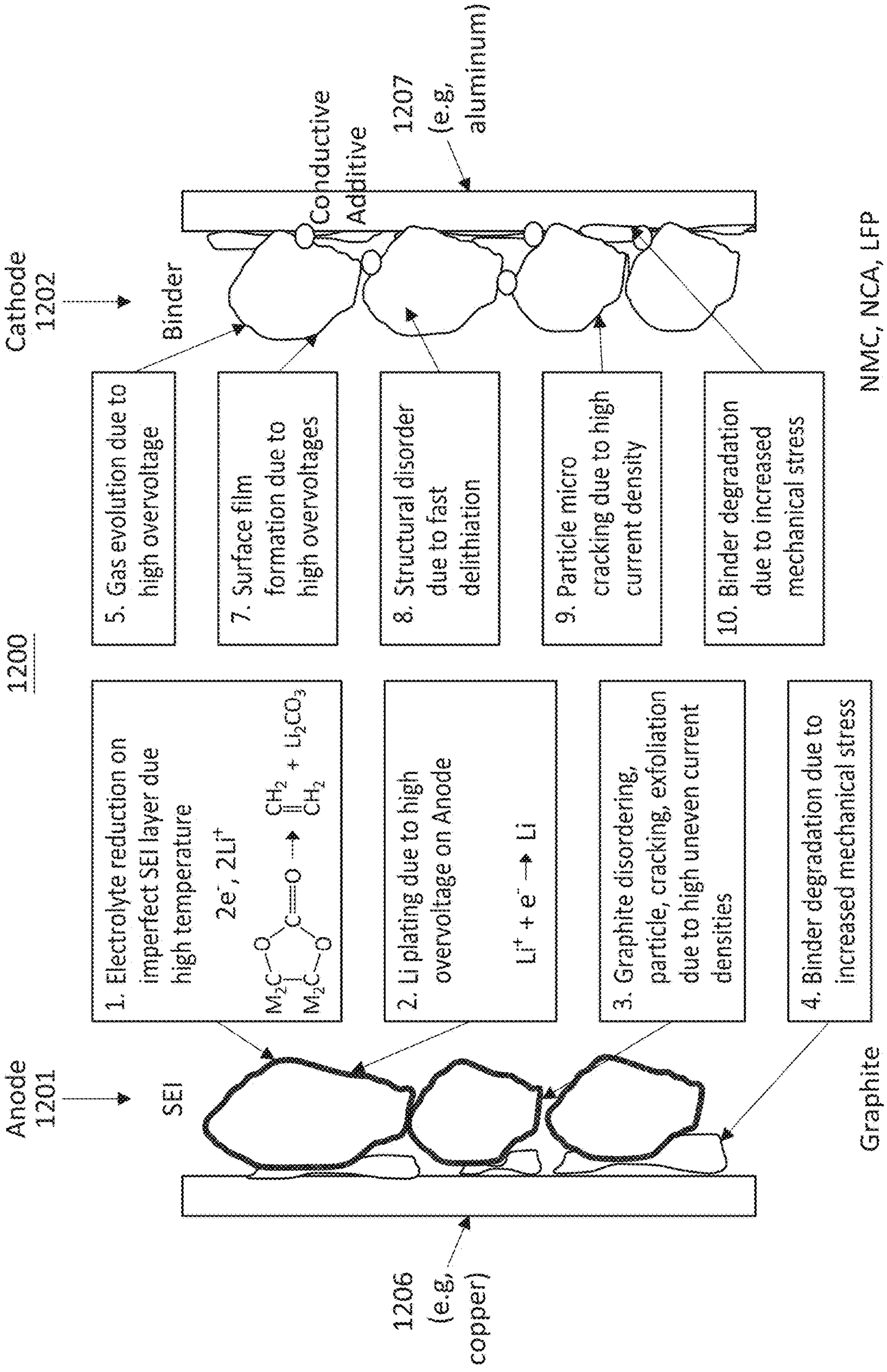
FIG. 12B is an explanatory diagram depicting an illustration of a magnified anode and cathode and listing examples of degradation modes that can occur within a typical lithium ion battery cell.

FIG. 12B is an explanatory diagram depicting an illustration of a magnified anode 1201 and cathode 1202 and listing examples of degradation modes that can occur within a typical lithium ion battery cell. Each of the degradation modes listed here can be caused directly or indirectly by the application of overvoltages to the anode and cathode and by charging at excessive temperatures. Example embodiments described herein seek to limit the application of overvoltages and operation at excessive temperatures and thus limit these degradatory modes.

Figure 12C:
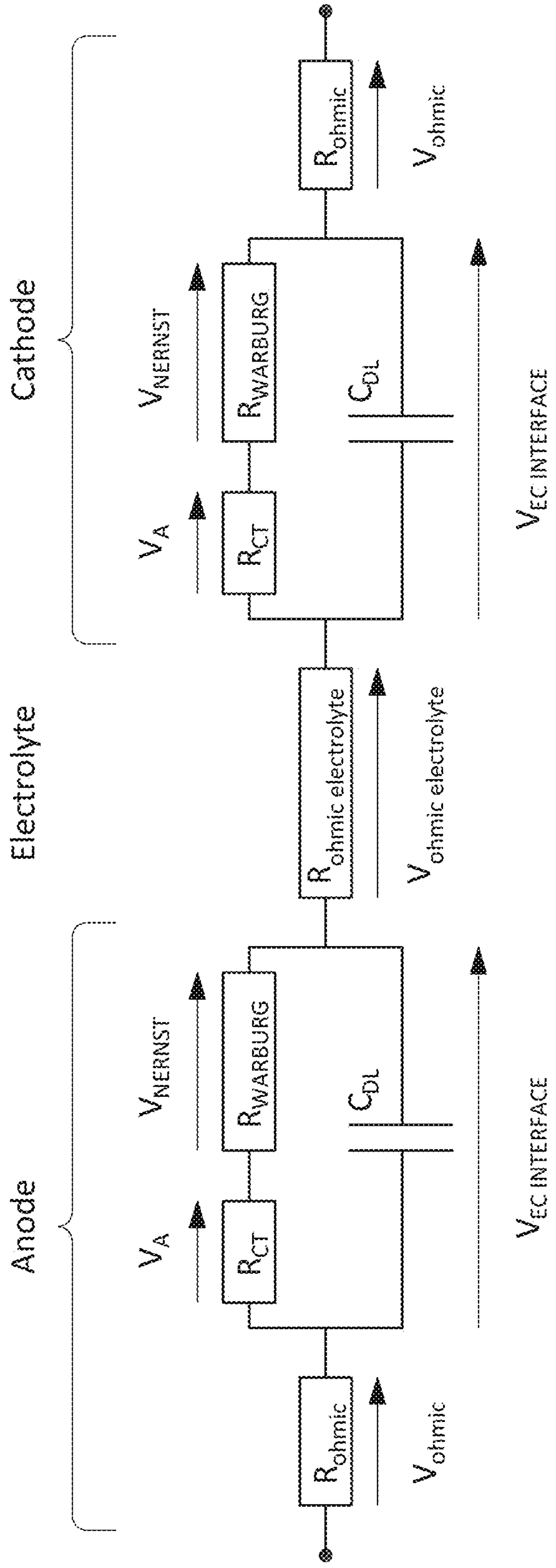
FIG. 12C is an electrical schematic model of battery cell.

FIG. 12C is an electrical schematic model of battery cell 1200. The anode exhibits a voltage drop that includes an ohmic component ($V_{ohmic}$) and an electrochemical interface component ($V_{EC\ INTERFACE}$). $V_{ohmic}$ is determined by the magnitude of the ohmic resistance of the anode ($R_{ohmic}$). $V_{EC\ INTERFACE}$ is determined by the activation impedance ($R_{CT}$) and the diffusion based impedance ($R_{Warburg}$) modeled as serially connected components in parallel with the anode double layer sheet capacitance ($C_{DL}$). $V_A$ is the activation-based voltage drop across $R_{CT}$, while $V_{Nernst}$ is the diffusion-based voltage drop across $R_{Warburg}$. The total impedance of the anode is the sum of $R_{ohmic}$, $R_{CT}$, and $R_{Warburg}$. The cathode is modeled similarly but with its own characteristic values. The electrolyte also exhibits a voltage ($V_{ohmic\ electrolyte}$) drop determined by the ohmic resistance ($R_{ohmic\ electrolyte}$).

Figure 12D:
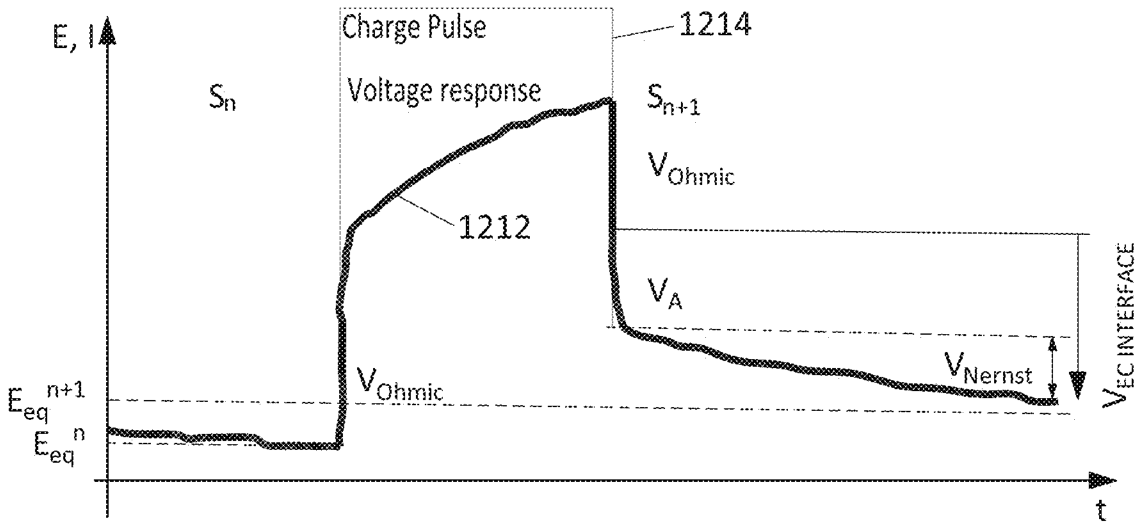
FIG. 12D is a plot depicting an example voltage response to a charge pulse applied to a lithium ion cell.
Figure 12E:
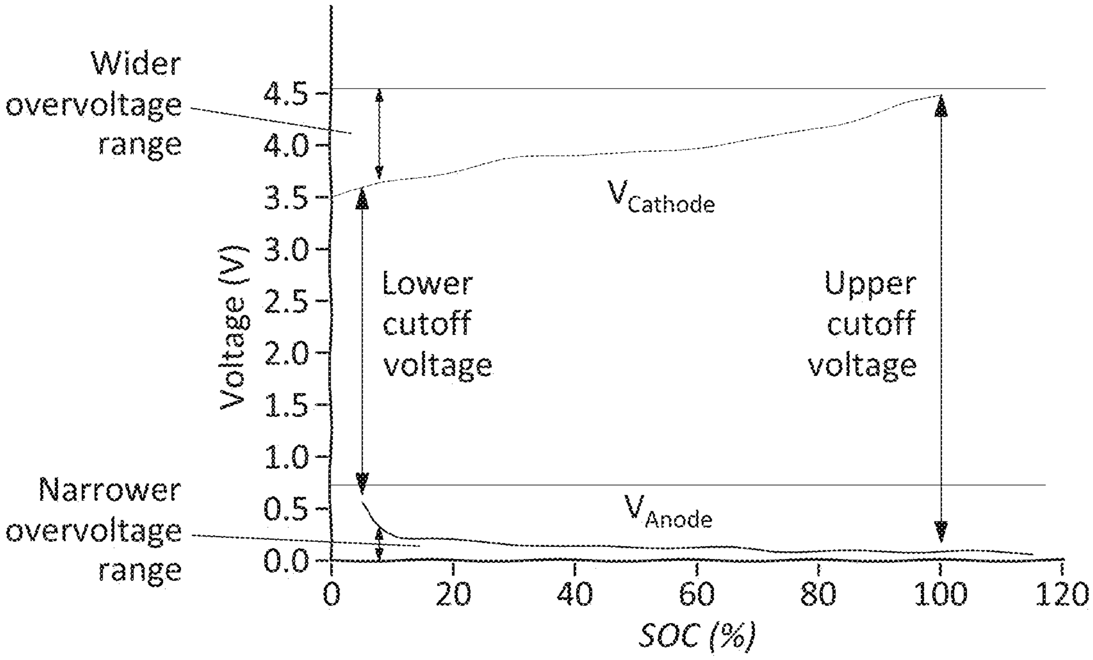
FIG. 12E is a graph depicting an example voltage on a lithium ion cell across the range of states of charge.

FIG. 12D is a plot depicting an example voltage response 1212 to a charge pulse 1214 applied to a lithium ion cell. The resistive ($V_{ohmic}$), activation based ($V_A$), and diffusion based ($V_{Nernst}$) voltage components for the anode and cathode can be determined by analysis of the response after termination of charge pulse 1214. FIG. 12E is a graph depicting an example voltage on a lithium ion cell across the range of SOC, and indicates the components of the voltage attributable to the cathode, anode, and the cell itself. Voltage response analysis can be used to determine the magnitude of overvoltage on the anode and cathode, and the magnitude and frequency of the charge pulses can be maintained, increased or decreased accordingly to stay within acceptable limits. The available overvoltage range for the anode and cathode decreases as the state of charge on the cell increases. The embodiments herein can be applied such that current is reduced as the cell is charged in any phase 1110, 1120, 1130.

Figure 12F:
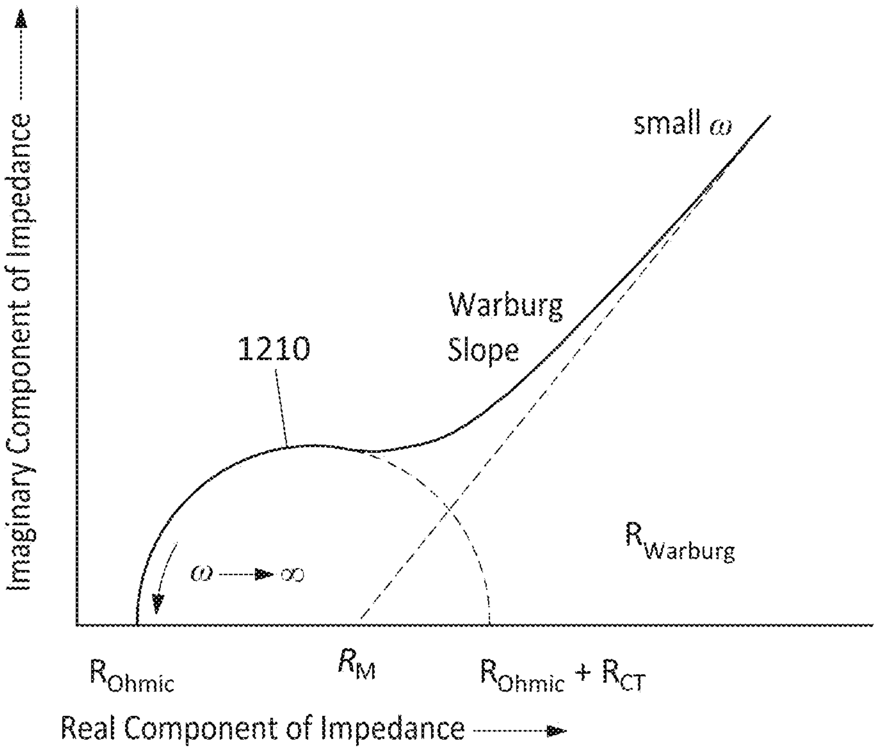
FIG. 12F is a plot depicting an example impedance response of a lithium ion cell.

FIG. 12F is a plot depicting an example impedance response 1210 of a lithium ion cell. As the frequency of the charge pulse increases the impedance response moves toward the purely $R_{ohmic}$ portion of the real impedance, with a low imaginary component. Pulsing at higher frequency can reduce the activation component of the voltage response.

Referring back to FIGS. 11A-11B, protocol 1100 can have three phases: a preheating phase 1110, a first charge phase 1120, and a second charge phase 1130. Energy for the preheating and charge signals applied to battery 206 can be sourced from a charge source (e.g., grid or charge station) external to the system, and in some cases can be sourced internally such as through a second source 206B. Here, pulse preheating phase 1110 can last for a set time duration (time_0 to time_1) or until a first temperature threshold is reached (temp_1). In FIG. 11B preheating phase 1110 is applied until the battery reaches 30 degrees C., which occurs after approximately one minute.

Figure 11C:
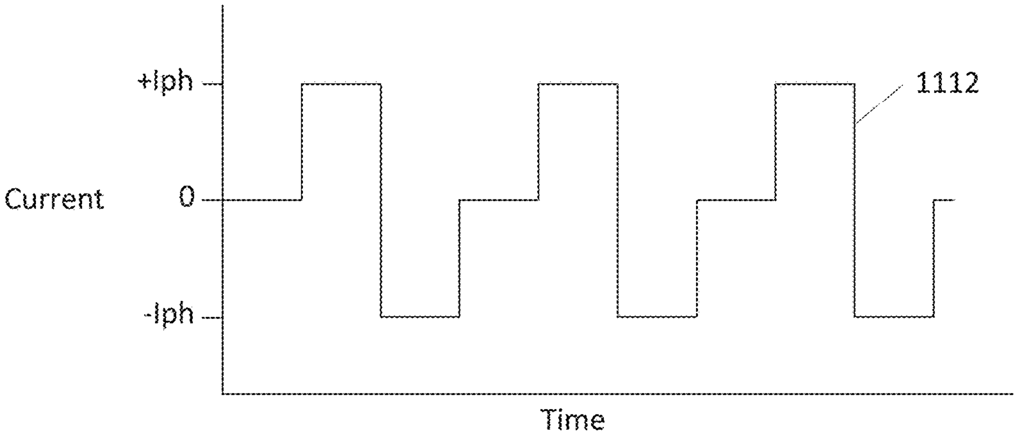
FIGS. 11C-11D are current versus time graphs depicting example embodiments of preheating pulse trains with and without a time gap, respectively.
Figure 11D:
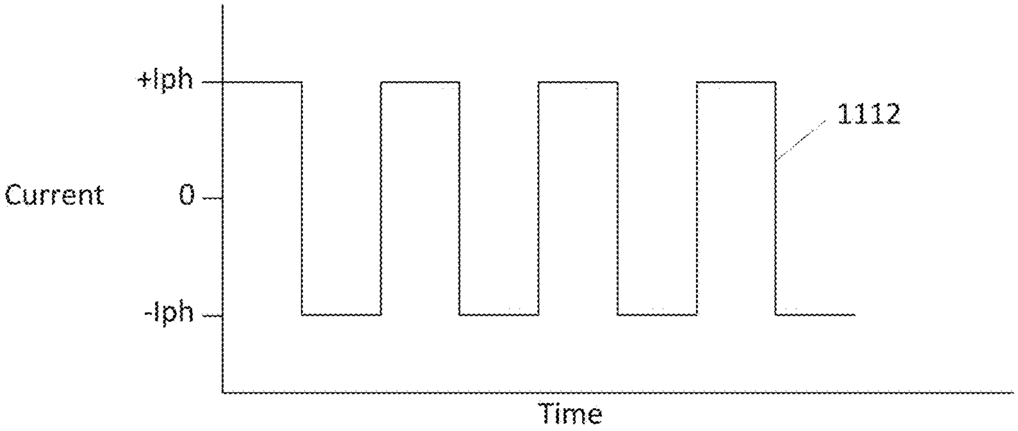

Preheating phase 1110 involves application of a preheating pulse signal 1112 as a train or sequence of pulses, where each pulse alternates from a charge pulse (negative current) to a discharge pulse (positive current) of equal or substantially equal duration, optionally with a time gap between application of the charge and discharge pulse pair. FIGS. 11C-11D are current versus time graphs depicting example embodiments of preheating pulse trains 1112 with and without a time gap, respectively, and oscillating between a positive preheat current (+Iph) and equal but opposite negative preheat current (−Iph).

Preheating phase 1110 can achieve local heating by raising the temperature of anode current collector 1205, cathode current collector 1207 and electrolyte 1209 (FIG. 12A) without activation of electrochemical reactions. In many embodiments, a frequency ($F_{preheat}$) of preheating signal 1112 complies with equation (1):

$$F_{preheat} \gg 1/(R_{CT} * C_{DL}). \qquad (1)$$

Preheating signal 1112 may be at a single frequency, with each pulse having a rectangular or substantially rectangular form (as visualized in time domain). In other embodiments, preheating signals 1112 can be implemented in a more complex fashion having multiple frequency components, such as a primary pulse train and secondary pulses, in the frequency domain between 1 hertz (Hz) up to 1 megahertz (Mhz). In various embodiments preheating signal 1112 has a frequency range between 100 Hz and 100 kilohertz (kHz). The frequency of preheating signal 1112 causes the voltage drop to occur primarily by action of the electrolyte impedance and the current collector impedance, and thus the voltage of preheating signal 1112 can lead to cathode and anode voltages that exceed their relative cut off overvoltages at both relatively low and relatively high states of charge.

Preheating phase 1110 causes a temperature increase at local regions within the battery cells by targeting the ohmic impedances to heat the active material while bypassing activation of electrochemical reactions such as side reactions (e.g., decomposition of the electrolyte, decomposition of the active, lithium plating) or main electrochemical reactions (e.g., lithiation). These reactions are preferably bypassed such that they do not substantially occur (within reasonable tolerances identified by those of ordinary skill in the art permitting prolonged functional operation in the respective commercial, research, or industrial application). Phase 1110 warms the cell until the activation impedance and total impedance is small enough so the overvoltage on the anode drives the electrochemical reaction and not lithium plating. Phase 1110 therefore permits rapid heating of the electrochemical interface and bulk material temperature control to permit subsequent charging without causing damage due to side reactions or material stress due to rapid degradation (e.g., lithiation or delithiation) of the anode and cathode material.

Preheating phase 1110 can be applied until all cells of source 206 reach a minimum temperature threshold, provided that no one cell exceeds a maximum temperature threshold. If a cell reaches the maximum threshold, then preheating phase 1110 can be slowed, or stopped, or protocol 1100 can transition to the next phase (first or second charging phases 1120, 1130) as described herein. Cell temperatures can be measured directly with a temperature sensor (e.g., infrared) or indirectly (e.g., temperature in a subgroup of cells or in proximity with cells). As an alternative, or in combination with direct sensing, temperature for one or more cells, including all cells, can be measured with one sensor (e.g., an infrared image of multiple cells). Temperature can also be inferred by use of a model or look up table with reference to other indirect metrics (e.g., voltage, current, impedance), optionally based on data collected from previously characterized cells. Temperature thresholds for this and other phases are preferably correlated to the internal temperature of the cell where the electrolyte and active material are located. Thus, if a battery cell surface temperature is measured (e.g., with a thermistor or optical device) then the threshold is set for the surface temperature that correlates to the desired internal cell temperature based on an estimation, lookup table, or model.

Preheating phase 1110 raises the temperature of battery 206 to a first temperature threshold, which in the example of FIG. 11B is 30 degrees Celsius (C) measured on the cell surface. The temperature threshold can depend on the battery type and for lithium ion batteries can be, for example, between 25 and 70 degrees C. (inclusive). In other embodiments preheating phase 1110 can last for a predetermined duration (time_0 to time_1) such as less than one minute, one minute, two minutes, three minutes, five minutes, or otherwise. The duration of phase 1110 can vary based on the starting temperature, with lower starting temperatures requiring relatively more time. When preheating signal 1112 includes a charge pulse and a discharge pulse of equal or substantially equal duration, the net charge of battery 206 does not substantially change during this phase and remains at or near the initial SOC. Further the applied frequency regime of the pulse sequence is preferably chosen to not initiate electrochemical reactions of the storage reaction nor side reactions. The preferred frequency range is between 100 hz to 100 kHz for the preheating pulse signals 1112.

Figure 11E:
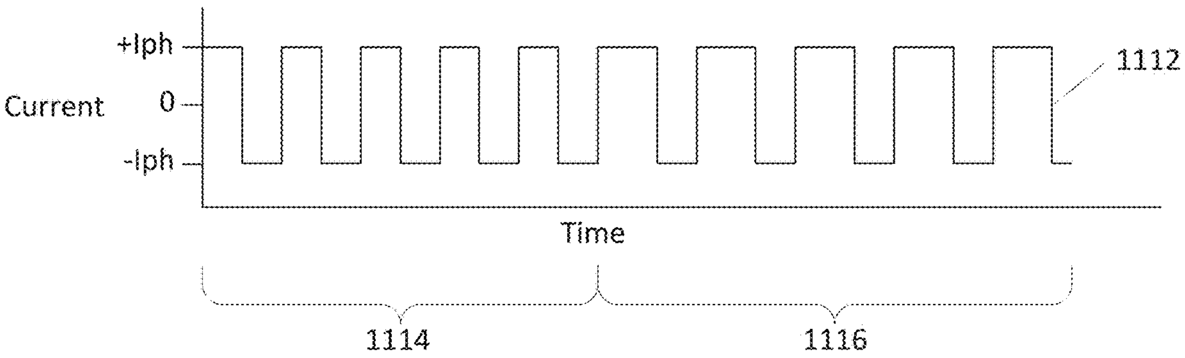
FIG. 11E is a current versus time graph depicting an example embodiment of preheating signal applied during multiple subphases.

The C rate of the pulses applied during preheating phase 1110 can vary widely, and is primarily dependent on the ohmic characteristics, applied voltages, and thermal behavior of the cells during this phase. C rates up 30 C and higher can be applied in phase 1110. Furthermore, while phase 1110 can be applied such that no net charging or discharging occurs, in other embodiments the length of the charge pulse can be slightly longer (e.g., 1-15%) than the length of the discharge pulse to begin charging the cells at a relatively low rate as compared to the subsequent phases. This can occur, for example, towards the transition from preheating phase 1110 to first charge phase 1120 as battery 206 is heating towards the transition threshold temperature or time. Thus phase 1110 can be divided into a first subphase 1114 where no charging occurs, and a second subsequent subphase 1116 after reaching a higher temperature where the charge pulse length is made longer than the discharge pulse length to commence charging but at a slower rate than the pulse charging second phase described below. An example embodiment of preheating signal 1112 applied during both subphases 1114 and 1116 is depicted in FIG. 11E. Second subphase 1116 can introduce charging at a fixed rate (e.g., 5% longer charge pulse) or can gradually begin charging by increments for time durations (e.g., 1% longer charge pulse for 30 seconds, followed by 2% longer charge pulse for 30 seconds, etc.) until transition to first charge phase 1120.

The transition of phase 1110 to first charge phase 1120, or alternatively the transition of first subphase 1114 to second subphase 1116, can occur at a condition where pulse charging can occur at a high C rate for fast charging without causing a significant side reaction, such as lithium plating. In some embodiments, this condition can be such that the average current of the intended pulse charging rate times the Warburg impedance ($R_{Warburg}$) does not result in a voltage that exceeds the overvoltage range for either electrode. In other embodiments, this condition that can govern transition to pulse charging can be when $R_{Warburg}$ is reduced to 50% or less, 40% or less, 30% or less, 20% or less, or 10% or less of the total impedance for each electrode. For embodiments where preheating phase 1110 transitions directly to a constant current charging phase 1130 (without pulse charging phase 1120), the transition condition can, in some examples, be when the activation impedance drops to 50% or less, 40% or less, 30% or less, 20% or less, or 10% or less of the total impedance for each electrode.

Figure 11F:
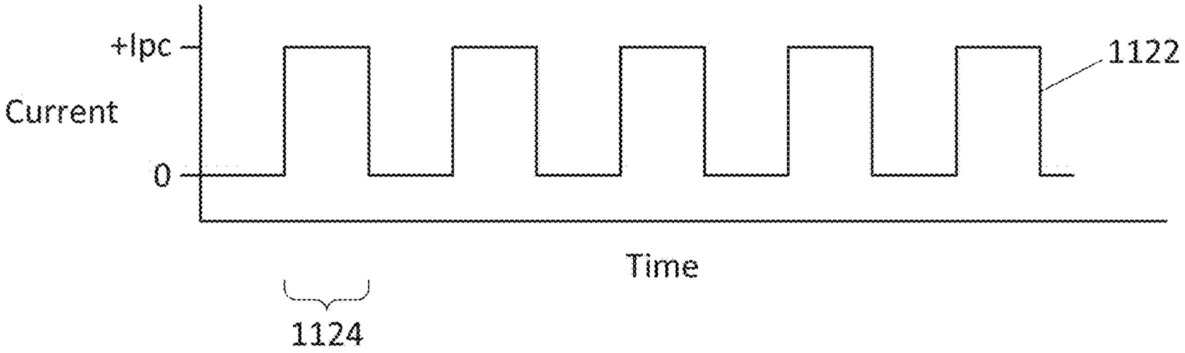
FIG. 11F is a current versus time graph depicting an example embodiment of a pulse charge signal for use in a pulse charging phase.

First charge phase 1120 is a pulse charging phase where a pulse charge signal is applied to battery 206. Phase 1120 allows fast charging at high C rates with a reduced activation overvoltage and with the occurrence of reduced side reactions as explained in greater detail herein. FIG. 11F is a current versus time graph depicting an example embodiment of a pulse charge signal 1122 for use in phase 1120. Signal 1122 oscillates between zero and +Ipc, and in this embodiment is in the form of a square wave where the +Ipc pulse has a duration 1124 and a 50% duty cycle. During phase 1120 the magnitude of signal 1122 can be controlled to maintain constant temperature of battery 206, or can be further increased to accelerate kinetics of the storage reaction to decrease further overvoltage on the electrochemical interfaces. Current controlled pulses are described with respect to preheating signal 111 and pulse charge signal 1122, but voltage controlled pulses can likewise be used.

The pulses applied in phase 1110 can have a voltage that exceeds the cutoff voltages (upper and lower) of energy source 206. In some embodiments, the amount that the phase 1110 pulses can exceed the cutoff voltage is limited by the breakdown voltage of the electrolyte. The pulses applied in phase 1120 can also have a voltage that exceeds the cutoff voltages (upper and lower) of energy source 206. In some embodiments, the amount that the phase 1120 pulses can exceed the cut off voltage is equal to or less than the pulse charge current times the activation impedance for the electrode.

Optimal frequency and duration 1124 of the applied pulse is dependent on the battery type. In many embodiments, a frequency ($F_{pulse}$) of pulse charge signal 1122 complies with equation (2):

$$F_{pulse} > 1/(R_{CT} * C_{DL}). \quad (2)$$

$F_{pulse}$ values above twice that of equation (2) substantially eliminate activation impedance and activation overvoltage (e.g., eliminate the $V_A$ and $R_{CT}$ components of FIG. 12C), allowing faster charging without exceeding the maximum overvoltage at the EC interface. It has been found that for certain embodiments of lithium ion batteries with a graphite anode and a nickel-cobalt cathode chemistry, a charge pulse duration 1124 of two milliseconds (ms) (e.g., 250 Hz at 50% duty cycle) can be utilized in protocol 1100 to charge battery 206 at fast rates (e.g., 0-75% charge in less than 15 minutes) without substantial capacity degradation over time (e.g., over the course of numerous charge cycles where battery 206 is cycled from low or no charge to a nominal SOC level) as compared to a constant current charge signal at similar amperage. A charge pulse duration 1124 of 5 ms or less can charge battery 206 at fast rates with significant improvements in capacity retention over time as compared to a constant current charge signal at similar amperage. The example embodiments described herein can be applied at any charge pulse duration 1124 that is operable for the battery type. The embodiments include charge pulse durations for lithium ion batteries that are 5 ms or less, 4 ms or less, 3 ms or less, 2 ms or less, and lms or less. The durations can be as short as 0.05 ms, or 0.1 ms. Data was collected at a 50% duty cycle but the pulses can be applied at various different duty cycles such as 25-75%, 40-60%, and 45-55%. In the embodiment the pulses are applied at a pulse C rate of 10.67 C to charge 80% in nine minutes, which results in an time average C rate of 5.33 C for the second phase given the 50% duty cycle (10.67 C/2).

Depending on the duty cycle the time average C rate can be larger or smaller to meet the desired target (e.g., 80% SOC within approximately nine minutes). The magnitude of the C rate itself is not a constraint insomuch as the applied C rate does not exceed the voltage and temperature constraints described herein, nor the chemical and physical constraints of the battery cell, and the electrical and physical constraints of the system being charged and the charger. Thus, time average C rates for the second phase can vary significantly across embodiments. In one example, the time average C rate for the pulse charging phase 1120 is from 4 C-8 C, although the present subject matter is not limited to such. For protocol 1100, time average C rates of 30 C and higher are within the scope of the present subject matter.

Pulse signal 1122 can be applied at a current magnitude such that each battery cell exhibits a voltage response that is greater than the open circuit voltage of the cell but less than an upper cut off voltage of the electrochemical interface voltage on the anode and on the cathode electrodes (excluding ohmic over voltages). In various embodiments, the pulses are applied such that each cell does not exceed the overvoltage range of the anode alone, the overvoltage range of the cathode alone, or the overvoltage range of the anode and cathode together. Pulse charging can drive the cell voltage to a higher voltage than constant current charging in the same (lower) temperature range as a result of the reduced activation overvoltages.

The optimal duration of phase 1120 is dependent on the battery type, and longer pulse charging phases can be used for chemistries that have more activation or activation that persists at higher temperatures. Pulse charging phase 1120 can continue until the activation impedance is reduced to 50% or less of the total initial impedance (e.g., as of the commencement of phase 1120). In other embodiments, phase 1120 can continue until the activation impedance is reduced to 40% or below, 30% or below, 20% or below, or 10% or below of the total impedance. Other constraints can also be determinative of when phase 1120 ends, such as cell temperature and cutoff voltage.

Referring back to FIGS. 11A and 11B, first charge phase 1120 can continue for a predetermined duration of time (e.g., time_1 to time_2), until an SOC or capacity threshold is reached (e.g., SOC_1), until a temperature threshold is reached (e.g., temp_2), or any combination thereof (e.g., ending when either a time, SOC, or temperature threshold is reached). Phase 1120 is intended for charging at relatively lower temperatures where the benefits of pulsing predominate, but is not limited to such. For example, phase 1120 can be also designed to further increase the temperature to one that is suitable for transitioning to the second charge phase 1130 to apply constant current charging to charge to higher states of charge.

In the embodiment of FIG. 11B, phase 1120 ends when the temperature of battery 206 is approximately 50 degrees C. In other embodiments, for example, the temperature threshold (temp_2) can be greater than 30 degrees C., such as between 30 and 60 degrees C., or between 40 and 55 degrees C. Threshold values outside these ranges are possible based on battery chemistry. In the embodiment of FIG. 11B, the temperature threshold to end phase 1120 is reached when the battery SOC reaches approximately 55%. In embodiments using an SOC threshold, that threshold can be between 30% and 80%, between 40% and 70%, or between 50 and 60%. In the embodiment of FIG. 11B, the second phase ends after a duration of approximately five minutes. In other embodiments, for example, the duration can be greater than one minute, such as between one minute and nine minutes, between 2 minutes and eight minutes, between three minutes and seven minutes, or between five minutes and seven minutes.

Second charging phase 1130 is a constant current charging phase where a constant current signal is applied to battery 206 without pulsing. Phase 1130 is intended for relatively higher temperatures at the electrochemical interface where that activation and diffusion-based impedances are reduced (e.g., the $V_A$, $R_{CT}$, $V_{Nernst}$, and $R_{Warburg}$ components of FIG. 12C), and thus the benefits of pulse charging are reduced. Reduced activation and diffusion impedances enable constant current charging at higher rates and at higher SOC without exceeding the maximum overvoltages. Phase 1130 can begin after completion of first charge phase 1120 and can continue until battery 206 is fully charged or significantly charged (>50%). As the open circuit voltage of each cell rises, the magnitude of the charge pulse is preferably controlled so as not to exceed the upper cut off voltage of each cell.

The constant current can be applied at a relatively high time average C rate such as 4 C-8 C (or higher). With constant current, there will generally be no difference between time average C rate and the actual C rate when current is applied, but in some cases minor variation in current may make time average C rate the more relevant metric.

Figure 13A:
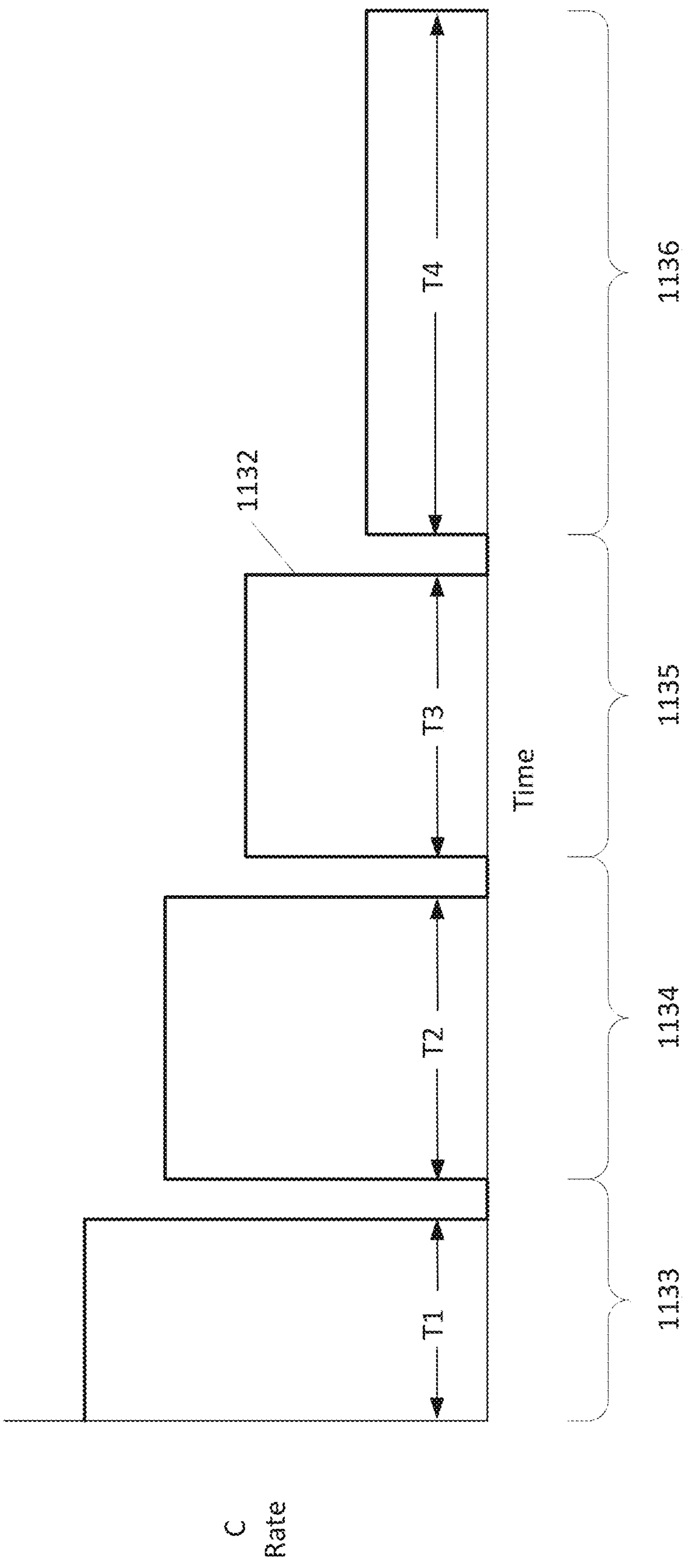
FIG. 13A is a graph depicting example levels for a constant current charge signal in a constant current charging phase.

In some embodiments, during second charge phase 1130, the magnitude of the constant current charge signal can be varied as the charge process proceeds. For example, in some embodiments the magnitude of constant current charge signal 1132 can begin phase 1130 at a relatively high C rate, then progressively transition to lower C rate values as the charge process proceeds in order to avoid exceeding the overvoltage range as the SOC increases (see FIG. 12E). A relatively brief pause or rest period can occur between constant current charges to allow the battery voltage to stabilize. FIG. 13A is a graph depicting example levels for constant current charge signal 1132 in phase 1130, where during a first subphase 1133 signal 1132 is applied at a first C rate (e.g., 6 C-8 C) for a first duration T1 (e.g., 60-120 seconds) followed by relatively shorter pause period (e.g., 5-15 seconds) where no signal is applied, then during a second subphase 1134 signal 1132 is applied at a second, relatively lower C rate (e.g., 4 C-6 C) for a second duration T2 (e.g., 90-150 seconds) again followed by a relatively shorter pause period (e.g., 5-15 seconds) where no signal is applied, then during a third subphase 1135 signal 1132 is applied at a third, still lesser C rate (e.g., 2 C-4 C) for a third duration T3 (e.g., 90-150 seconds) again followed by a relatively shorter pause period (e.g., 5-15 seconds) where no signal is applied, then during a fourth subphase 1136 signal 1132 is applied at a fourth still lesser C rate (e.g., 1 C-2 C) for a fourth duration T4 (e.g., 4-8 minutes) to complete the charge protocol embodiment 1100. The durations T1-T4 that signal 1132 is applied during each subphase 1133-1136 can be constant, or can be variable where signal 1132 is ceased once the battery (or cell) voltage reaches a threshold selected to avoid entering an overvoltage condition. The example C rates and durations proved here are merely examples and not limiting as embodiments are practical outside of these ranges. Phase 1130 can be performed with a single constant current rate, or any number of two or more subphases (e.g., 1133-1136) where the constant current rate is iteratively decreased.

Figure 13B:
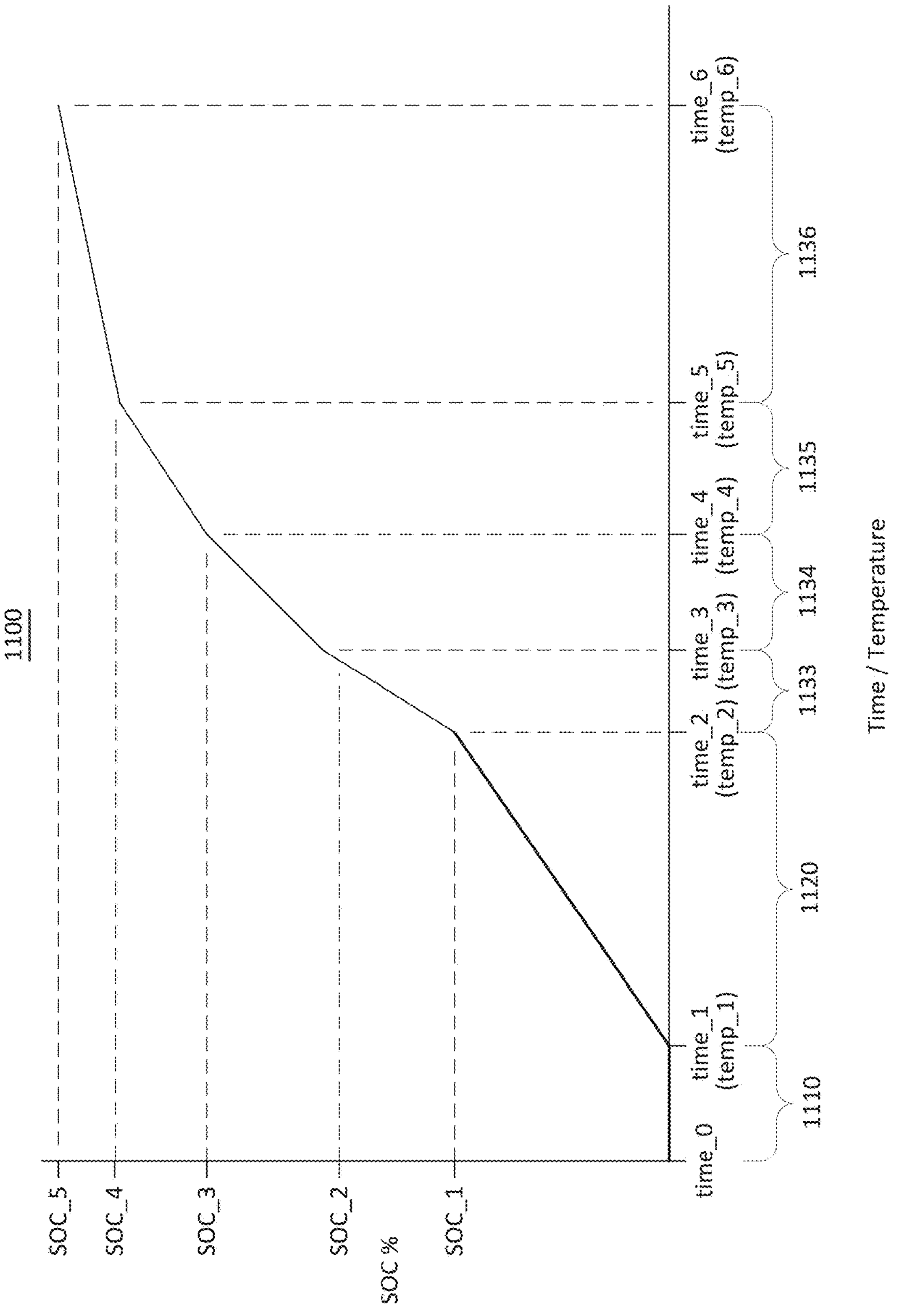
FIG. 13B is a graph depicting another example embodiment of a fast charge protocol with constant current signals at progressively decreasing magnitudes.

FIG. 13B is a graph of another example embodiment of protocol 1100 where second charge phase 1130 is applied with constant current signals at progressively decreasing magnitudes like that described with respect to FIG. 13A. Each of subphases 1133-1136 can be terminated and transitioned to the next subphase upon occurrence of a time threshold, temperature threshold, SOC threshold, voltage threshold, and/or any combination thereof.

Protocol 1100 is not required to execute all three phases 1110, 1120, and 1130. In some embodiments, first charge phase 1120 can be omitted and protocol 1100 can proceed immediately from pulse preheating phase 1110 to constant current charging phase 1130. In other embodiments, second charge phase 1130 can be omitted and protocol 1100 can proceed immediately from pulse preheating phase 1110 to first charge phase 1120 and subsequently end. In still other embodiments, pulse preheating phase 1110 can be omitted, for example, in cases where battery 206 is already sufficiently heated. Example embodiments with these and other variations to protocol 1100 are described with respect to FIGS. 19B-19G.

Protocol 1100 also include monitoring each battery 206 for indications of potentially degradatory conditions. This monitoring, which can be performed during any and all of phases 1110, 1120, and 1130, can include voltage and/or impedance response analysis and/or monitoring for an indication that lithium plating has occurred. For example, the voltage and impedance of each battery 206 can be monitored with voltage and impedance response analysis to detect an indication of accelerated or decelerated side reactions (e.g., see FIG. 12F). Detection of side reactions can be used to modify a characteristic of the charging signal, e.g., the voltage of the charging signal can be reduced to decelerate side reactions, the duration of a charge pulse can be reduced to decelerate side reactions, and the frequency of application of charge pulses can be reduced to decelerate side reactions, or the reverse can be performed if it is determined that the rate of side reactions are low enough to permit faster charging. Voltage and impedance analysis can be performed during all three phases (1110, 1120, 1130), during only preheat phase 1110, during only first charge phase 1120, during only second charge phase 1130, or any combination thereof.

Figure 14:
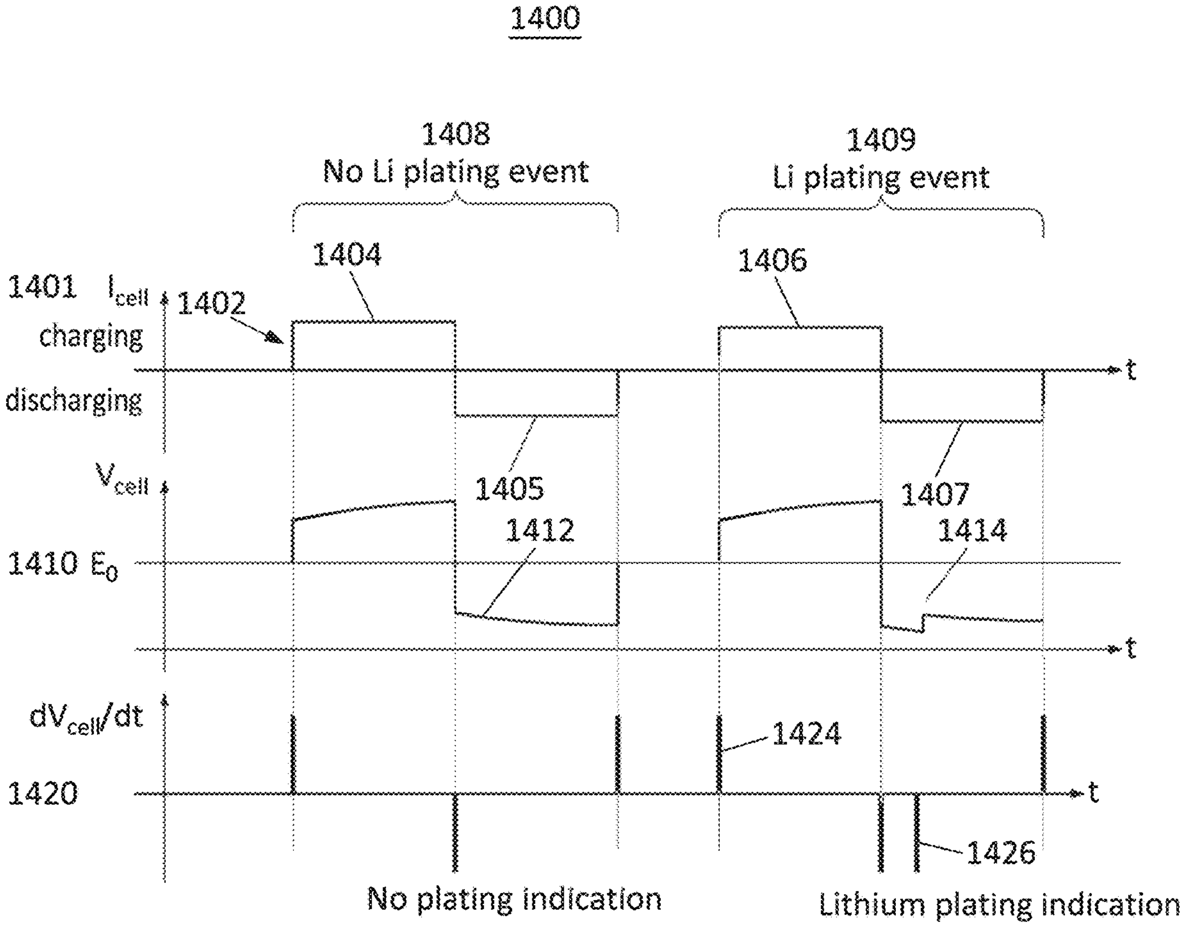
FIG. 14 is a series of plots depicting an example embodiment of monitoring for an indication that lithium plating has occurred.

FIG. 14 is a series of plots depicting an example embodiment 1400 of monitoring for an indication that lithium plating has occurred. In this embodiment a signal 1402 is applied to battery 206, where signal 1402 includes a charge pulse immediately followed by a discharge pulse of equal or substantially equal duration, as shown in plot 1401 at top. There may be a small time gap between the application of the pulses. Here, a first charge pulse 1404 and a subsequent discharge pulse 1405 are shown for an example 1408 where no lithium plating has occurred, and a second charge pulse 1406 and a second discharge pulse 1407 are shown for an example 1409 where lithium plating has occurred.

A voltage response of battery 206 to signal 1402 can be monitored as shown in the middle plot 1410. A normal voltage response 1412 is shown at left for the example where no lithium plating has occurred, and a voltage response 1414 indicating that lithium plating has occurred is shown at right, specifically an indication that plated lithium has been stripped. If a lithium plating event has occurred then this becomes evident in the portion of voltage response 1414 to the discharge pulse 1406, typically a relatively rapid transition in the response 1414 from one voltage to another voltage while the discharge pulse is being applied at a generally constant magnitude. This rapid transition in voltage response 1414 is indicative of plated lithium being subsequently stripped. Thus the response is generated by stripping of lithium, and is thus indicative of lithium plating having occurred previous to the application of discharge pulse 1407.

The plating can be detected directly from the voltage response, or from a derivation 1422 of the voltage response as depicted in plot 1420 at bottom. The derivation of the voltage response produces a transition (e.g., a peak or spike, either positive or negative) at times where the voltage response undergoes a relatively significant nonlinear transition, such as where the current pulses are initiated and terminated 1424, and also where a lithium stripping event occurs as shown by 1426. In some embodiments, only the voltage response or derivation thereto with respect to the discharge pulse is monitored. If lithium plating is detected then a characteristic of the charging signal can be modified as described with respect to impedance monitoring above. Lithium plating detection 1400 can be performed intermittently during all three phases, during only preheating phase 1110, during only first charge phase 1120, during only second charge phase 1130, or any combination thereof. For example, monitoring routine 1400 can be performed once every 5 seconds, 10 seconds, 20 seconds, or any other desired interval. Routine 1400 can include the application of one pair of pulses (e.g., 1404 and 1405) or multiple pairs. The pulse length can range from 0.1 ms to 10 seconds, preferably on the order of 100 ms or less so as to minimally impact the charge time of routine 1400.

Figure 15A:
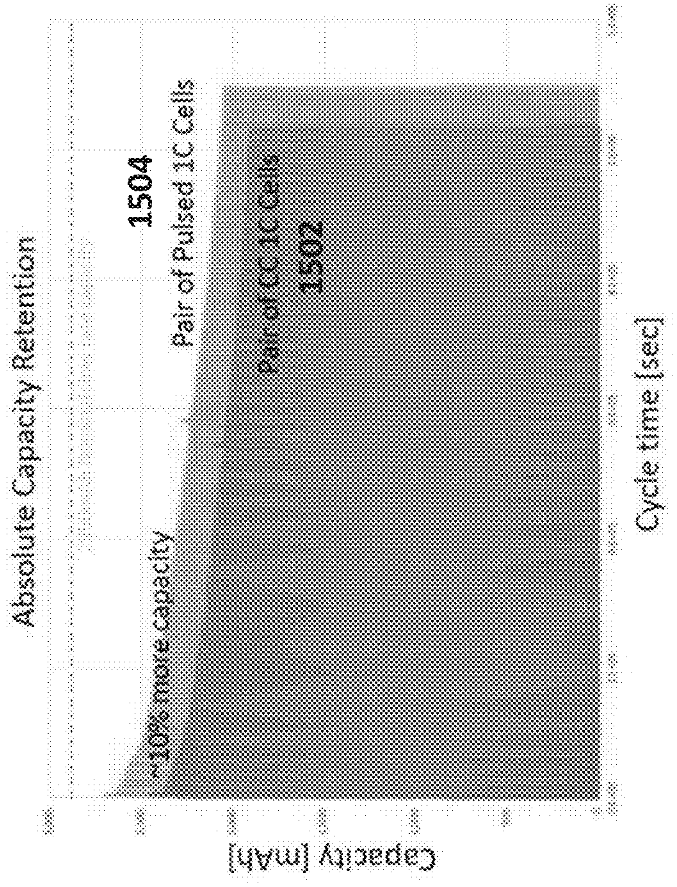
FIGS. 15A-15B are plots of absolute capacity retention and normalized capacity retention, respectively, comparing experimental data of constant current charging and an example embodiment of pulse charging performed on pairs of lithium ion battery cells rated for use in power applications.

FIG. 15A is a plot of experimental data comparing the effects of pulse charging and constant current charging on a pair of lithium ion battery cells rated for use in power applications such as in a conventional EV car battery pack. Dat 1502 indicates the results from cells that were charged with constant current at a 1 C rate, and data 1504 indicates the results from cells that were pulse charged in a manner similar to that described for pulse charge phase 1120. FIG. 15A compares capacity in milliamp hours (mAh) to cycle time, which is a measure of the cumulative time the cells were tested in repeated cycling. A constant current charge cycle was formed by application of 1 C constant current o charge to approximately 2.5 Ah of a 2.95 Ah full rated capacity, followed by discharge to zero at a 1 C rate, and then the cycle was repeated. A pulse cycle was formed by application of 1 C pulses with 2 ms durations at a 50% duty cycle for one hour, followed by discharge for one hour at a 1 C rate, and then the cycle was repeated. The experimental data was collected at 25 degrees C. and the cycles were run for approximately 280 hours. FIG. 15A shows that the pulse charged cells achieved on average a 10% greater capacity than the constant current charged cells in each cycle and the cycle life for both degraded at approximately the same rate.

Figure 15B:
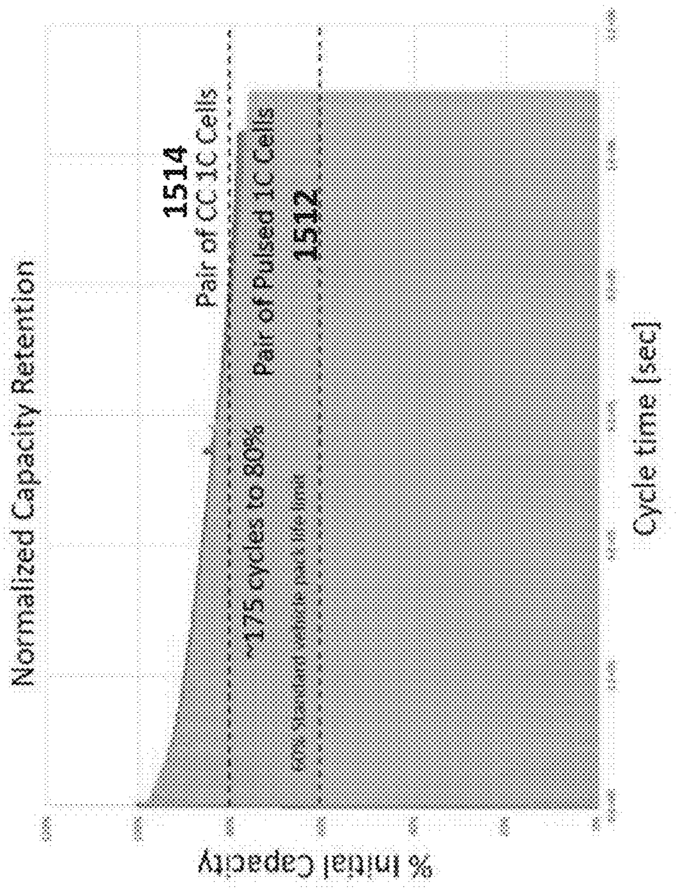

FIG. 15B shows the same data as in FIG. 15A but in normalized form, where capacity is shown as the percent of the initial capacity achieved. This again shows almost identical reduction in cycle life for the pulse charged cell data 1514 as compared to the constant current data 1512. Thus the data of FIGS. 15A-15B indicate that pulse charging is not causing increased cycle life degradation as compared to constant current cells. Pulse charging reduces the activation impedance and can result in improved capacity. If conditions are adjusted to pulse charge the cells to the same lower capacity as the constant current cells were achieving, then cycle life for the pulse charged cells would be improved as compared to the constant current charged cells.

Figure 16A:
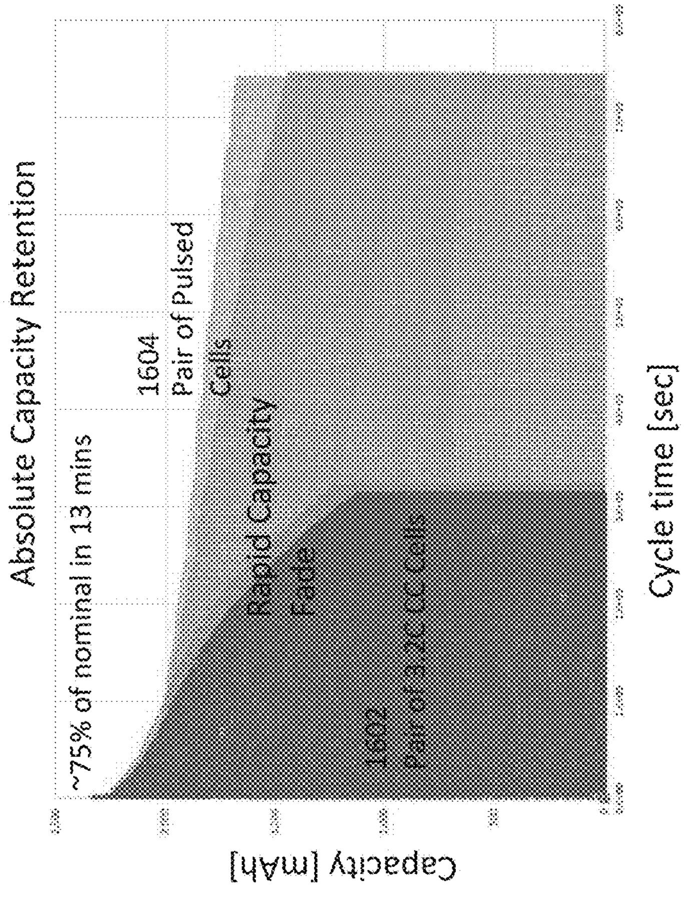
FIGS. 16A-16B are plots of absolute capacity retention and normalized capacity retention, respectively, comparing experimental data of constant current charging and an example embodiment of a fast charging protocol performed on pairs of lithium ion battery cells rated for use in power applications.

FIG. 16A is a plot of experimental data comparing the effects of fast charging protocol 1100 with constant current charging on a pair of lithium ion battery cells rated for use in power applications such as in a conventional EV car battery pack. Protocol 1100 was performed with a preheating phase 1110, a first charge phase 1120, and a second charge phase 1130, and then cooled and discharged to form one cycle. This cycle was repeated continuously and independently on the two battery cells. FIG. 16C is a graph of capacity versus time, and FIG. 16D is a graph of voltage versus time, both showing data collected from performance of one example cycle of protocol 1100 on a battery cell. This example embodiment of protocol 1100 included a net zero charge pulse preheat phase 1110 that raised the cell temperature from approximately 20 degrees C. to approximately 35 degrees C. This was followed by a pulse charge phase 1120 for 3 minutes where 2 ms pulses at 5 C and a 50% duty cycle were applied. This was, in turn, followed by a constant current charge phase 1130 having a first subphase 1133 with a 7 C rate for 90 seconds followed by a 10 second rest period, a second subphase 1134 with a 5 C rate for 120 seconds followed by a 10 second rest period, a third subphase 1135 with a 3.3 C rate for 120 seconds followed by a 10 second rest period, and a fourth subphase 1136 with a 1.8 C rate for 6 minutes. Pulse charge phase 1120 and subphases 1133-1136 were also subject to cell voltage limits (4.25V for phase 1120, 4.2V for subphases 1133-1136). This example of protocol 1100 achieved a greater than 75% nominal capacity in less than 13 minutes. After charging, a relatively longer rest period of approximately 60 seconds was performed to allow the battery cell to cool, after which the cell was discharged at a rate that achieved zero capacity at the expiration of one hour from start of protocol 1100.

Figure 16B:
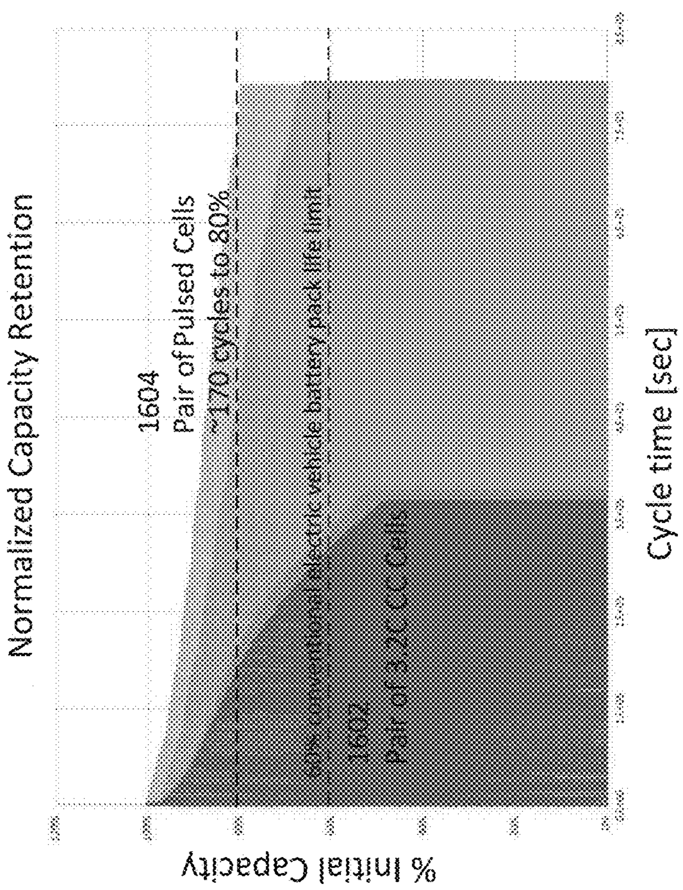
Figure 16C:
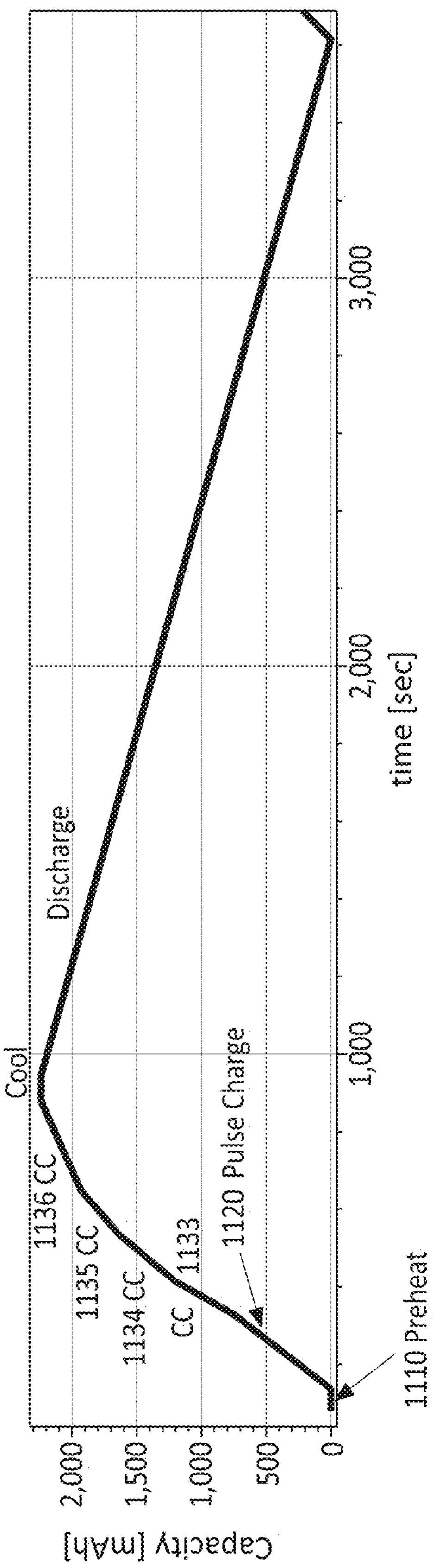
FIG. 16C is a graph of capacity versus time.
Figure 16D:
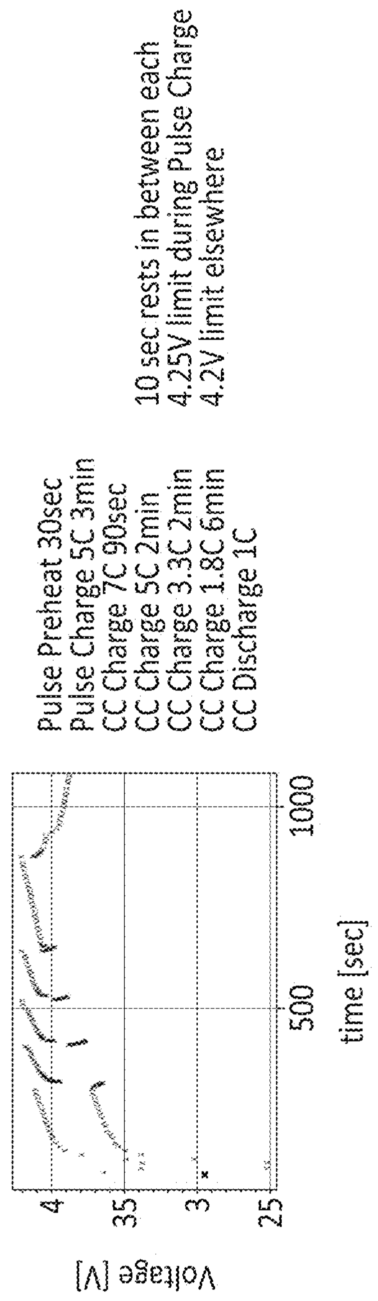
FIG. 16D is a graph of voltage versus time, both showing data collected from performance of one example cycle of the fast charging protocol on a battery cell.

Referring back to FIG. 16A, data 1602 indicates the results from cells that were charged with constant current at a 3.2 C rate, and data 1604 indicates the results from cells that were charged with protocol 1100 as described with respect to FIGS. 16B-16C. FIG. 16A compares capacity (mAh) to cycle time, which is a measure of the cumulative time the cells were tested in repeated cycling. A constant current charge cycle for data 1602 was formed by application of 3.2 C constant current for 13 minutes, followed by discharge at rate to achieve full discharge after one hour from the start, such that a full constant current cycle lasted one hour, then the cycle was continuously repeated. The cycles were run for approximately 200 hours. FIG. 16B shows the same data as in FIG. 16A but in normalized form, where capacity is shown as the percent of the initial capacity achieved.

FIGS. 16A-16B shows that a rapid capacity fade occurs with the standard constant current fast charging data 1602. This rapid capacity fade is causes by a high impedance growth induced in the cells by constant current charging. Conversely, fast charging protocol 1100 avoids this impedance growth and enables substantially improved capacity retention (similar to 1 C baseline rate of FIGS. 15A-15B) while achieving 75% of nominal capacity in less than 13 minutes. Still further refinement of the parameters of protocol 1100 can lead to even faster charge times of 10 minutes or less to reach the same or similar capacity.

Figure 17A:
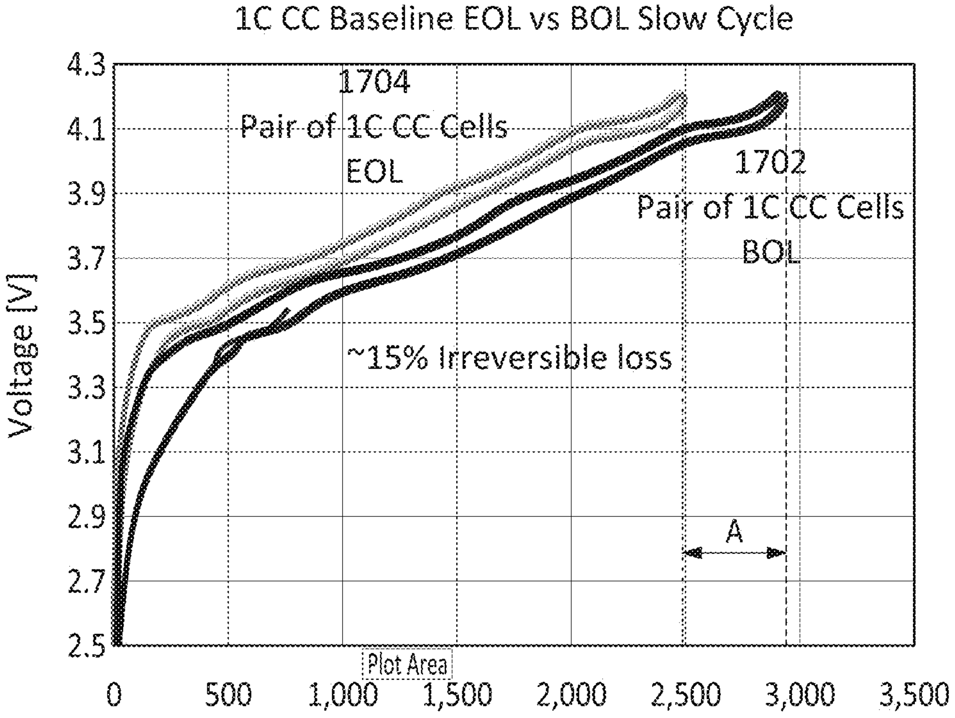
FIGS. 17A-17B are plots of voltage versus capacity comparing experimental data of constant current charging and an example embodiment of pulse charging, respectively, performed on pairs of lithium ion battery cells rated for use in power applications.
Figure 17B:
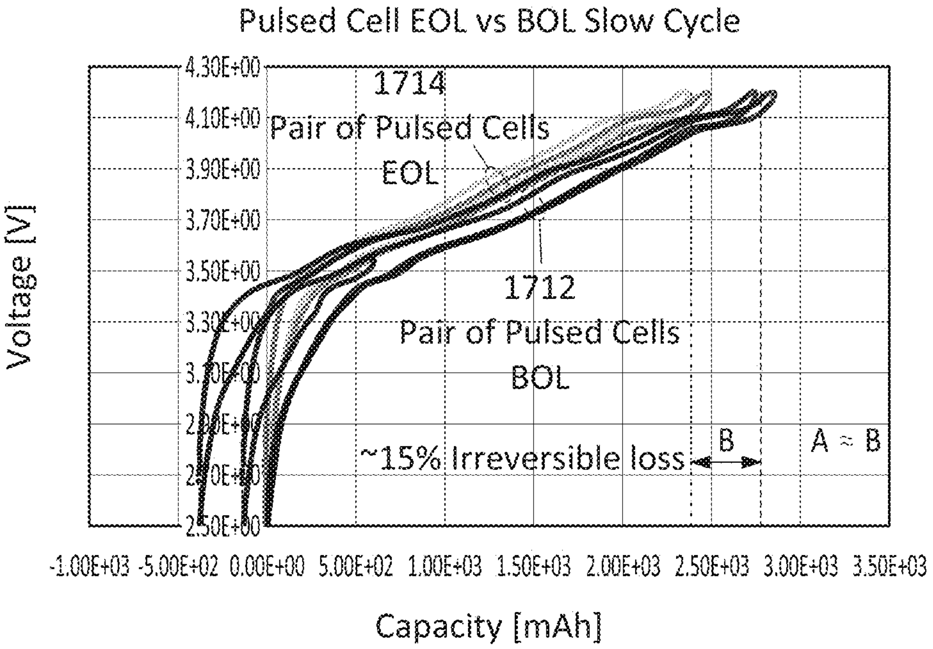

The battery cells used to collect the data of FIGS. 15A-15B were subjected to slow charge cycle characterization analysis and the results are presented in the voltage versus capacity plots of FIGS. 17A-17B. FIG. 17A depicts data for the 1 C constant current charged cells, where characterization curve 1702 was taken at the beginning of life (BOL) before the testing described with respect to FIGS. 15A-15B and characterization curve 1704 was taken at the end of life (EOL) after that testing was complete. A comparison of curves 1702 and 1704 indicates that the constant current cells underwent an irreversible capacity loss of approximately 15%. FIG. 17B depicts data for the 1 C pulse charged cells, where characterization curve 1712 was taken at the beginning of life (BOL) before the testing described with respect to FIGS. 15A-15B and characterization curve 1714 was taken at the end of life (EOL) after that testing was complete. A comparison of curves 1712 and 1714 indicates that the pulse charged cells also underwent an irreversible capacity loss of approximately 15%. Thus at EOL the pulse charged cells had similar irreversible capacity loss to the constant current cells as compared to (BOL). Cycle life was also comparable. The pulse charging thus does not significantly degrade the cells nor cause rapid impedance growth.

Figure 18A:
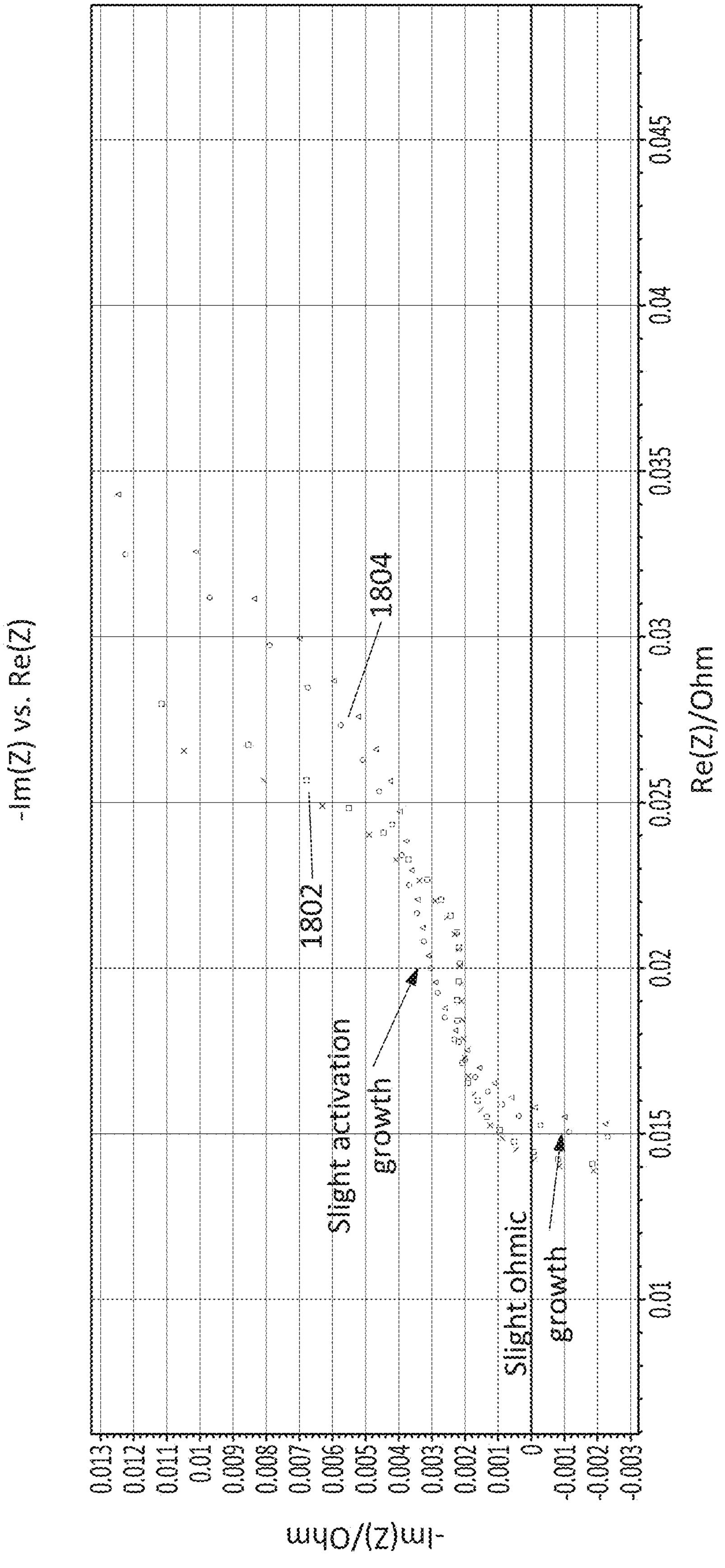
FIG. 18A is a plot of imaginary and real impedance components for constant current charged cells and pulse charged cells at end of life.

FIG. 18A is a plot of imaginary and real impedance components for the constant current charged cells and the pulse charged cells at EOL. Data 1802 corresponds to the constant current charged cells and data 1804 corresponds to the pulse charged cells. Both pairs of cells exhibit substantially the same impedance characteristics, with the pulse charged cells showing only slightly higher ohmic and activation components to their impedance. This is likely due to SEI layer buildup and resulting impedance growth due to higher than optimal temperatures, which can be alleviated through further refinement of the parameters of protocol 1100 allowing greater temperature control.

Figure 18B:
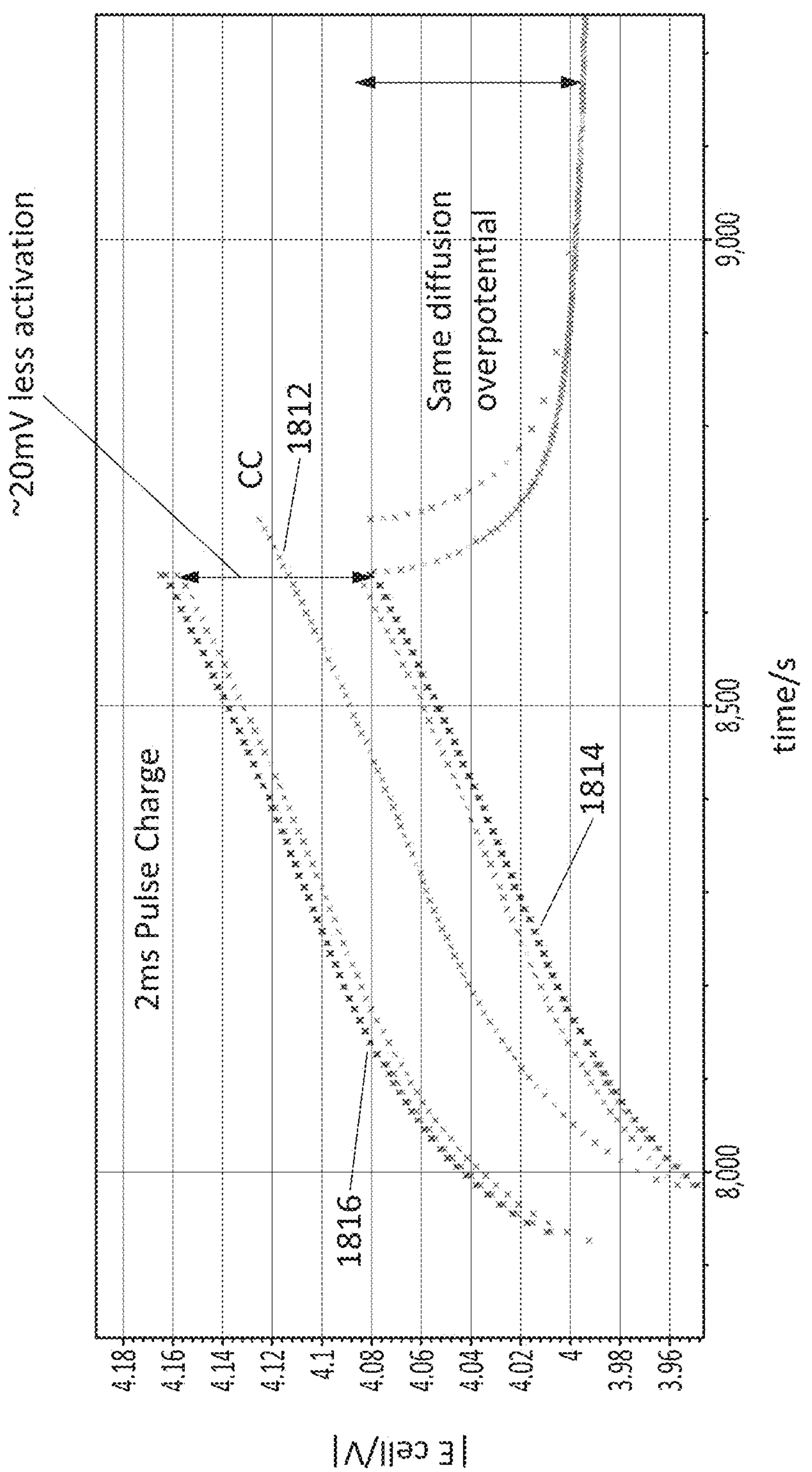
FIG. 18B is a plot of cell voltage versus time depicting experimental data collected for lithium ion cells exposed to constant current charging and pulse charging with different pulse durations.

FIG. 18B is a plot of cell voltage versus time depicting experimental data collected for lithium ion cells exposed to constant current charging (1812), pulse charging with 10 ms pulse duration (1814) and pulse charging with 2 ms pulse duration (1816). Charging at either constant current or pulse charging, followed by a rest, allows quick measurement of ohmic/activation vs diffusion contribution. The measurements are summarized in TABLE 1 below. These findings exhibit that pulse charging 1816 reduces activation impedance and activation overvoltage while maintaining similar diffusion overpotentials.

TABLE 1

| Charging | Frequency | Ohmic impedance | Activation impedance | Ohmic overvoltage | Activation overvoltage |
|---|---|---|---|---|---|
| Constant Current | 0 Hz | 20.7 mOhm | 7.8 mOhm | 36 mV @ 1.75A | 14 mV @ 1.75A |
| 10 ms pulse | 50 Hz | 20.7 mOhm | 7.2 mOhm | 72 mV @ 3.5A | 26 mV @ 3.5A |
| 2 ms pulse | 250 Hz | 20.7 mOhm | 1.2 mOhm | 72 mV @ 3.5A | 5.6 mV @ 3.5A |

Figure 19D:
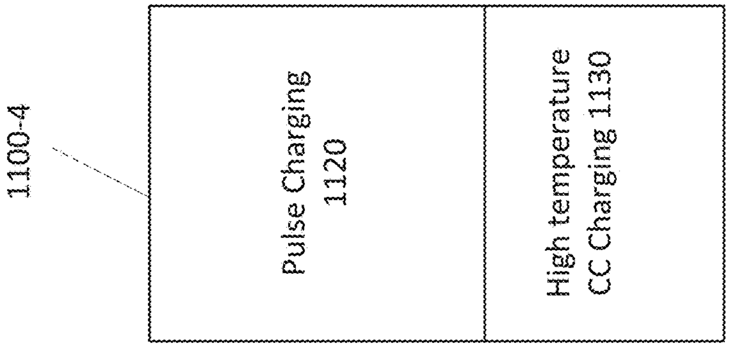
FIGS. 19A-19G are block diagrams depicting example embodiments of implementations of fast charge protocols for various battery types.
Figure 19C:
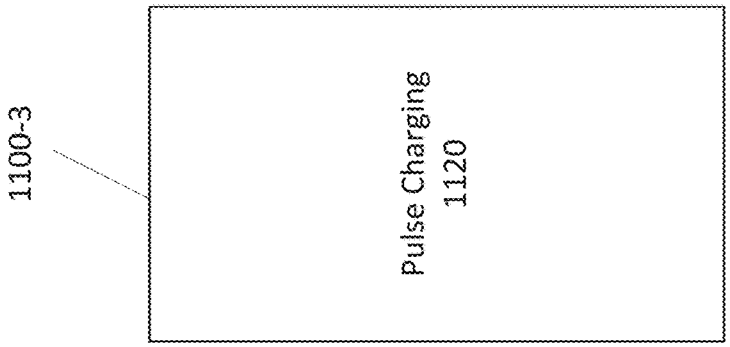
Figure 19B:
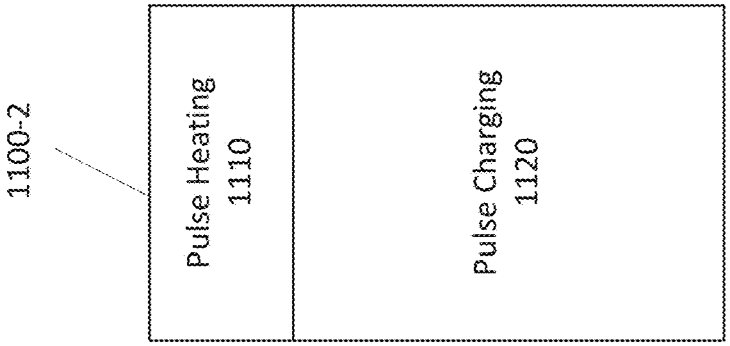
Figure 19A:
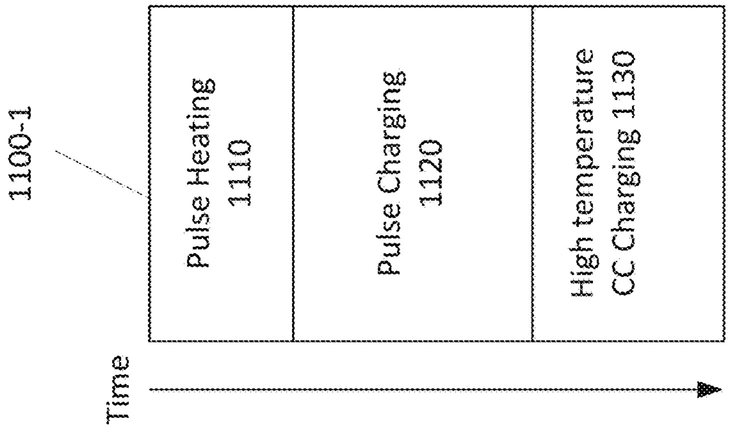

FIGS. 19A-G are block diagrams depicting example embodiments of implementations of fast charge protocol 1100 for various battery types. In these figures, cell temperature generally increases with time. FIG. 19A depicts protocol 1100-1 implemented in accordance with the embodiments of FIGS. 11A-11B where a pulse preheating phase 1110 is performed first, followed by a pulse charge phase 1120, and ending with a relatively higher temperature constant current (CC) charge phase 1130. Protocol 1100-1 can be used for example with NMC or NCA battery cells.

FIG. 19B depicts protocol 1100-2 having a pulse preheating phase 1110 performed first followed by pulse charge phase 1120 with constant current charge phase 1130 omitted. By way of example, this embodiment can be suitable for battery types that, compared with NMC or NCA battery cells, have a chemistry with relatively higher activation but relatively lower diffusion at the acceptable charging temperatures.

FIG. 19C depicts protocol 1100-3 having only a pulse charge phase 1120 with preheating phase 1110 and constant current charge phase 1130 omitted. By way of example, this embodiment can be suitable for battery types that, compared with NMC or NCA battery cells, have a chemistry with relatively higher activation at the acceptable charging temperatures.

FIG. 19D depicts protocol 1100-4 having a pulse charge phase 1120 followed by a constant current charge phase 1130, but with preheating phase 1110 omitted. By way of example, this embodiment can be suitable for battery types that, compared with NMC or NCA battery cells, have a chemistry with relatively lower activation at high states of charge that enables constant current charging at those high states of charge.

Figure 19E:
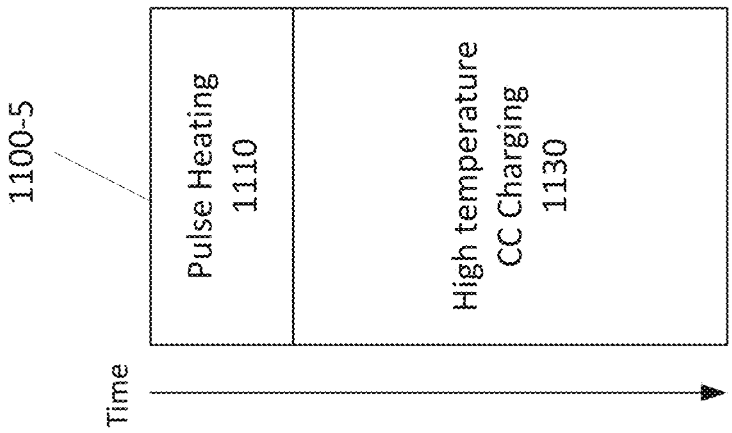

FIG. 19E depicts protocol 1100-5 having a pulse preheating phase 1110 immediately followed by a constant current charge phase 1130. Pulse charge phase 1120 is omitted. By way of example, this embodiment can be suitable for battery types that, compared with NMC or NCA battery cells, have a chemistry with relatively lower activation at the acceptable charging temperatures.

Figure 19F:
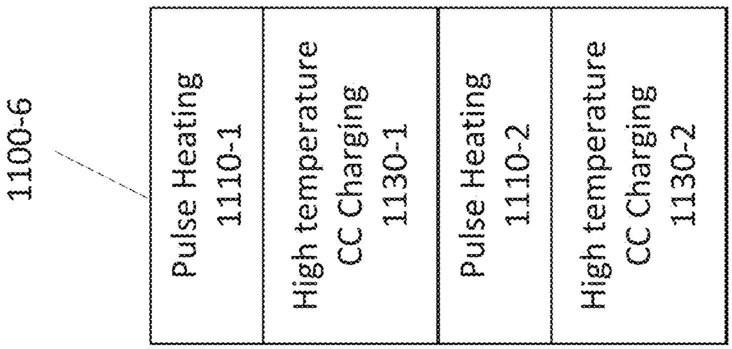

FIG. 19F depicts protocol 1100-6 that is similar to 1100-5 with the first preheat phase 1110-1 and a constant current phase 1130-1, but protocol 1100-6 repeats this regime with a second pulse preheating phase 1110-2 and a second constant current charge phase 1130-2. By way of example, this embodiment can be suitable for battery types that, compared with NMC or NCA battery cells, have a chemistry with relatively lower activation at the acceptable charging temperatures, and is performed across two separate temperature regimes.

Figure 19G:
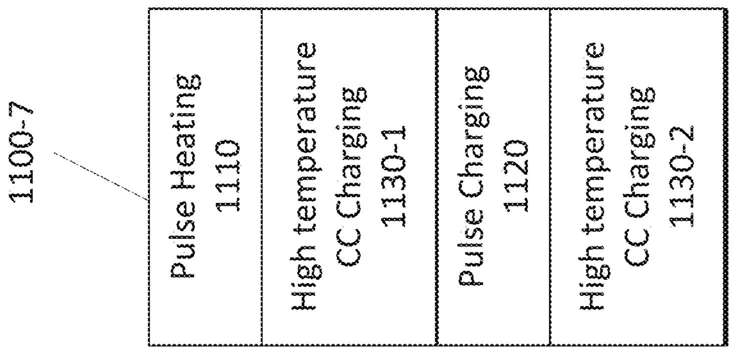

FIG. 19G depicts protocol 1100-7 having a pulse preheating phase 1110 immediately followed by a first constant current charge phase 1130-1, then followed by a pulse charge phase 1120 and a second constant current charge phase 1130-2. By way of example, this embodiment can be suitable for battery types that, compared with NMC or NCA battery cells, have a chemistry with relatively higher activation at midrange states of charge.

The protocol embodiments described with respect to FIGS. 19A-19G, and elsewhere herein, can be performed independently for each energy source in the system being charged. Information about the conditions of each source (e.g., SOC, temperature, voltage response, impedance response, indication of lithium plating, etc.) can be collected for each source and communicated to the control system (e.g., 102) to enable coordinated system wide management of the application of protocol 1100 and distribution of power in power connections (e.g., 110) to each module or source. For example, a modular energy system 100 having an array of N different modules 108 each having an energy source 206, can perform protocol 1100-1 of FIG. 19A independently at each of the N modules 108. Determinations of when each source 206 has reached a transition condition (e.g., from phase 1110, 1120 to phase 1120, 1130, or between subphases 1114, 1116, 1133-1136) can be made by the control system 102 (e.g., MCD 112) and appropriate instructions can be issued such that the that module 108 transition to the next phase for each source 206 therein (e.g., by MCD 112 instructing LCD 114 to modify the switching signals to converter 202 to generate charge pulses (or constant current) as opposed to a preheating pulse train). A first group of one or more modules 108 may have satisfied a condition for transitioning from pulse preheating phase 1110 to pulse charging phase 1120 (e.g., at a minimum temperature, etc.), while a second group of one or more different modules 108 may not yet have satisfied the condition. Thus, system 100 can control and divide application of power with control system 102 (e.g., at the direction of MCD 112) such that the first group of one or more modules 108 are in pulse charging phase 1120 at the same time that the second group of one or more different modules 108 remain in pulse preheating phase 1110. When each module 108 of the second group independently reaches the transition condition, that module 108 can enter the pulse preheating phase with the first group of modules 108. Similarly, when each module 108 in pulse charging phase 1120 independently reaches the condition to transition to constant current charging phase 1130, that module 108 can transition from phase 1120 to phase 1130. In some examples all of the different phases 1110, 1120, and 1130 may be executed on different energy sources within the same system concurrently. The same applies to the execution of protocol subphases (e.g., 1114, 1116, and 1133-1136) on the sources within the system, such that different subphases can be executed on different sources concurrently.

Figure 20:
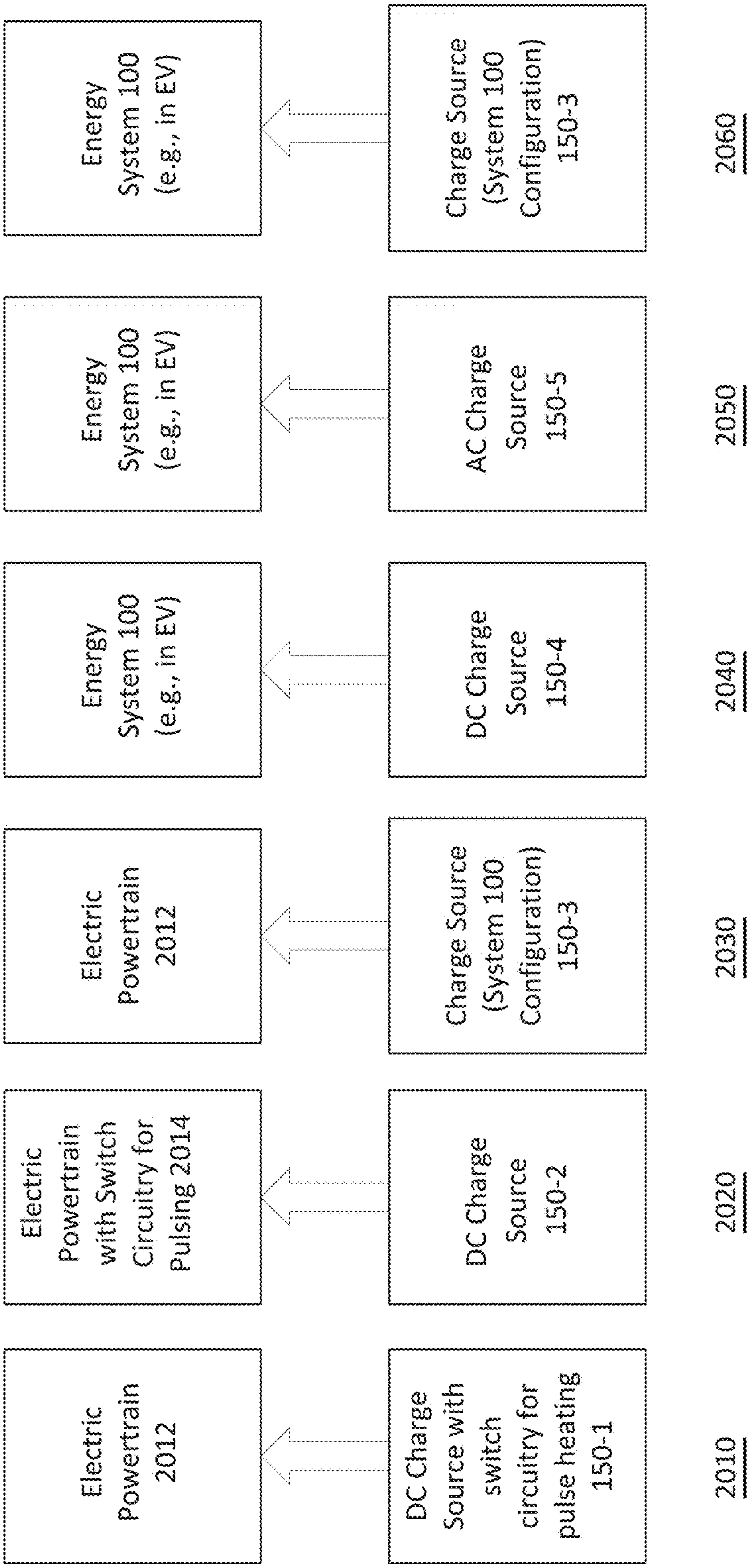
FIG. 20 is a block diagram depicting example embodiments of applications that can be configured to apply fast charging protocols described herein.

FIG. 20 is a block diagram depicting example embodiments of applications that can be configured to apply protocol 1100 described herein. Here, charge sources 150 are shown in the bottom row and energy source configurations being charged are shown in the top row. In the example configuration 2010, charge source 150-1 is configured as a DC charger with switching circuitry to permit the DC charge voltage to be pulsed for performance of pulse preheating. Charge source 150-1 is used to charge a conventional electric power train 2012, such as a serially connected battery pack of a conventional electric vehicle. In the example configuration 2020, charge source 150-2 is configured as a DC charger and is used to charge conventional power train 2014 configured with switch circuitry to permit the received DC charge voltage to be pulsed for preheating and/or charging prior to input to the battery energy storage. In the example configuration 2030, charge source 150-3 is configured in accordance with embodiments of system 100 described with respect to FIGS. 1A-10F, and supplies a pulsed DC or AC voltage to conventional power train 2012. In the example configuration 2040, charge source 150-4 is configured as a DC charger used to supply a DC charge voltage to energy system 100 configured in accordance with embodiments described with respect to FIGS. 1A-10F. In the example configuration 2050, charge source 150-5 is configured as an AC charger used to supply an AC charge voltage to energy system 100 configured in accordance with embodiments described with respect to FIGS. 1A-10F. In the example configuration 2060, charge source 150-3 (like that of configuration 2030) is used to supply a DC or AC voltage to energy system 100 configured in accordance with embodiments described with respect to FIGS. 1A-10F, in which case either the charge source or system 100 can supply the pulse capability.

While not limited to such, configurations 2010, 2020, and 2030 may be particularly suitable for relatively lower voltage applications (e.g., 10 watt-hours to 20 kilowatt-hours (kWh)), while configurations 2040 and 2050 may be particularly suitable for relatively higher (moderate) voltage applications (e.g., 20 kWh to 100 kWh), and configuration 2060 may be particularly suitable for relatively higher voltage applications (e.g., 100 kWh and greater).

All of the aforementioned embodiments pertaining to pulsed charging can be implemented according to a pulse width modulated control scheme or a hysteresis based control scheme as described herein, with additional constraints as to pulse length implemented where applicable so as not to violate pulse duration conditions of certain embodiments described herein.

All of the aforementioned embodiments pertaining to fast charging can likewise be used to discharge the system in a fast manner as well.

In all of the embodiments described herein, the primary energy source of each module of a particular system can have the same voltage (either standard operating voltage or nominal voltage). Such a configuration simplifies management and construction of the system. The primary and second energy sources can also have the same voltage (standard or nominal). Other configurations can be implemented, such as those where primary energy sources of different modules of the same system have different voltages (standard or nominal), and those where the primary and secondary energy sources of a module have different voltages (standard or nominal). Still other configurations can be implemented, where primary energy sources of modules of a system have primary energy source batteries that are different chemistries, or where modules of the system have a primary energy source battery of a first chemistry, and a secondary energy source battery of a second chemistry. The modules that differ from each other can be based on placement in the system (e.g., modules within a phase array are different than the IC module(s)).

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

In many embodiments, a method for charging an energy source is provided, the method including: applying a preheating signal including a sequence of alternating charge and discharge energy pulses to the energy source such that the temperature of the energy source increases; and then applying a charging signal to the energy source such that the charge of the energy source increases.

In some embodiments, the preheating signal is applied until the energy source reaches a first temperature, and the charging signal is applied after the energy source reaches the first temperature.

In some embodiments, the preheating signal is applied for a first time duration, and the charging signal is applied after the first time duration.

In some embodiments, the preheating signal has a frequency such that no electrochemical storage reaction nor side reaction takes place in the energy source.

In some embodiments, the energy source is a lithium ion battery and the preheating signal has a frequency greater than one kilohertz.

In some embodiments, the preheating signal has a frequency such that electrochemical charge transfer of a main storage reaction and side reactions of the energy source are bypassed. The method where the electrochemical charge transfer can be bypassed by the interface capacities of electrodes of the energy source to an electrolyte of the energy source.

In some embodiments, the charging signal includes a plurality of charge pulses. The method where the plurality of charge pulses can have pulse durations less than or equal to ten milliseconds, less than or equal to five milliseconds, or less than or equal to two milliseconds. The method where the energy source can have an open circuit voltage and an upper cutoff voltage, and where the plurality of charge pulses can be at a voltage between the open circuit voltage and the upper cutoff voltage.

In some embodiments, the charging signal is a first charging signal including a plurality of pulses, the method can further include: applying a second charging signal to the energy source after applying the first charging signal, where the second charging signal can be a constant current charging signal. The method where the preheating signal can be applied until the energy source reaches a first temperature, the first charging signal can be applied until the energy source reaches a second temperature, and the second charging signal can be applied after the energy source reaches the second temperature. The method where the first temperature can be 25 degrees Celsius or higher, or between 25 degrees and 40 degrees Celsius. The method where the second temperature can be 45 degrees Celsius or higher, or between 45 degrees and 55 degrees Celsius. The method where the first charging signal can be applied until the energy source reaches a first state of charge, and the second charging signal can be applied after the energy source reaches the first state of charge. The method where the second charging signal can be applied until the energy source reaches a state of charge of 95% or higher. The method where the energy source can have a state of charge of 5% or less at a first time that the first charging signal is applied, where the energy source can have a state of charge of 75% or greater at a second time after the second charging signal is applied, and where the difference between the first time and the second time can be ten minutes or less. The method where the preheating signal can be applied for two minutes or less before application of the first charging signal.

In some embodiments, the energy source is a battery including lithium, the method can further include monitoring the energy source for lithium plating. The method where monitoring the energy source for lithium plating can include determining whether a voltage response of the energy source to application of a charge pulse followed by a discharge pulse including a lithium stripping signature. The method where monitoring the energy source for lithium plating can include: applying a charge pulse immediately followed by a discharge pulse to the energy source; performing a derivation of a voltage response to at least the discharge pulse; and determining whether the derivation includes a lithium stripping signature. The method where monitoring the energy source for lithium plating can be performed intermittently during a charging phase of the energy source where the charging signal is applied.

In some embodiments, the method can further include monitoring an impedance of the energy source for an indication of degradation. The method can further include adjusting application of the charging signal in response to the monitored impedance. The method where monitoring an impedance of the energy source can be performed intermittently during a charging phase of the energy source where the charging signal is applied.

In some embodiments, the energy source is a battery cell.

In some embodiments, the energy source is a battery module including a plurality of battery cells.

In some embodiments, the charging signal includes a plurality of charge pulses, and application of the preheating signal is stopped and application of the charging signal is commenced when a Warburg impedance of an electrode of the energy source is 20% or less of the total impedance of the electrode.

In some embodiments, the charging signal includes a plurality of charge pulses, and application of the preheating signal is stopped and application of the charging signal is commenced when a Warburg impedance of an electrode of the energy source is 10% or less of the total impedance of the electrode.

In some embodiments, the charging signal includes a plurality of charge pulses, and application of the preheating signal is stopped and application of the charging signal is commenced when a Warburg impedance of an electrode times an average current of the charging signal is less than an available overvoltage of the electrode.

In some embodiments, the charging signal is a constant current charging signal, and application of the preheating signal is stopped and application of the charging signal is commenced when an activation impedance of an electrode of the energy source is 20% or less of the total impedance of the electrode.

In some embodiments, the charging signal is a constant current charging signal, and application of the preheating signal is stopped and application of the charging signal is commenced when an activation impedance of an electrode of the energy source is 10% or less of the total impedance of the electrode.

In some embodiments, application of the first charging signal is stopped and application of the second charging signal is commenced when an activation impedance of an electrode of the energy source is 50% or less of the total impedance of the electrode.

In some embodiments, application of the first charging signal is stopped and application of the second charging signal is commenced when an activation impedance of an electrode of the energy source is 20% or less of the total impedance of the electrode.

In some embodiments, application of the first charging signal is stopped and application of the second charging signal is commenced when an activation impedance of an electrode of the energy source is 10% or less of the total impedance of the electrode.

In some embodiments, the pulse preheating signal is applied at a voltage greater than an upper cutoff voltage and a lower cutoff voltage of the energy source.

In some embodiments, the charging signal includes a plurality of charge pulses at peak voltages greater than a cutoff voltage of the energy source.

In many embodiments, a system configured to charge an energy source is provided, the system including: a control system configured to: (a) control switch circuitry to apply a preheating signal to an energy source such that a temperature of the energy source increases until the energy source satisfies a condition, where the preheating signal includes a sequence of alternating charge and discharge energy pulses; and (b) control the switch circuitry to apply a charging signal to the energy source after the energy source satisfies the condition.

In some embodiments, the control system includes processing circuitry communicatively coupled with a memory, where the memory stores instructions that, when executed by the processing circuitry, cause the control system to perform steps (a) and (b).

In some embodiments, the control system is further configured to detect when the energy source satisfies the condition or receive an indication that the energy source satisfied the condition.

In some embodiments, the condition is a temperature condition, the control system being configured to control switch circuitry to apply the preheating signal until the energy source reaches a first temperature, and to apply the charging signal after the energy source reaches the first temperature.

In some embodiments, the control system is configured to control switch circuitry to apply the preheating signal for a first time duration, and to apply the charging signal after the first time duration.

In some embodiments, the preheating signal has a frequency configured to prevent an electrochemical storage reaction and side reaction from occurrence in the energy source.

In some embodiments, the energy source is a lithium ion battery and the preheating signal has a frequency greater than one kilohertz.

In some embodiments, the preheating signal has a frequency configured to bypass electrochemical charge transfer of a main storage reaction and side reactions of the energy source.

In some embodiments, the charging signal includes a plurality of charge pulses.

In some embodiments, the plurality of charge pulses have pulse durations less than or equal to ten milliseconds. The system where the plurality of charge pulses can have pulse durations less than or equal to five milliseconds or less than or equal to two milliseconds. The system where the energy source can have an open circuit voltage and an upper cutoff voltage, and where the plurality of charge pulses are at a voltage between the open circuit voltage and the upper cutoff voltage.

In some embodiments, the charging signal is a first charging signal including a plurality of pulses, and where the control system is configured to control switch circuitry to apply a second charging signal to the energy source after application of the first charging signal, where the second charging signal is a constant current charging signal. The system where the control system can be configured to control switch circuitry to apply the preheating signal until the energy source reaches a first temperature, to apply the first charging signal until the energy source reaches a second temperature, and to apply the second charging signal after the energy source reaches the second temperature. The system where the first temperature can be 25 degrees Celsius or higher, or between 25 degrees and 40 degrees Celsius. The system where the second temperature can be 45 degrees Celsius or higher, or between 45 degrees and 55 degrees Celsius. The system where the control system is configured control switch circuitry to apply the first charging signal until the energy source reaches a first state of charge, and to apply the second charging signal after the energy source reaches the first state of charge. The system where the control system can be configured to control switch circuitry to apply the second charging signal until the energy source reaches a state of charge of 95% or higher.

In some embodiments, the energy source is a battery including lithium, and where the control system is configured to monitor the energy source for lithium plating. The system where the control system can be configured to determine whether a voltage response of the energy source to application of a charge pulse is followed by a discharge pulse that includes a lithium stripping signature.

In some embodiments, the control system is configured to: control switch circuitry to apply a charge pulse to the energy source immediately followed by a discharge pulse; perform a derivation of a voltage response to at least the discharge pulse; and determine whether the derivation includes a lithium stripping signature. The system where the control system can be configured to monitor the energy source for lithium plating intermittently during a charging phase of the energy source where the charging signal is applied.

In some embodiments, the control system is configured to monitor an impedance of the energy source for an indication of degradation. The system where the control system can be configured to control switch circuitry to adjust application of the charging signal in response to the monitored impedance. The system where the control system can be configured to monitor an impedance of the energy source intermittently during a charging phase of the energy source where the charging signal is applied.

In some embodiments, the energy source is a battery cell.

In some embodiments, the energy source is a battery module including a plurality of battery cells.

In many embodiments, a method of charging a plurality of energy sources within an energy storage system is provided, where the energy storage system includes a plurality of modules connected together in cascaded fashion, each of the plurality of modules including an energy source and switch circuitry, where the energy storage system is configured to generate AC power with a superposition of output signals generated by the plurality of modules, the method including: applying, by the switch circuitry of each module, a preheating signal including a sequence of alternating charge and discharge energy pulses to the energy source of each module such that the temperature of the energy source of each module increases; and then applying, by the switch circuitry of each module, a charging signal to the energy source of each module.

In some embodiments, the preheating signal is applied until the energy source reaches a first temperature, and the charging signal is applied after the energy source reaches the first temperature.

In some embodiments, the energy source includes a plurality of cells, and the preheating signal is applied until all cells reach a first minimum temperature or until at least one cell reaches a maximum temperature.

In some embodiments, the preheating signal is applied for a first time duration, and the charging signal is applied after the first time duration.

In some embodiments, the charging signal includes a plurality of charge pulses. The method where the plurality of charge pulses can have pulse durations less than or equal to ten milliseconds, less than or equal to five milliseconds, or less than or equal to two milliseconds. The method where the energy source of each module can have an open circuit voltage and an upper cutoff voltage, and where the plurality of charge pulses are at a voltage between the open circuit voltage and the upper cutoff voltage.

In some embodiments the charging signal is a first charging signal including a plurality of charge pulses, the method can further include: applying, by the switch circuitry of each module, a second charging signal to the energy source of each module after applying the first charging signal, where the second charging signal is a constant current charging signal. The method where the preheating signal can be applied until the energy source reaches a first temperature, the first charging signal can be applied until the energy source reaches a second temperature, and the second charging signal can be applied after the energy source reaches the second temperature. The method where the first temperature can be 25 degrees Celsius or higher, or between 25 degrees and 40 degrees Celsius. The method where the second temperature can be 41 degrees Celsius or higher, or between 41 degrees and 60 degrees Celsius. The method where the first charging signal can be applied until the energy source reaches a first state of charge, and the second charging signal can be applied after the energy source reaches the first state of charge. The method where the second charging signal can be applied until the energy source reaches a state of charge of 95% or higher. The method where the energy source can have a state of charge of 5% or less at a first time that the first charging signal is applied, where the energy source can have a state of charge of 75% or greater at a second time after the second charging signal is applied, and where the difference between the first time and the second time can be ten minutes or less. The method where the preheating signal can be applied for two minutes or less before application of the first charging signal.

In some embodiments, the energy source of each module is a battery including lithium, the method can further include monitoring the energy source of each module for lithium plating. The method where monitoring the energy source of each module for lithium plating can include determining whether a voltage response of the energy source to application of a charge pulse followed by a discharge pulse includes a lithium stripping signature. The method where monitoring the energy source of each module for lithium plating can include: applying a charge pulse immediately followed by a discharge pulse to the energy source; performing a derivation of a voltage response to at least the discharge pulse; and determining whether the derivation includes a lithium stripping signature. The method where monitoring the energy source of each module for lithium plating can be performed intermittently during a charging phase of the energy source of each module where the charging signal is applied. The method can further include monitoring an impedance of the energy source at each module for an indication of degradation. The method can further include adjusting application of the charging signal in response to the monitored impedance. The method where monitoring an impedance of the energy source at each module can be performed intermittently during a charging phase of the energy source where the charging signal is applied.

In some embodiments, the energy source is a battery cell.

In some embodiments, the energy source is a battery module including a plurality of battery cells.

In many embodiments, an energy storage system is provided, including: a plurality of modules connected together in cascaded fashion, each of the plurality of modules including an energy source and switch circuitry, where the energy storage system is configured to generate AC power with a superposition of output signals generated by the plurality of modules, where the energy storage system is configured to, for each module: (a) control the switch circuitry to apply a preheating signal to the energy source such that a temperature of the energy source increases until the energy source reaches a first temperature, where the preheating signal includes a sequence of alternating charge and discharge energy pulses; and (b) control the switch circuitry to apply a charging signal to the energy source when the energy source is at or above the first temperature.

In some embodiments, the system can further include a control system configured to perform (a) and (b). The system where the control system can include a master control device and a plurality of local control devices associated with the plurality of modules, where the master control device is communicatively coupled with the plurality of local control devices, and where the plurality of local control devices are configured to output switching control signals to the switch circuitry of the plurality of modules.

In some embodiments, the system can further include processing circuity communicatively coupled with a memory, where the memory stores instructions that, when executed by the processing circuitry, cause the system to perform (a) and (b).

In some embodiments, the system can be configured to control switch circuitry to apply the preheating signal until the energy source reaches a first temperature, and to apply the charging signal after the energy source reaches the first temperature.

In some embodiments, the system can be configured to control switch circuitry to apply the preheating signal for a first time duration, and to apply the charging signal after the first time duration.

In some embodiments, the preheating signal has a frequency configured to prevent an electrochemical storage reaction and side reaction from occurrence in the energy source.

In some embodiments, the energy source is a lithium ion battery and the preheating signal has a frequency greater than one kilohertz.

In some embodiments, the preheating signal has a frequency configured to bypass electrochemical charge transfer of a main storage reaction and side reactions of the energy source.

In some embodiments, the charging signal includes a plurality of charge pulses. The system where the energy source has an open circuit voltage and an upper cutoff voltage, and where the plurality of charge pulses are at a voltage between the open circuit voltage and the upper cutoff voltage.

In some embodiments, the charging signal is a first charging signal including a plurality of pulses, and where the control system is configured to control switch circuitry to apply a second charging signal to the energy source after application of the first charging signal, where the second charging signal is a constant current charging signal. The system where the control system can be configured to control switch circuitry to apply the preheating signal until the energy source reaches a first temperature, to apply the first charging signal until the energy source reaches a second temperature, and to apply the second charging signal after the energy source reaches the second temperature. The system where the control system can be configured control switch circuitry to apply the first charging signal until the energy source reaches a first state of charge, and to apply the second charging signal after the energy source reaches the first state of charge. The system where the control system can be configured to control switch circuitry to apply the second charging signal until the energy source reaches a state of charge of 95% or higher.

In some embodiments, the energy source is a battery including lithium, and where the control system is configured to monitor the energy source for lithium plating. The system where the control system can be configured to determine whether a voltage response of the energy source to application of a charge pulse followed by a discharge pulse includes a lithium stripping signature.

In some embodiments, the control system is configured to: control switch circuitry to apply a charge pulse to the energy source immediately followed by a discharge pulse; perform a derivation of a voltage response to at least the discharge pulse; and determine whether the derivation includes a lithium stripping signature. The system where the control system can be configured to monitor the energy source for lithium plating intermittently during a charging phase of the energy source where the charging signal is applied.

In some embodiments, the control system is configured to monitor an impedance of the energy source for an indication of degradation. The system where the control system can be configured to control switch circuitry to adjust application of the charging signal in response to the monitored impedance. The system where the control system is configured to monitor an impedance of the energy source intermittently during a charging phase of the energy source where the charging signal is applied.

In some embodiments, every energy source is a battery cell.

In some embodiments, every energy source is a battery module including a plurality of battery cells.

In some embodiments, the plurality of modules is a first plurality of modules, and the system further includes: a second plurality of modules connected together in cascaded fashion, each of the second plurality of modules including an energy source and switch circuitry, where the energy storage system is configured to generate AC power with a superposition of output signals generated by the second plurality of modules; and a third plurality of modules connected together in cascaded fashion, each of the third plurality of modules including an energy source and switch circuitry, where the energy storage system is configured to generate AC power with a superposition of output signals generated by the third plurality of modules, where the AC power includes three phase AC power. The system where the system can be configured to power a motor of an automotive electric vehicle.

In many embodiment, a method of charging an energy source is provided, the method including: applying a preheating signal including a sequence of alternating charge and discharge energy pulses to the energy source such that the temperature of the energy source increases, where the preheating signal is at a frequency that passes through a double layer capacitance of the energy source.

In some embodiments, the double layer capacitance includes a double layer capacitance of an anode of the energy source and a double layer capacitance of a cathode of the energy source.

In some embodiments, the preheating signal does not substantially charge the energy source.

In some embodiments, the preheating signal is applied for a first time duration such that the energy source is heated without being substantially charged, and then the preheating signal is applied for a second time duration such that the energy source is heated and charged. Durations of the charge energy pulses can be incrementally increased during the second time duration relative to the discharge energy pulses.

In some embodiments, the energy source is a battery cell.

In some embodiments, the energy source is a battery module including a plurality of battery cells.

In some embodiments, the preheating signal is applied until the energy source reaches a first temperature, and the charging signal is applied after the energy source reaches the first temperature.

In some embodiments, the preheating signal is applied for a first time duration, and the charging signal is applied after the first time duration.

In some embodiments, the preheating signal has a frequency such that no electrochemical storage reaction nor side reaction takes place in the energy source.

In some embodiments, the energy source is a lithium ion battery and the preheating signal has a frequency greater than one kilohertz.

In some embodiments, the preheating signal has a frequency such that electrochemical charge transfer of a main storage reaction and side reactions of the energy source are bypassed. The method where the electrochemical charge transfer can be bypassed by the interface capacities of electrodes of the energy source to an electrolyte of the energy source.

In many embodiments, a method of monitoring a battery including lithium for the occurrence of lithium plating is provided, the method including: applying a charge pulse followed by a discharge pulse to the battery; and determining whether a voltage response of the battery to application of the charge pulse followed by the discharge pulse includes a lithium stripping signature.

In some embodiments, where determining whether the voltage response includes a lithium stripping signature includes: performing a derivation of the voltage response of the battery to at least the discharge pulse; and determining whether the derivation includes a lithium stripping signature. The method where the lithium stripping signature can be a transition in the derivation while the discharge pulse is applied.

In some embodiments, where determining whether the voltage response includes a lithium stripping signature includes determining whether a variation in the voltage response during application of the discharge pulse is greater than a threshold.

In some embodiments, the method is performed intermittently during a charging phase of the battery.

In some embodiments, the battery includes a single battery cell.

In some embodiments, the battery includes a plurality of battery cells.

In many embodiments, a method of charging an energy source is provided, the method including: applying a first charging signal comprising charge pulses to the energy source, wherein a duration of each charge pulse is less than ten milliseconds; determining when the energy source satisfies a transition condition; and applying a second charging signal to the energy source after determining satisfaction of the transition condition, wherein the second charging signal is a constant current charging signal.

In some embodiments, the duration of each charge pulse is less than or equal to five milliseconds.

In some embodiments, the duration of each charge pulse is less than or equal to two milliseconds.

In some embodiments, the energy source has an open circuit voltage and an upper cutoff voltage, and the charge pulses are at a voltage between the open circuit voltage and the upper cutoff voltage.

In some embodiments, the transition condition is a state of charge threshold.

In some embodiments, the energy source is a battery comprising lithium, the method further including monitoring the energy source for lithium plating.

In some embodiments, monitoring the energy source for lithium plating includes determining whether a voltage response of the energy source to application of a charge pulse followed by a discharge pulse comprises a lithium stripping signature.

In some embodiments, monitoring the energy source for lithium plating includes: applying a charge pulse immediately followed by a discharge pulse to the energy source; performing a derivation of a voltage response to at least the discharge pulse; and determining whether the derivation comprises a lithium stripping signature.

In some embodiments, monitoring the energy source for lithium plating is performed intermittently during a charging phase of the energy source where the charging signal is applied.

In some embodiments, the method further includes monitoring an impedance of the energy source for an indication of degradation.

In some embodiments, the method further includes adjusting application of the charging signal in response to the monitored impedance.

In some embodiments, monitoring an impedance of the energy source is performed intermittently during a charging phase of the energy source where the charging signal is applied.

In some embodiments, the transition condition is when an activation impedance of an electrode of the energy source is 50% or less of the total impedance of the electrode.

In some embodiments, the transition condition is when an activation impedance of an electrode of the energy source is 20% or less of the total impedance of the electrode.

In some embodiments, the transition condition is when an activation impedance of an electrode of the energy source is 10% or less of the total impedance of the electrode.

In some embodiments, the charge pulses are at peak voltages greater than a cutoff voltage of the energy source.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

Processing circuitry can include one or more processors, microprocessors, controllers, and/or microcontrollers, each of which can be a discrete chip or distributed amongst (and a portion of) a number of different chips. Processing circuitry can include a digital signal processor, which can be implemented in hardware and/or software. Processing circuitry can execute software instructions stored on memory that cause processing circuitry to take a host of different actions and control other components.

Processing circuitry can also be adapted to execute the operating system and any software applications, and perform those other functions not related to the processing of communications transmitted and received.

Memory can be shared by one or more of the various functional units present, or can be distributed amongst two or more of them (e.g., as separate memories present within different chips). Memory can also be a separate chip of its own. Memory is non-transitory, and can be volatile (e.g., RAM, etc.) and/or non-volatile memory (e.g., ROM, flash memory, F-RAM, etc.).

Computer program instructions for carrying out operations in accordance with the described subject matter may be written in any combination of one or more programming languages, including an object oriented programming language such as Java, JavaScript, Smalltalk, C++, C#, Transact-SQL, XML, PHP or the like and conventional procedural programming languages, such as the "C" programming language or similar programming languages. The program instructions may execute entirely on the user's computing device (e.g., reader) or partly on the user's computing device. The program instructions may reside partly on the user's computing device and partly on a remote computing device or entirely on the remote computing device or server, e.g., for instances where the identified frequency is uploaded to the remote location for processing. In the latter scenario, the remote computing device may be connected to the user's computing device through any type of network, or the connection may be made to an external computer.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and later-developed variants thereof.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A method of charging an energy source, comprising:

monitoring an impedance of the energy source, wherein a capacitance of the impedance includes a double layer sheet capacitance;

applying a preheating signal at a frequency based on the double layer sheet capacitance, wherein the preheating signal comprises a sequence of alternating charge and discharge energy pulses of equal duration to a lithium ion battery module comprising a plurality of cells to induce local heating such that a temperature of the lithium ion battery module increases, wherein (i) the preheating signal is applied until the lithium ion battery module reaches a first temperature, (ii) a frequency of the preheating signal is greater than one kilohertz, (iii) the preheating signal is at a frequency that passes through a double layer sheet capacitance of the energy source, and (iv) application of the preheating signal prevents or suppresses electrochemical charge transfer of a main storage reaction and one or more side reactions of the lithium ion battery module; and responsive to the lithium ion battery module reaching the first temperature, applying a charging signal to the lithium ion battery module such that a charge of the lithium ion battery module increases.

2. The method of claim 1, wherein the electrochemical charge transfer is bypassed by one or more interface capacities of electrodes of the lithium ion battery module to an electrolyte of the energy source.

3. The method of claim 1, wherein the charging signal comprises a plurality of charge pulses having pulse durations less than or equal to ten milliseconds.

4. The method of claim 3, wherein the lithium ion battery module has an open circuit voltage and an upper cutoff voltage, and wherein the plurality of charge pulses are at a voltage between the open circuit voltage and the upper cutoff voltage.

5. The method of claim 1, wherein the charging signal is a first charging signal comprising a plurality of pulses, the method further comprising:

applying a second charging signal to the lithium ion battery module after applying the first charging signal, wherein the second charging signal is a constant current charging signal.

6. The method of claim 5, wherein the first charging signal is applied until the lithium ion battery module reaches a second temperature, and the second charging signal is applied after the lithium ion battery module reaches the second temperature.

7. The method of claim 6, wherein the first temperature is 25 degrees Celsius or higher and the second temperature is 45 degrees Celsius or higher.

8. The method of claim 5, wherein the first charging signal is applied until the lithium ion battery module reaches a first state of charge, and the second charging signal is applied after the lithium ion battery module reaches the first state of charge.

9. The method of claim 8, wherein the second charging signal is applied until the lithium ion battery module reaches a state of charge of 95% or higher.

10. The method of claim 5, wherein application of the first charging signal is stopped and application of the second charging signal is commenced when an activation impedance of an electrode of the lithium ion battery module is 50% or less of a total impedance of the electrode.

11. The method of claim 1, further comprising monitoring the lithium ion battery module for lithium plating.

12. The method of claim 1, further comprising monitoring an impedance of the lithium ion battery module for an indication of degradation.

13. The method of claim 12, further comprising adjusting application of the charging signal in response to the impedance.

14. The method of claim 13, wherein monitoring an impedance of the lithium ion battery module is performed intermittently during a charging phase of the lithium ion battery module where the charging signal is applied.

15. The method of claim 1, wherein the charging signal comprises a plurality of charge pulses, and wherein application of the preheating signal is stopped and application of the charging signal is commenced when a Warburg impedance of an electrode of the lithium ion battery module is 20% or less of a total impedance of the electrode.

16. The method of claim 1, wherein the preheating signal is applied at a voltage greater than an upper cutoff voltage and a lower cutoff voltage of the lithium ion battery module.

17. The method of claim 1, wherein the charging signal comprises a plurality of charge pulses at peak voltages greater than a cutoff voltage of the lithium ion battery module.

18. A system configured to charge an energy source, comprising:

a control system configured to:

(a) monitor an impedance of the energy source, wherein a capacitance of the impedance includes a double layer sheet capacitance;

(b) control a switch circuitry to apply a first charging signal at a preheating signal frequency based on the double layer sheet capacitance to an energy source until the energy source satisfies a transition condition, wherein the first charging signal comprises charge pulses, a duration of each charge pulse being less than ten milliseconds, wherein the preheating signal frequency is at a frequency that passes through the double layer sheet capacitance of the energy source, and wherein application of the first charging signal prevents or suppresses electrochemical charge transfer of a main storage reaction and one or more side reactions of the energy source; and (c) control the switch circuitry to apply a second charging signal to the energy source after the energy source satisfies the transition condition, wherein the second charging signal is a constant current charging signal.

19. A method of charging a plurality of energy sources within an energy storage system, wherein the energy storage system comprises a plurality of converter modules connected together in cascaded fashion, each converter module of the plurality of converter modules comprising an energy source and switch circuitry, wherein each converter module of the plurality of converter modules is independently controllable by a control system to output a module voltage, and wherein the energy storage system is configured to generate AC power with a superposition of module output voltages generated by the plurality of converter modules, the method comprising:

monitoring an impedance for each of the plurality of energy sources, wherein a capacitance of the impedance includes a double layer sheet capacitance;

applying, by switch circuitry of each module, a preheating signal at a preheating signal frequency based on the double layer sheet capacitance, wherein the preheating signal comprises a sequence of alternating charge and discharge energy pulses of equal duration to the energy source of each converter module to induce ohmic heating such that a temperature of the energy source of each converter module increases, wherein (i) the preheating signal is applied until the energy source reaches a first temperature, (ii) a frequency of the preheating signal is greater than one kilohertz, (iii) the preheating signal frequency is at a frequency that passes through the double layer sheet capacitance of the energy source, and (iv) application of the preheating signal occurs to prevent or suppress electrochemical charge transfer of a main storage reaction and one or more side reactions of the energy source of each converter module; and responsive to the energy source reaching the first temperature, applying, by the switch circuitry of each module, a charging signal to the energy source of each converter module.

20. The method of claim 19, wherein the plurality of converter modules transition from application of the preheating signal to application of the charging signal at different times based on when each converter module reaches a temperature threshold.

* * * * *